(12) United States Patent  (10) Patent No.: US 8,189,270 B2
Ori et al.  (45) Date of Patent: May 29, 2012

(54) ZOOM LENS AND IMAGING APPARATUS

(75) Inventors: Tetsuya Ori, Saitama (JP); Takashi Suzuki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 133 days.

(21) Appl. No.: 12/841,836

(22) Filed: Jul. 22, 2010

(65) Prior Publication Data

US 2011/0019033 A1  Jan. 27, 2011

(30) Foreign Application Priority Data

Jul. 23, 2009 (JP) ................ P2009-172376
Feb. 12, 2010 (JP) ................ P2010-029324
Jun. 8, 2010 (JP) ................ P2010-131096

(51) Int. Cl.
*G02B 15/14* (2006.01)
*H04N 5/262* (2006.01)

(52) U.S. Cl. .............. 359/683; 359/685; 348/240.3

(58) Field of Classification Search ............. 348/240.3, 348/E5.055; 359/676, 683, 685

See application file for complete search history.

(56) References Cited

U.S. PATENT DOCUMENTS

| 6,404,561 B1 | 6/2002 | Isono et al. |
| 6,449,433 B2 | 9/2002 | Hagimori et al. |
| 7,177,092 B2 | 2/2007 | Satori et al. |
| 7,428,107 B2 * | 9/2008 | Nishimura ............ 359/683 |
| 7,692,870 B2 * | 4/2010 | Ohtake ............ 359/684 |
| 2011/0141577 A1 * | 6/2011 | Kimura ............ 359/683 |

FOREIGN PATENT DOCUMENTS

| JP | 2001-350093 A | 12/2001 |
| JP | 3391342 B2 | 1/2003 |
| JP | 2003-255228 A | 9/2003 |

* cited by examiner

*Primary Examiner* — David N Spector
(74) *Attorney, Agent, or Firm* — Birch, Stewart, Kolasch & Birch, LLP

(57) ABSTRACT

Disclosed are a zoom lens and an imaging apparatus having a high zoom ratio, a small total length, and a small overall size. A zoom lens includes a first lens group having a positive refractive power, a second lens group having a negative refractive power, a third lens group having a positive refractive power, a fourth lens group having a negative refractive power, and a fifth lens group having a positive refractive power which are arranged in this order from an object side. A gap between the lens groups is changed to change power. The zoom lens satisfies the following Condition expression 1:

$$0.05 < |f4|/ft < 0.25 \qquad \text{[Condition expression 1]}$$

(where ft indicates the focal length of the entire system at a telephoto end and f4 indicates the focal length of the fourth lens group).

13 Claims, 30 Drawing Sheets

EXAMPLE 1

EXAMPLE 1

WIDE ANGLE END

MIDDLE

TELEPHOTO END

EXAMPLE 2

WIDE ANGLE END

MIDDLE

TELEPHOTO END

EXAMPLE 3

WIDE ANGLE END

MIDDLE

TELEPHOTO END

EXAMPLE 4

WIDE ANGLE END

MIDDLE

TELEPHOTO END

EXAMPLE 5

WIDE ANGLE END

MIDDLE

TELEPHOTO END

EXAMPLE 6

WIDE ANGLE END

MIDDLE

TELEPHOTO END

EXAMPLE 7

WIDE ANGLE END

MIDDLE

TELEPHOTO END

EXAMPLE 8

WIDE ANGLE END

MIDDLE

TELEPHOTO END

EXAMPLE 9

WIDE ANGLE END

MIDDLE

TELEPHOTO END

EXAMPLE 10

WIDE ANGLE END

MIDDLE

TELEPHOTO END

EXAMPLE 11

WIDE ANGLE END

MIDDLE

TELEPHOTO END

EXAMPLE 12

WIDE ANGLE END

MIDDLE

TELEPHOTO END

EXAMPLE 13

WIDE ANGLE END

MIDDLE

TELEPHOTO END

EXAMPLE 14

WIDE ANGLE END

MIDDLE

TELEPHOTO END

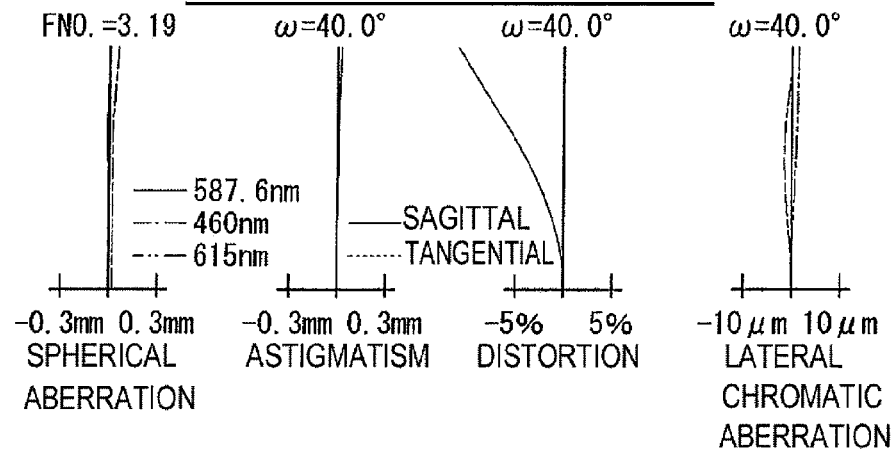
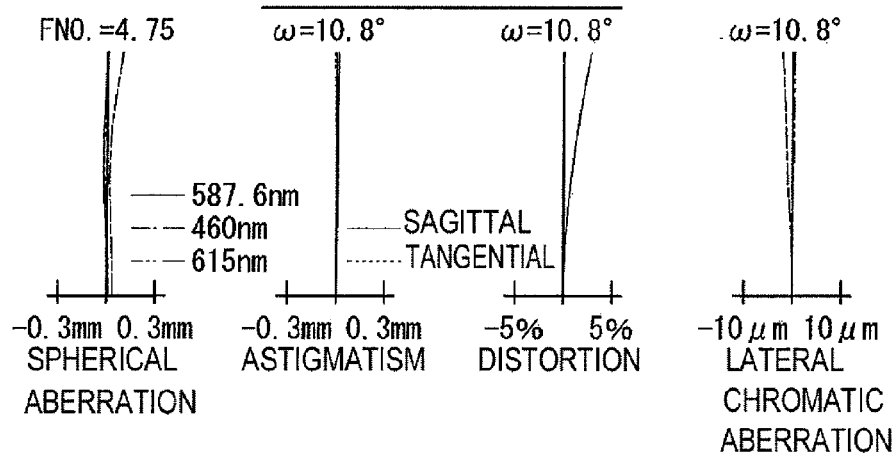
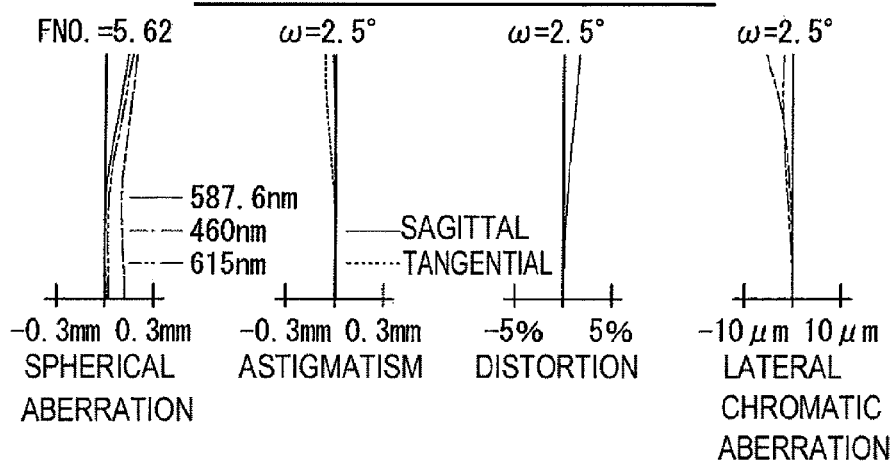

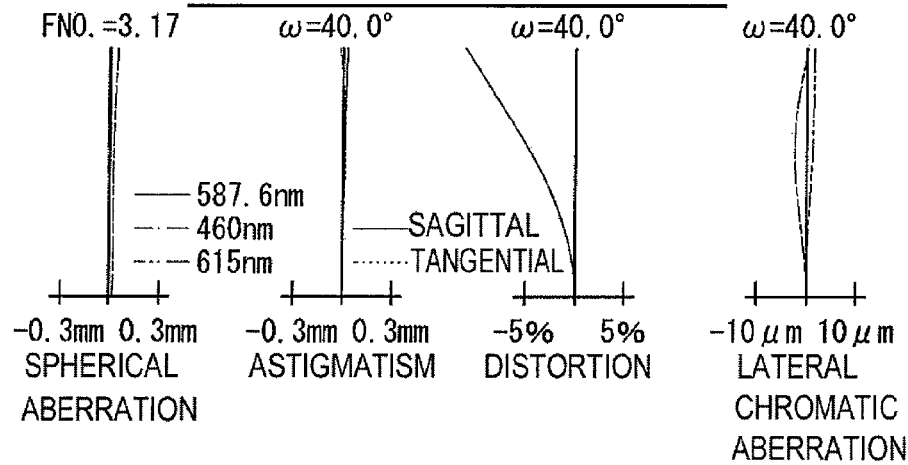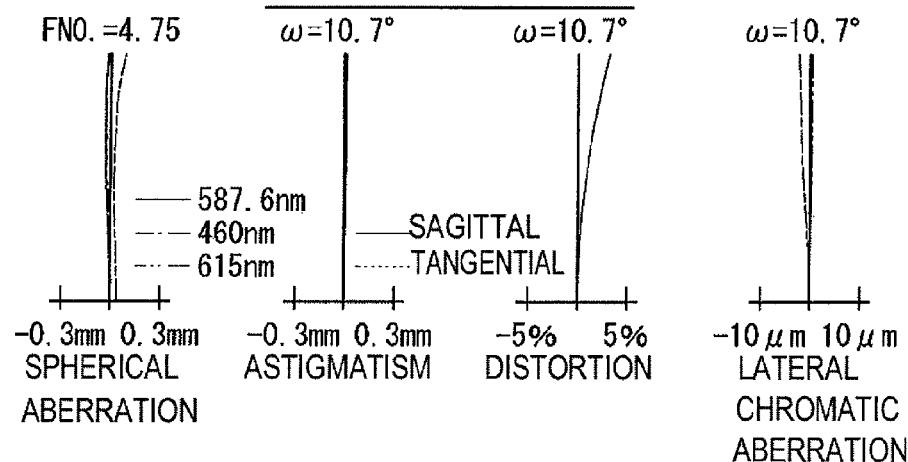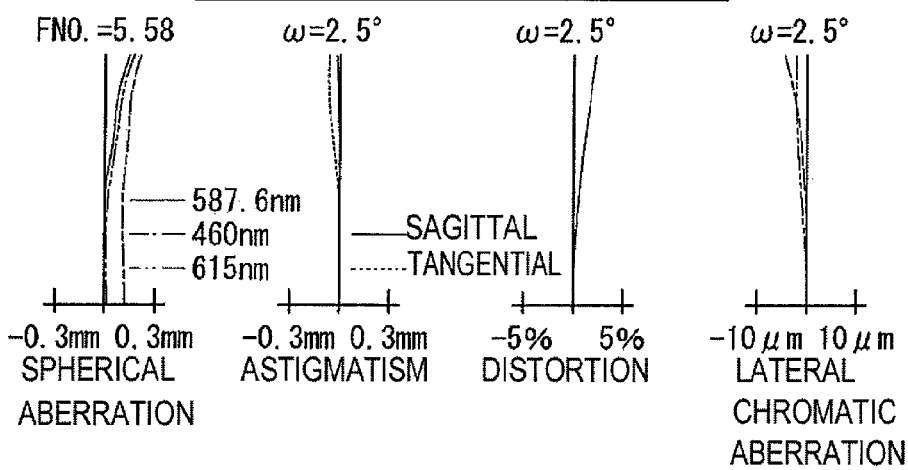

EXAMPLE 3 · WIDE ANGLE END

EXAMPLE 3 · MIDDLE

EXAMPLE 3 · TELEPHOTO END

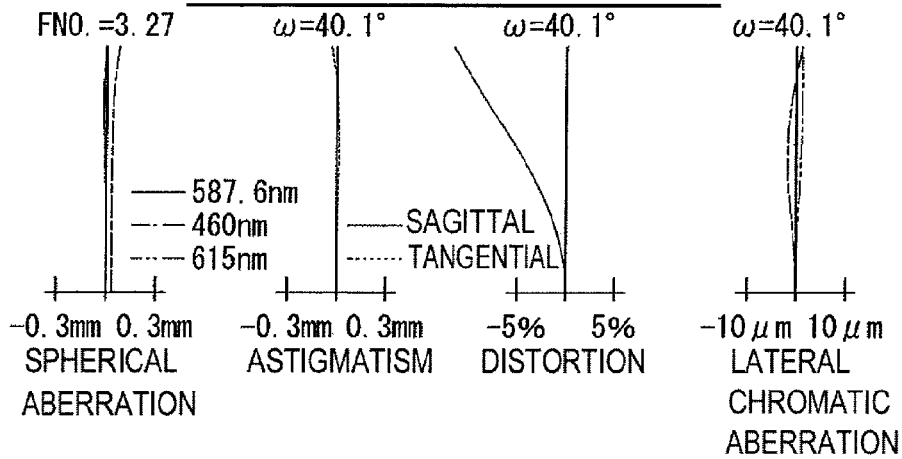
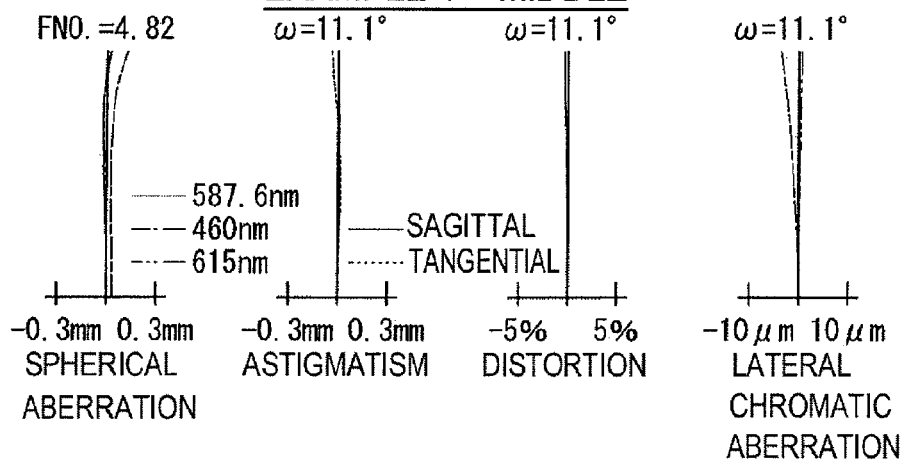
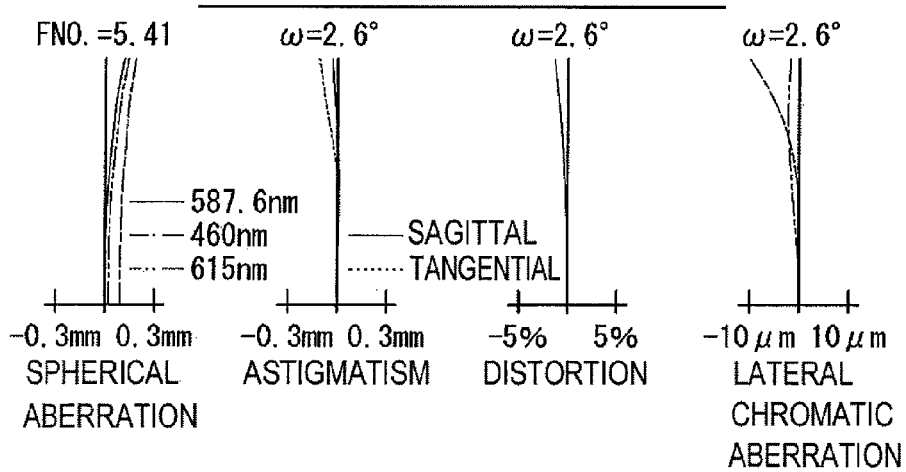

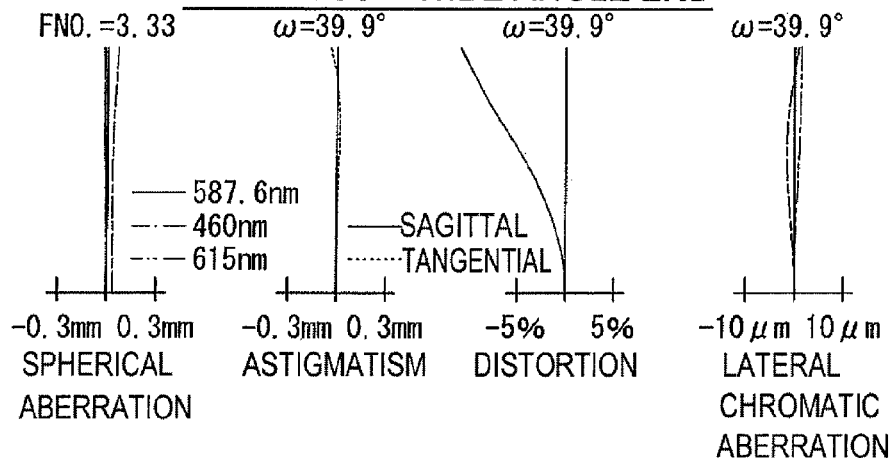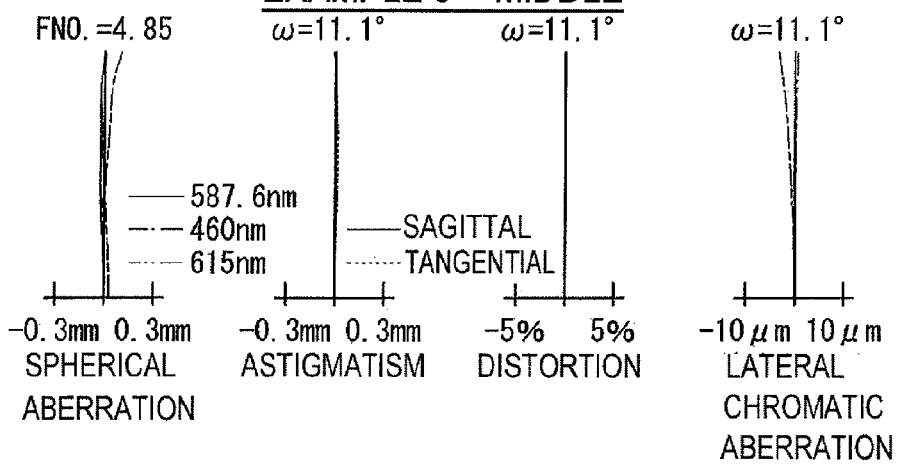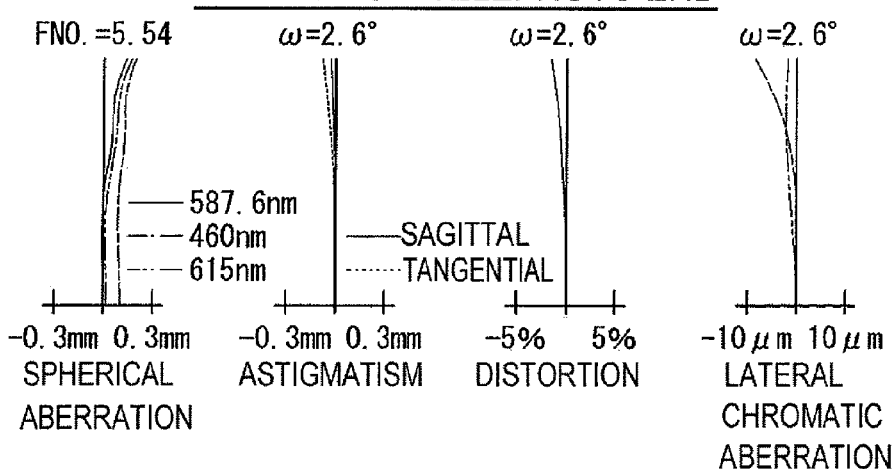

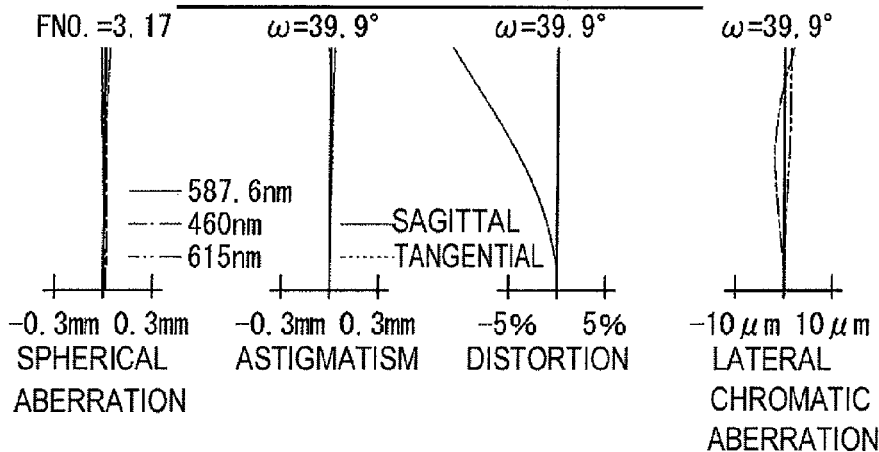
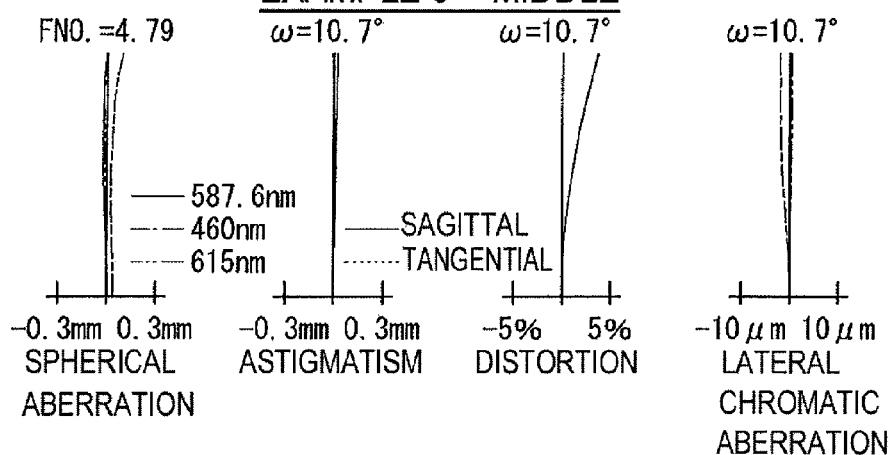
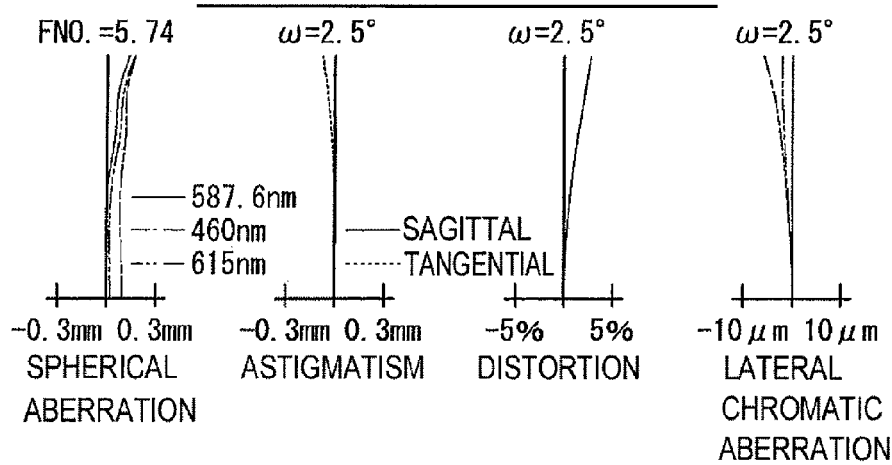

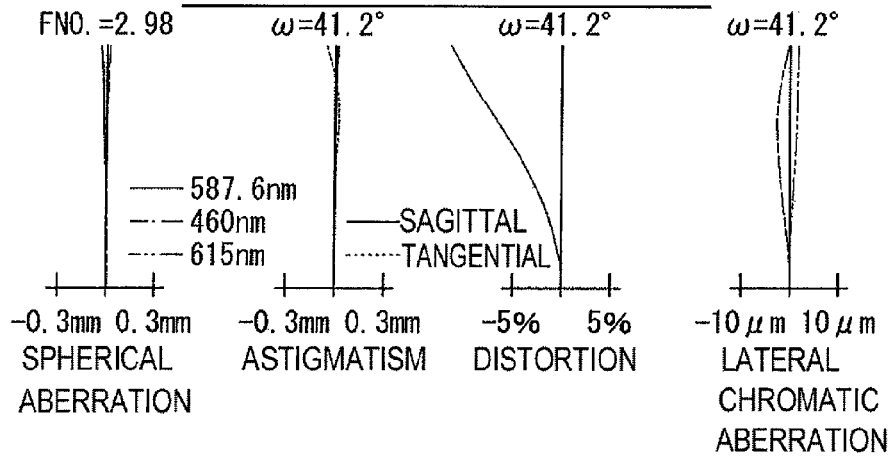
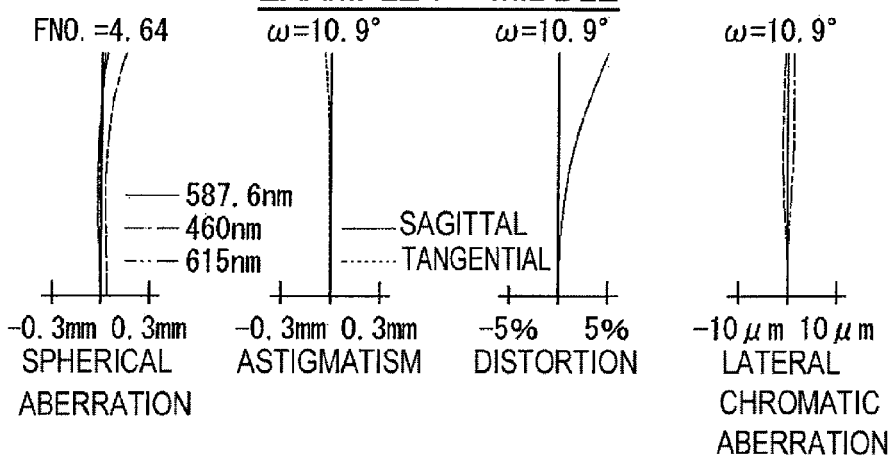
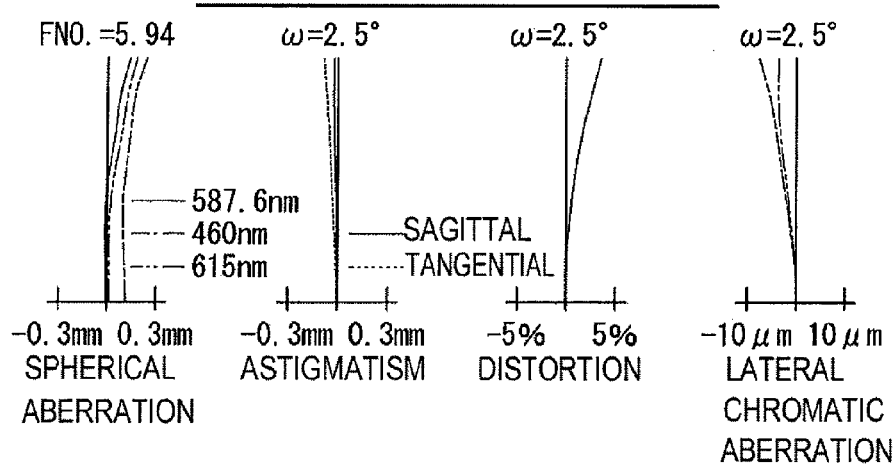

EXAMPLE 8 · WIDE ANGLE END

EXAMPLE 8 · MIDDLE

EXAMPLE 8 · TELEPHOTO END

EXAMPLE 9 · WIDE ANGLE END

EXAMPLE 9 · MIDDLE

EXAMPLE 9 · TELEPHOTO END

EXAMPLE 10 · WIDE ANGLE END

EXAMPLE 10 · MIDDLE

EXAMPLE 10 · TELEPHOTO END

EXAMPLE 11 · WIDE ANGLE END

EXAMPLE 11 · MIDDLE

EXAMPLE 11 · TELEPHOTO END

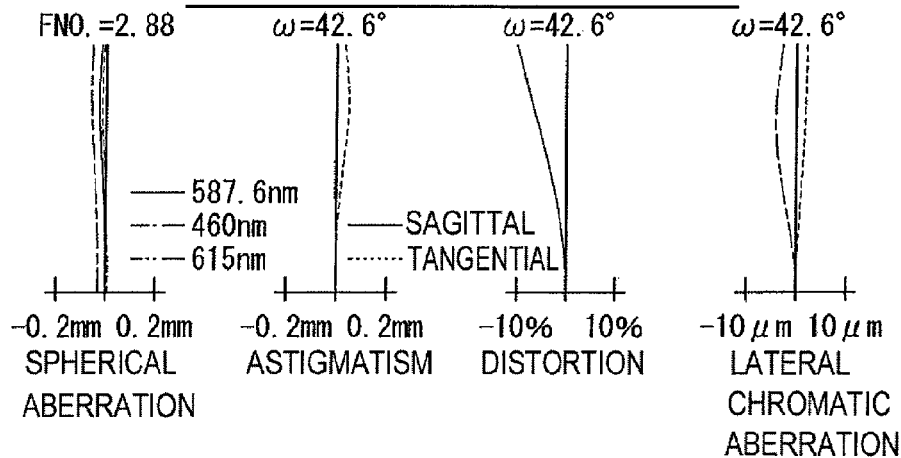
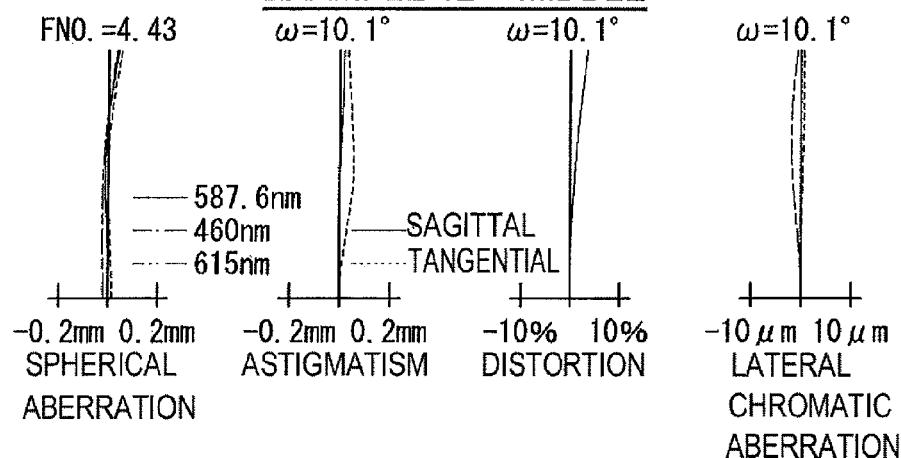
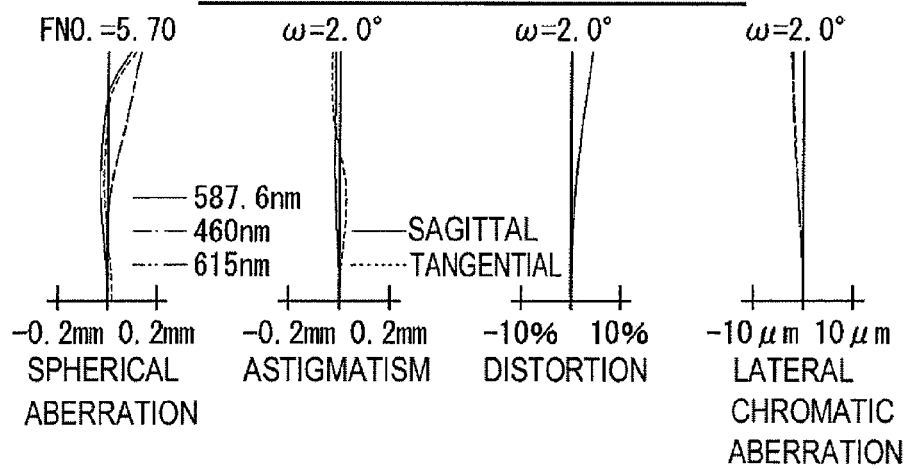

EXAMPLE 13 · WIDE ANGLE END

EXAMPLE 13 · MIDDLE

EXAMPLE 13 · TELEPHOTO END

EXAMPLE 14 · WIDE ANGLE END

EXAMPLE 14 · MIDDLE

EXAMPLE 14 · TELEPHOTO END

ZOOM LENS AND IMAGING APPARATUS

CROSS-REFERENCE TO RELATED APPLICATIONS

This application is based upon and claims the benefit of priority from the Japanese Patent Application Nos. 2009-172376 filed Jul. 23, 2009, 2010-29324 filed Feb. 12, 2010, and 2010-131096 filed Jun. 8, 2010; the entire contents of which are incorporated herein by reference.

BACKGROUND OF THE INVENTION

1. Field of the Invention

The present invention relates to a zoom lens that is appropriately used in, for example, a video camera, a digital still camera, and a portable information terminal (PDA: Personal Digital Assistance) and an imaging apparatus including the same.

2. Description of the Related Art

In recent years, in an imaging apparatus, such as a digital still camera, with a reduction in the size of an imaging device, such as a CCD (Charge Coupled Device) or a CMOS (Complementary Metal Oxide Semiconductor), there is a demand for reducing the overall size of the apparatus. It is preferable that the total length of the lens be reduced and the overall size of the lens system be reduced in order to reduce the overall size of the imaging apparatus.

JP-A-2001-350093, JP-A-2003-255228, and Japanese Patent No. 3391342 disclose a four-group-type zoom lens in which four lens groups with positive, negative, positive, and positive refractive powers or positive, negative, positive, and negative lens groups are arranged in this order from an object side, or a five-group-type zoom lens in which five lens groups with positive, negative, positive, negative, and positive refractive powers are arranged in this order from the object side. In order to obtain a high zoom ratio, the five-group-type zoom lens is more advantageous than the four-group-type zoom lens. In this case, it is preferable to sufficiently reduce the total length of the lens or variation in aberration when power varies.

JP-A-2001-350093 discloses a zoom lens that satisfies the following conditions:

$$1.1 < f1/ft < 2.5$$

(where f1 indicates the focal length of the first lens group and ft indicates the focal length of the entire system at a telephoto end).

When the above-mentioned conditions are satisfied, the focal length f1 of the first lens group with respect to the focal length ft at the telephoto end is long. Therefore, the total length of the lens increases, which is disadvantageous in reducing the size of the zoom lens.

JP-A-2003-255228 discloses a five-group-type zoom lens in which five lens groups with positive, negative, positive, negative, and positive refractive powers are arranged in this order from the object side and the fourth lens group includes one lens. In this structure, since the fourth lens group includes one lens, there is a large variation in aberration when power varies. In addition, when the fourth lens group is moved during focusing, there is also a large variation in aberration during focusing.

Japanese Patent No. 3391342 discloses a zoom lens that includes a first lens group with a positive refractive power, a second lens group with a negative refractive power, a third lens group with a positive refractive power, and at least one subsequent group which are arranged in this order from the object side. In the zoom lens, the first lens group has a total of three or less lenses including at least one negative lens and at least one positive lens, and the refractive index Nd and the Abbe number vd of the at least one positive lens with respect to the d-line satisfy the following conditions:

$$Nd < 1.53; \text{ and}$$

$$vd > 78.$$

However, in the conditions, since the refractive index is small, the Petzval sum increases and field curvature at the telephoto end increases. In addition, the positive lens has strong curvature, and it is necessary to increase the thickness of the positive lens, which is disadvantageous in reducing the size of the zoom lens. Since the Abbe number is large, this structure is advantageous in correcting longitudinal chromatic aberration, but is disadvantageous in correcting lateral chromatic aberration.

SUMMARY OF THE INVENTION

The invention has been made in order to solve the above-mentioned problems and an object of the invention is to provide a zoom lens having a high zoom ratio, a small total length, and a small overall size and an imaging apparatus including the same.

According to an aspect of the invention, a zoom lens includes: a first lens group having a positive refractive power; a second lens group having a negative refractive power; a third lens group having a positive refractive power; a fourth lens group having a negative refractive power; and a fifth lens group having a positive refractive power. The first to fifth lens groups are arranged in this order from an object side and a gap between the lens groups is changed to change power. The zoom lens satisfies the following Condition expression 1:

$$0.05 < |f4|/ft < 0.25 \qquad \text{[Condition expression 1]}$$

(where ft indicates the focal length of the entire system at a telephoto end and f4 indicates the focal length of the fourth lens group).

In the zoom lens according to the above-mentioned aspect of the invention, according to the above-mentioned structure, it is easy to prevent a variation in aberration when power varies and obtain a high zoom ratio. In addition, it is easy to reduce the total length of the lens and thus reduce the overall size of the lens.

When the zoom lens appropriately adopts and satisfies the following preferred structures, it is easy to sufficiently reduce the total length of the lens or sufficiently prevent a variation in aberration when power varies. Therefore, it is easy to improve the performance.

In the zoom lens according to the above-mentioned aspect, the fourth lens group may include two lenses, that is, a positive lens and a negative lens. The fourth lens group may be moved in an optical axis direction for focusing.

The zoom lens according to the above-mentioned aspect may satisfy at least one of the following Condition expressions 2 to 4:

$$0.4 < f1/ft < 1.3; \qquad \text{[Condition expression 2]}$$

$$0.05 < f3/ft < 0.20; \text{ and} \qquad \text{[Condition expression 3]}$$

$$0.05 < f5/ft < 0.4 \qquad \text{[Condition expression 4]}$$

(where f1 indicates the focal length of the first lens group, f3 indicates the focal length of the third lens group, and f5 indicates the focal length of the fifth lens group).

The fifth lens group may include only one positive lens, and at least an object-side surface of the positive lens may preferably be an aspheric surface. The fifth lens group may preferably be fixed when power varies and during focusing.

The first lens group may include a cemented lens of a negative meniscus lens having a convex surface facing the object side and a positive lens having a convex surface facing the object side, and a positive meniscus lens having a convex surface facing the object side, which are arranged in this order from the object side. The first lens group may satisfy the following Condition expressions 5 and 6:

$$1.47 < N12 < 1.65;\ \text{and} \quad \text{[Condition expression 5]}$$

$$62.0 < v12 < 75.0 \quad \text{[Condition expressions 6]}$$

(where N12 indicates the refractive index of the positive lens of the cemented lens in the first lens group with respect to the d-line and v12 indicates the Abbe number of the positive lens of the cemented lens in the first lens group with respect to the d-line).

The second lens group may include a negative lens having a strong concave surface facing an image side, a cemented lens of a negative lens and a positive lens, and a negative lens having a strong concave surface facing the object side, which are arranged in this order from the object side.

A lens closest to the object side in the second lens group may satisfy the following Condition expression 7:

$$0.6 < (Ra-Rb)/(Ra+Rb) < 1.0 \quad \text{[Condition expression 7]}$$

(where Ra indicates the curvature radius of an object-side surface of the lens closest to the object side in the second lens group and Rb indicates the curvature radius of an image-side surface of the lens closest to the object side in the second lens group).

The zoom lens may satisfy the following Condition expression 8:

$$0.05 < |f2/ft| < 0.10 \quad \text{[Condition expression 8]}$$

(where f2 indicates the focal length of the second lens group).

According to another aspect of the invention, an imaging apparatus includes: the zoom lens according to the above-mentioned aspect; and an imaging device that outputs an image signal corresponding to an optical image formed by the zoom lens.

The imaging apparatus according to the above-mentioned aspect of the invention uses a high-performance zoom lens with a high zoom ratio and a small size as an imaging lens. Therefore, it is possible to reduce the overall size of the imaging apparatus.

The zoom lens according to the above-mentioned aspect is a five group type in which five lens groups with positive, negative, positive, negative, and positive refractive powers are arranged in this order from the object side. According to the zoom lens, it is easy to obtain a high zoom ratio and it is possible to optimize the structure of each lens group, as compared to a four-group-type zoom lens. Therefore, it is possible to achieve a zoom lens with a high zoom ratio, a small total length, and a small overall size.

The imaging apparatus according to the above-mentioned aspect uses the high-performance zoom lens with a high zoom ratio and a small size according to the above-mentioned aspect as an imaging lens. Therefore, it is possible to reduce the overall size of the imaging apparatus while maintaining a high imaging performance, such as a high zoom ratio.

BRIEF DESCRIPTION OF THE DRAWINGS

FIGS. 15A to 15D are diagrams illustrating various aberrations of the zoom lens according to Example 1 at a wide angle end, in which FIG. 15A shows spherical aberration, FIG. 15B shows astigmatism, FIG. 15C shows distortion, and FIG. 15D shows lateral chromatic aberration;

FIGS. 16A to 16D are diagrams illustrating various aberrations of the zoom lens according to Example 1 in a middle portion, in which FIG. 16A shows spherical aberration, FIG. 16B shows astigmatism, FIG. 16C shows distortion, and FIG. 16D shows lateral chromatic aberration;

FIGS. 17A to 17D are diagrams illustrating various aberrations of the zoom lens according to Example 1 at a telephoto end, in which FIG. 17A shows spherical aberration, FIG. 17B shows astigmatism, FIG. 17C shows distortion, and FIG. 17D shows lateral chromatic aberration;

FIGS. 18A to 18D are diagrams illustrating various aberrations of the zoom lens according to Example 2 at the wide angle end, in which FIG. 18A shows spherical aberration, FIG. 18B shows astigmatism, FIG. 18C shows distortion, and FIG. 18D shows lateral chromatic aberration;

FIGS. 19A to 19D are diagrams illustrating various aberrations of the zoom lens according to Example 2 in the middle portion, in which FIG. 19A shows spherical aberration, FIG. 19B shows astigmatism, FIG. 19C shows distortion, and FIG. 19D shows lateral chromatic aberration;

FIGS. 20A to 20D are diagrams illustrating various aberrations of the zoom lens according to Example 2 at the telephoto end, in which FIG. 20A shows spherical aberration, FIG. 20B shows astigmatism, FIG. 20C shows distortion, and FIG. 20D shows lateral chromatic aberration;

FIGS. 21A to 21D are diagrams illustrating various aberrations of the zoom lens according to Example 3 at the wide angle end, in which FIG. 21A shows spherical aberration, FIG. 21B shows astigmatism, FIG. 21C shows distortion, and FIG. 21D shows lateral chromatic aberration;

FIGS. 22A to 22D are diagrams illustrating various aberrations of the zoom lens according to Example 3 in the middle portion, in which FIG. 22A shows spherical aberration, FIG. 22B shows astigmatism, FIG. 22C shows distortion, and FIG. 22D shows lateral chromatic aberration;

FIGS. 23A to 23D are diagrams illustrating various aberrations of the zoom lens according to Example 3 at the telephoto end, in which FIG. 23A shows spherical aberration, FIG. 23B shows astigmatism, FIG. 23C shows distortion, and FIG. 23D shows lateral chromatic aberration;

FIGS. 24A to 24D are diagrams illustrating various aberrations of the zoom lens according to Example 4 at the wide angle end, in which FIG. 24A shows spherical aberration, FIG. 24B shows astigmatism, FIG. 24C shows distortion, and FIG. 24D shows lateral chromatic aberration;

FIGS. 25A to 25D are diagrams illustrating various aberrations of the zoom lens according to Example 4 in the middle portion, in which FIG. 25A shows spherical aberration, FIG. 25B shows astigmatism, FIG. 25C shows distortion, and FIG. 25D shows lateral chromatic aberration;

FIGS. 26A to 26D are diagrams illustrating various aberrations of the zoom lens according to Example 4 at the telephoto end, in which FIG. 26A shows spherical aberration, FIG. 26B shows astigmatism, FIG. 26C shows distortion, and FIG. 26D shows lateral chromatic aberration;

FIGS. 27A to 27D are diagrams illustrating various aberrations of the zoom lens according to Example 5 at the wide angle end, in which FIG. 27A shows spherical aberration, FIG. 27B shows astigmatism, FIG. 27C shows distortion, and FIG. 27D shows lateral chromatic aberration;

FIGS. 28A to 28D are diagrams illustrating various aberrations of the zoom lens according to Example 5 in the middle portion, in which FIG. 28A shows spherical aberration, FIG. 28B shows astigmatism, FIG. 28C shows distortion, and FIG. 28D shows lateral chromatic aberration;

FIGS. 29A to 29D are diagrams illustrating various aberrations of the zoom lens according to Example 5 at the telephoto end, in which FIG. 29A shows spherical aberration, FIG. 29B shows astigmatism, FIG. 29C shows distortion, and FIG. 29D shows lateral chromatic aberration;

FIGS. 30A to 30D are diagrams illustrating various aberrations of the zoom lens according to Example 6 at the wide angle end, in which FIG. 30A shows spherical aberration, FIG. 30B shows astigmatism, FIG. 30C shows distortion, and FIG. 30D shows lateral chromatic aberration;

FIGS. 31A to 31D are diagrams illustrating various aberrations of the zoom lens according to Example 6 in the middle portion, in which FIG. 31A shows spherical aberration, FIG. 31B shows astigmatism, FIG. 31C shows distortion, and FIG. 31D shows lateral chromatic aberration;

FIGS. 32A to 32D are diagrams illustrating various aberrations of the zoom lens according to Example 6 at the telephoto end, in which FIG. 32A shows spherical aberration, FIG. 32B shows astigmatism, FIG. 32C shows distortion, and FIG. 32D shows lateral chromatic aberration;

FIGS. 33A to 33D are diagrams illustrating various aberrations of the zoom lens according to Example 7 at the wide angle end, in which FIG. 33A shows spherical aberration, FIG. 33B shows astigmatism, FIG. 33C shows distortion, and FIG. 33D shows lateral chromatic aberration;

FIGS. 34A to 34D are diagrams illustrating various aberrations of the zoom lens according to Example 7 in the middle portion, in which FIG. 34A shows spherical aberration, FIG. 34B shows astigmatism, FIG. 34C shows distortion, and FIG. 34D shows lateral chromatic aberration;

FIGS. 35A to 35D are diagrams illustrating various aberrations of the zoom lens according to Example 7 at the telephoto end, in which FIG. 35A shows spherical aberration, FIG. 35B shows astigmatism, FIG. 35C shows distortion, and FIG. 35D shows lateral chromatic aberration;

FIGS. 36A to 36D are diagrams illustrating various aberrations of the zoom lens according to Example 8 at the wide angle end, in which FIG. 36A shows spherical aberration, FIG. 36B shows astigmatism, FIG. 36C shows distortion, and FIG. 36D shows lateral chromatic aberration;

FIGS. 37A to 37D are diagrams illustrating various aberrations of the zoom lens according to Example 8 in the middle portion, in which FIG. 37A shows spherical aberration, FIG. 37B shows astigmatism, FIG. 37C shows distortion, and FIG. 37D shows lateral chromatic aberration;

FIGS. 38A to 38D are diagrams illustrating various aberrations of the zoom lens according to Example 8 at the telephoto end, in which FIG. 38A shows spherical aberration, FIG. 38B shows astigmatism, FIG. 38C shows distortion, and FIG. 38D shows lateral chromatic aberration;

FIGS. 39A to 39D are diagrams illustrating various aberrations of the zoom lens according to Example 9 at the wide angle end, in which FIG. 39A shows spherical aberration, FIG. 39B shows astigmatism, FIG. 39C shows distortion, and FIG. 39D shows lateral chromatic aberration;

FIGS. 40A to 40D are diagrams illustrating various aberrations of the zoom lens according to Example 9 in the middle portion, in which FIG. 40A shows spherical aberration, FIG. 40B shows astigmatism, FIG. 40C shows distortion, and FIG. 40D shows lateral chromatic aberration;

FIGS. 41A to 41D are diagrams illustrating various aberrations of the zoom lens according to Example 9 at the telephoto end, in which FIG. 41A shows spherical aberration, FIG. 41B shows astigmatism, FIG. 41C shows distortion, and FIG. 41D shows lateral chromatic aberration;

FIGS. 42A to 42D are diagrams illustrating various aberrations of the zoom lens according to Example 10 at the wide angle end, in which FIG. 42A shows spherical aberration, FIG. 42B shows astigmatism, FIG. 42C shows distortion, and FIG. 42D shows lateral chromatic aberration;

FIGS. 43A to 43D are diagrams illustrating various aberrations of the zoom lens according to Example 10 in the middle portion, in which FIG. 43A shows spherical aberration, FIG. 43B shows astigmatism, FIG. 43C shows distortion, and FIG. 43D shows lateral chromatic aberration;

FIGS. 44A to 44D are diagrams illustrating various aberrations of the zoom lens according to Example 10 at the telephoto end, in which FIG. 44A shows spherical aberration, FIG. 44B shows astigmatism, FIG. 44C shows distortion, and FIG. 44D shows lateral chromatic aberration;

FIGS. 45A to 45D are diagrams illustrating various aberrations of the zoom lens according to Example 11 at the wide angle end, in which FIG. 45A shows spherical aberration, FIG. 45B shows astigmatism, FIG. 45C shows distortion, and FIG. 453D shows lateral chromatic aberration;

FIGS. 46A to 46D are diagrams illustrating various aberrations of the zoom lens according to Example 11 in the middle portion, in which FIG. 46A shows spherical aberration, FIG. 46B shows astigmatism, FIG. 46C shows distortion, and FIG. 46D shows lateral chromatic aberration;

FIGS. 47A to 47D are diagrams illustrating various aberrations of the zoom lens according to Example 11 at the telephoto end, in which FIG. 47A shows spherical aberration, FIG. 47B shows astigmatism, FIG. 47C shows distortion, and FIG. 47D shows lateral chromatic aberration;

FIGS. 48A to 48D are diagrams illustrating various aberrations of the zoom lens according to Example 12 at the wide angle end, in which FIG. 48A shows spherical aberration, FIG. 48B shows astigmatism, FIG. 48C shows distortion, and FIG. 48D shows lateral chromatic aberration;

FIGS. 49A to 49D are diagrams illustrating various aberrations of the zoom lens according to Example 12 in the middle portion, in which FIG. 49A shows spherical aberration, FIG. 49B shows astigmatism, FIG. 49C shows distortion, and FIG. 49D shows lateral chromatic aberration;

FIGS. 50A to 50D are diagrams illustrating various aberrations of the zoom lens according to Example 12 at the telephoto end, in which FIG. 50A shows spherical aberration, FIG. 50B shows astigmatism, FIG. 50C shows distortion, and FIG. 50D shows lateral chromatic aberration;

FIGS. 51A to 51D are diagrams illustrating various aberrations of the zoom lens according to Example 13 at the wide-angle end, in which FIG. 51A shows spherical aberration, FIG. 51B shows astigmatism, FIG. 51C shows distortion, and FIG. 51D shows lateral chromatic aberration;

FIGS. 52A to 52D are diagrams illustrating various aberrations of the zoom lens according to Example 13 in the middle portion, in which FIG. 52A shows spherical aberration, FIG. 52B shows astigmatism, FIG. 52C shows distortion, and FIG. 52D shows lateral chromatic aberration;

FIGS. 53A to 53D are diagrams illustrating various aberrations of the zoom lens according to Example 13 at the telephoto end, in which FIG. 53A shows spherical aberration, FIG. 53B shows astigmatism, FIG. 53C shows distortion, and FIG. 53D shows lateral chromatic aberration;

FIGS. 54A to 54D are diagrams illustrating various aberrations of the zoom lens according to Example 14 at the wide-angle end, in which FIG. 54A shows spherical aberration, FIG. 54B shows astigmatism, FIG. 54C shows distortion, and FIG. 54D shows lateral chromatic aberration;

FIGS. 55A to 55D are diagrams illustrating various aberrations of the zoom lens according to Example 14 in the middle portion, in which FIG. 55A shows spherical aberration, FIG. 55B shows astigmatism, FIG. 55C shows distortion, and FIG. 55D shows lateral chromatic aberration;

FIGS. 56A to 56D are diagrams illustrating various aberrations of the zoom lens according to Example 14 at the telephoto end, in which FIG. 56A shows spherical aberration, FIG. 56B shows astigmatism, FIG. 56C shows distortion, and FIG. 56D shows lateral chromatic aberration;

DESCRIPTION OF THE PREFERRED EMBODIMENTS

[Lens Structure]

Hereinafter, exemplary embodiments of the invention will be described in detail with reference to the accompanying drawings.

Figure 1A:
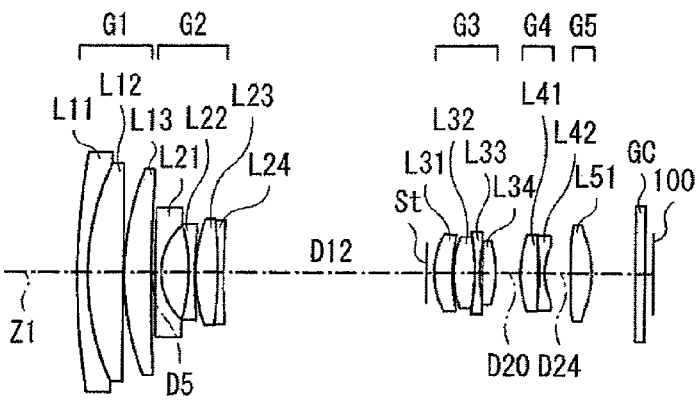
FIGS. 1A to 1C show a first structural example of a zoom lens according to an embodiment of the invention and are cross-sectional views illustrating a lens corresponding to Numerical example 1.
Figure 1B:
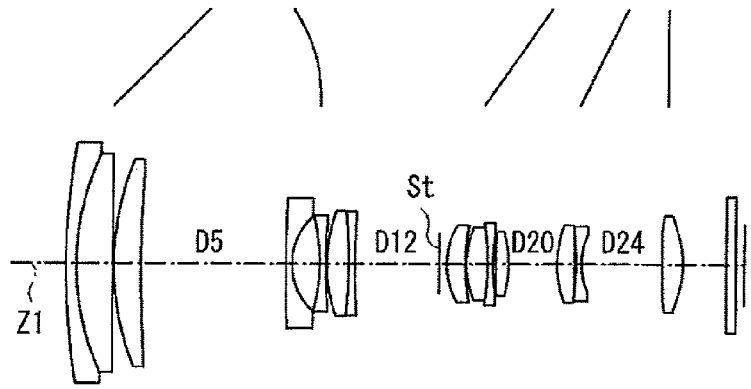
Figure 1C:
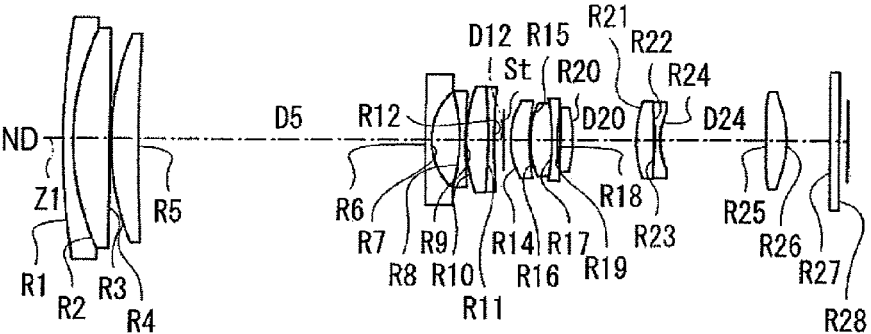
Figure 10A:
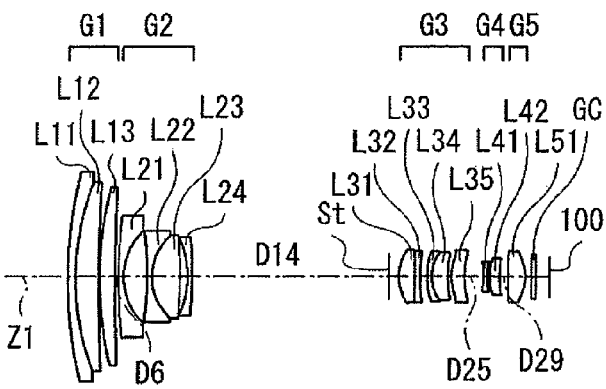
FIGS. 10A to 10C show a tenth structural example of the zoom lens and are cross-sectional views illustrating a lens corresponding to Numerical example 10.
Figure 10B:
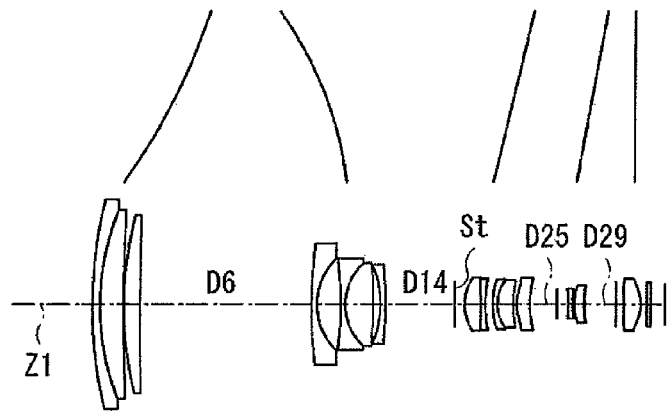
Figure 10C:
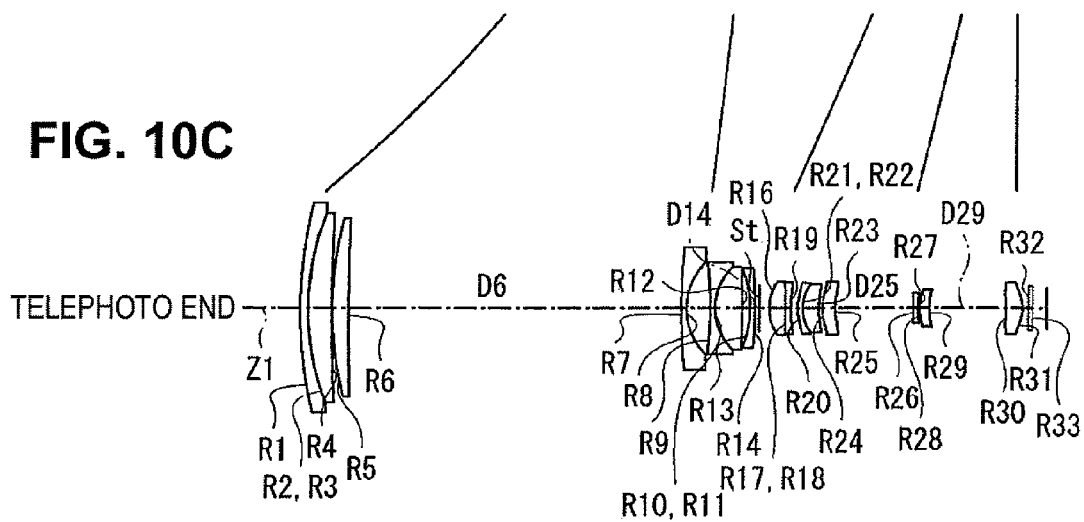
Figure 11A:
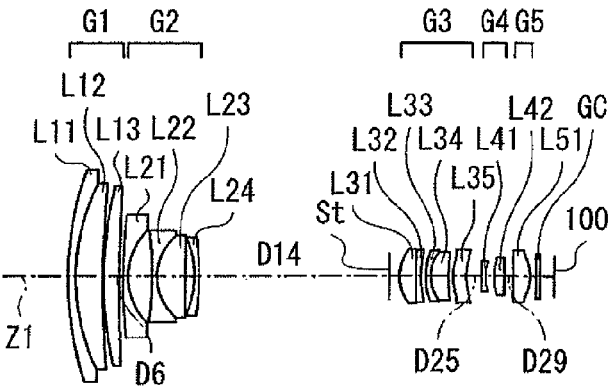
FIGS. 11A to 11C show an eleventh structural example of the zoom lens and are cross-sectional views illustrating a lens corresponding to Numerical example 11.
Figure 11B:
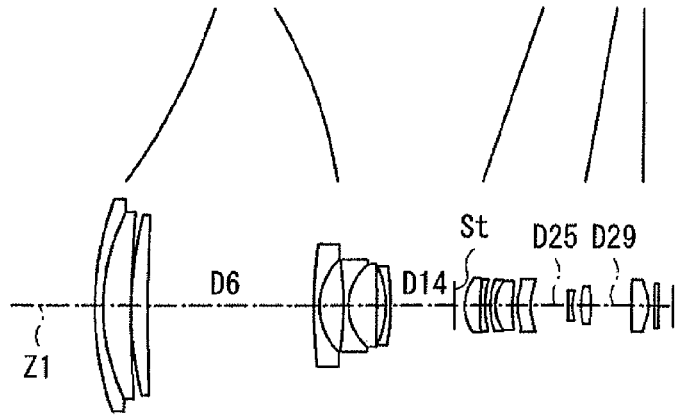
Figure 11C:
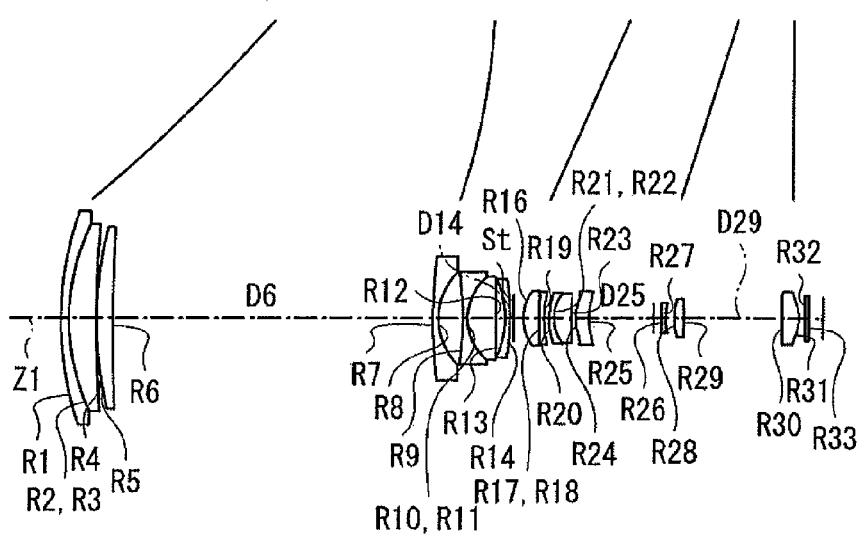
Figure 12A:
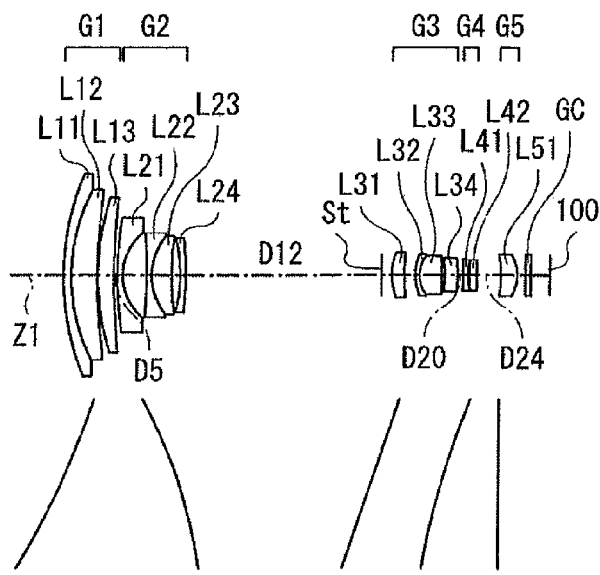
FIGS. 12A to 12C show a twelfth structural example of the zoom lens and are cross-sectional views illustrating a lens corresponding to Numerical example 12.
Figure 12B:
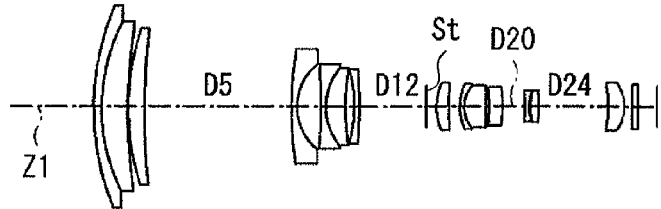
Figure 12C:
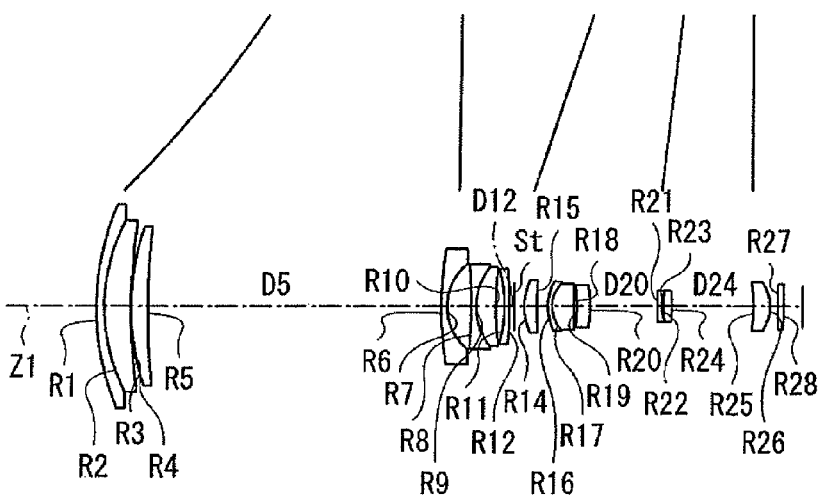
Figure 13A:
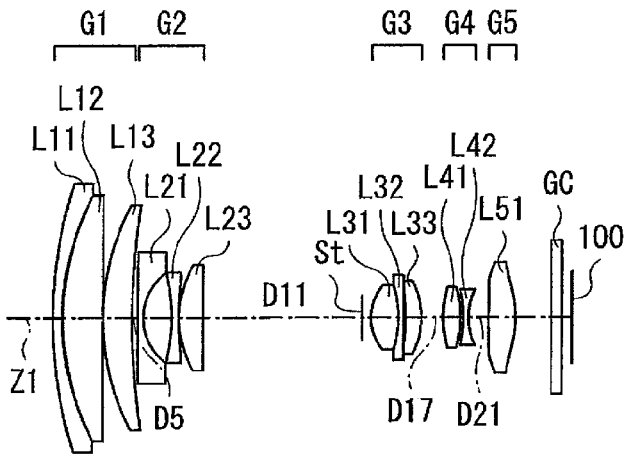
FIGS. 13A to 13C show a thirteenth structural example of the zoom lens and are cross-sectional views illustrating a lens corresponding to Numerical example 13.
Figure 13B:
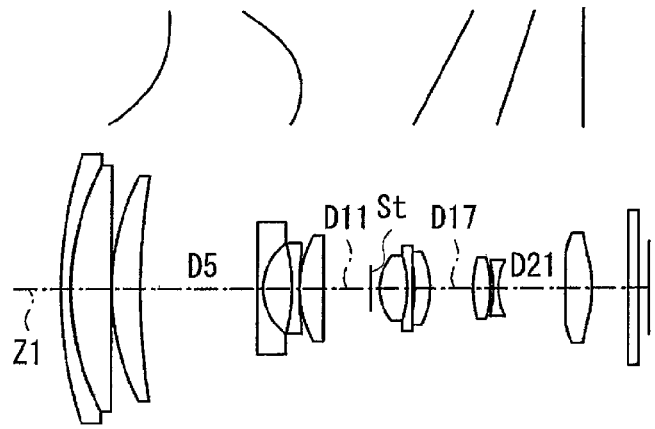
Figure 13C:
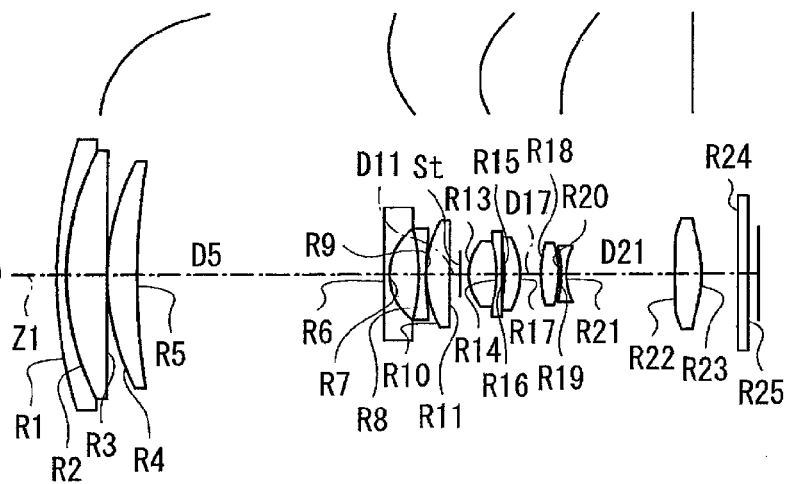
Figure 14A:
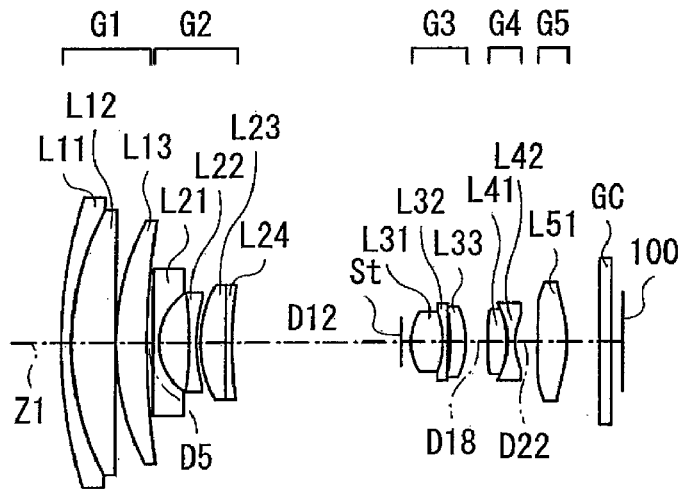
FIGS. 14A to 14C show a fourteenth structural example of the zoom lens and are cross-sectional views illustrating a lens corresponding to Numerical example 14.
Figure 14B:
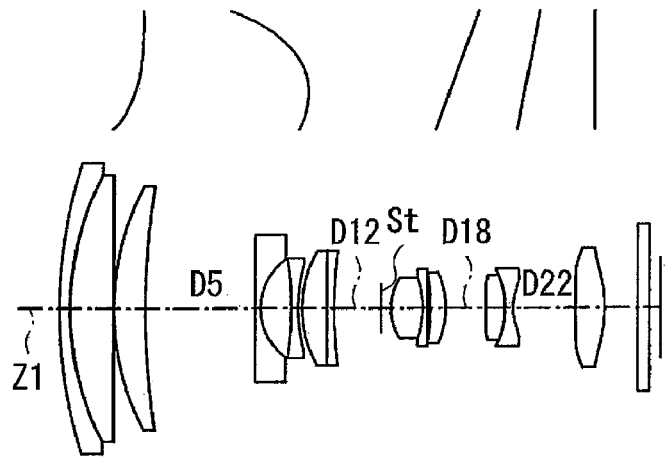
Figure 14C:
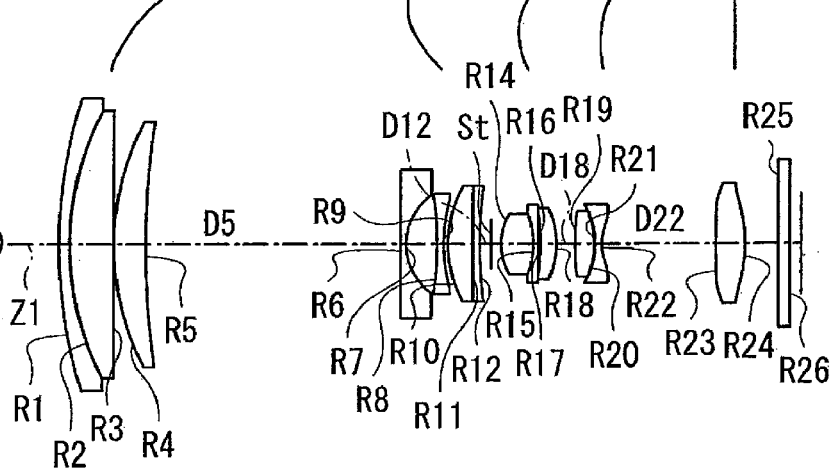
Figures 21A, 21B, 21C, 21D:
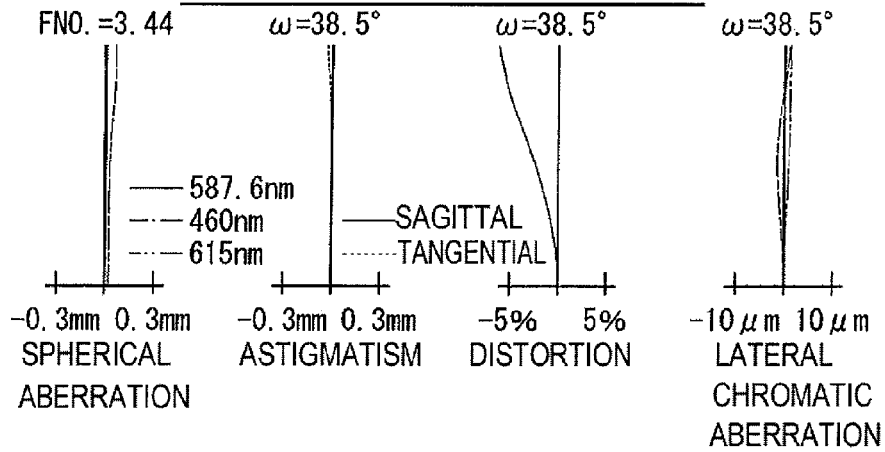
Figures 22A, 22B, 22C, 22D:
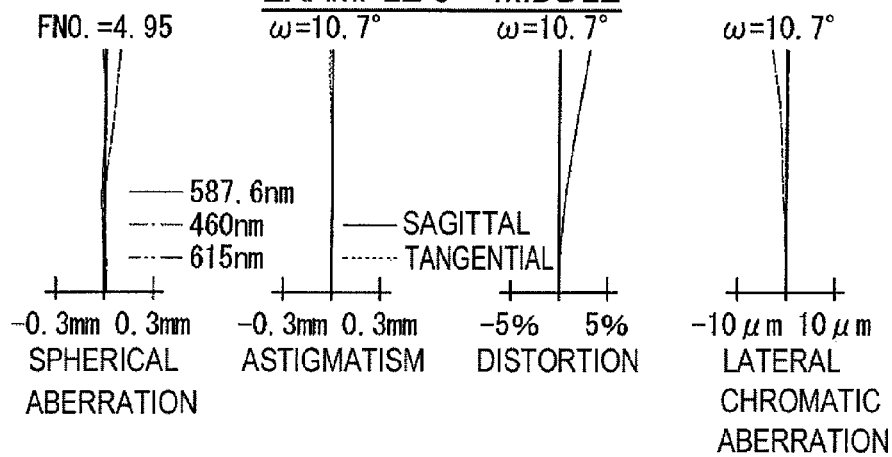
Figures 23A, 23B, 23C, 23D:
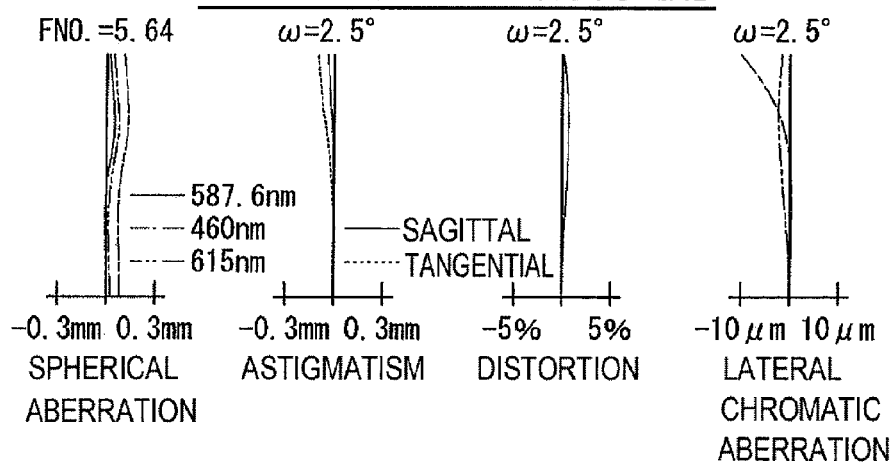
Figures 36A, 36B, 36C, 36D:
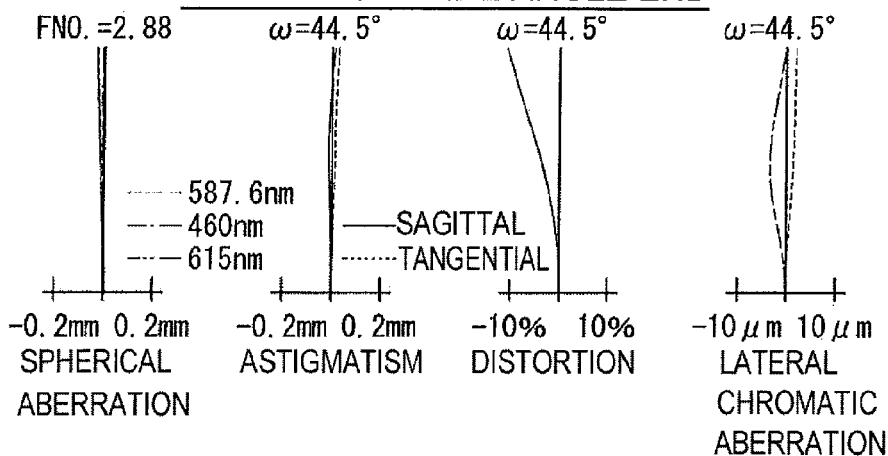
Figures 37A, 37B, 37C, 37D:
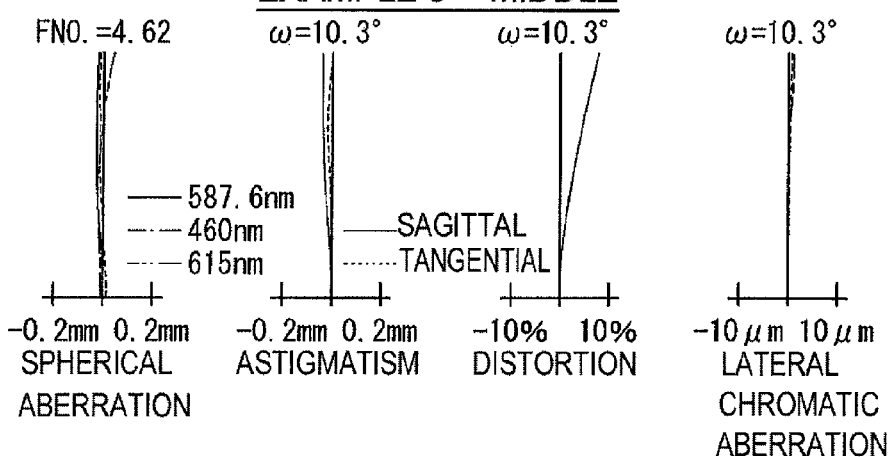
Figures 38A, 38B, 38C, 38D:
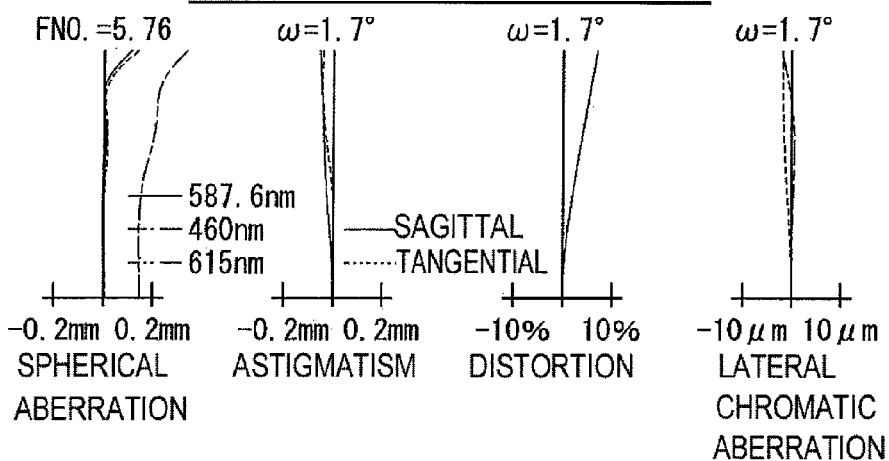
Figures 39A, 39B, 39C, 39D:
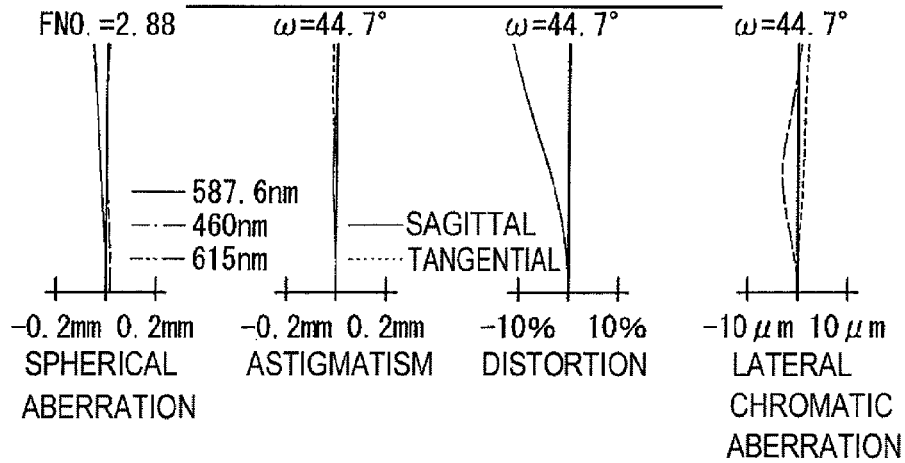
Figures 40A, 40B, 40C, 40D:
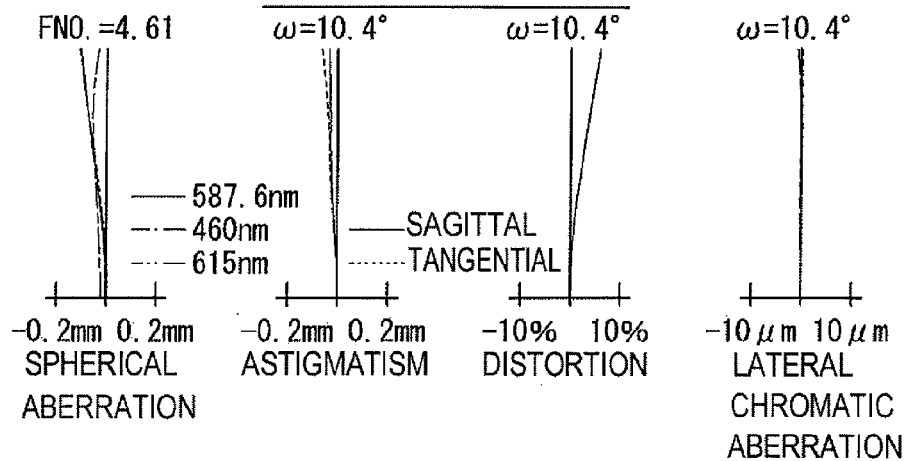
Figures 41A, 41B, 41C, 41D:
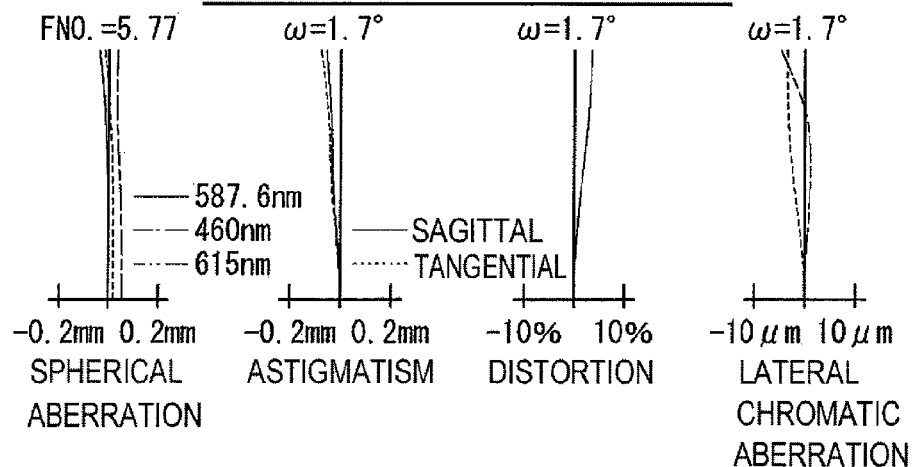
Figures 42A, 42B, 42C, 42D:
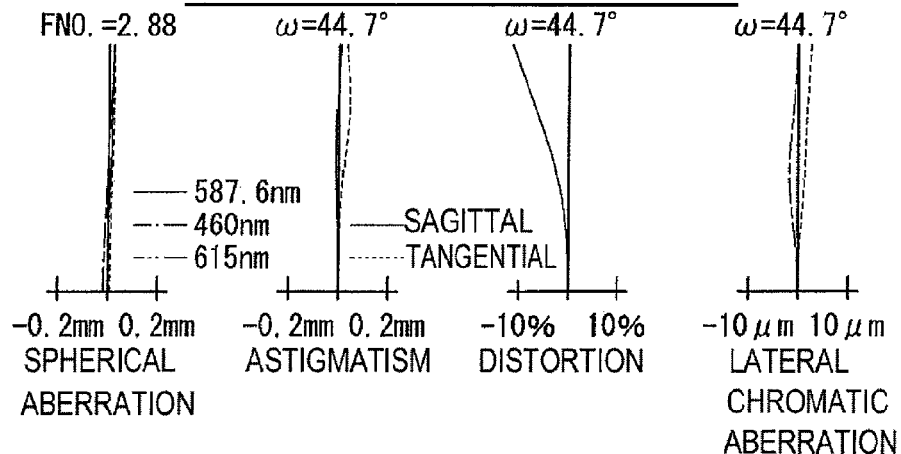
Figures 43A, 43B, 43C, 43D:
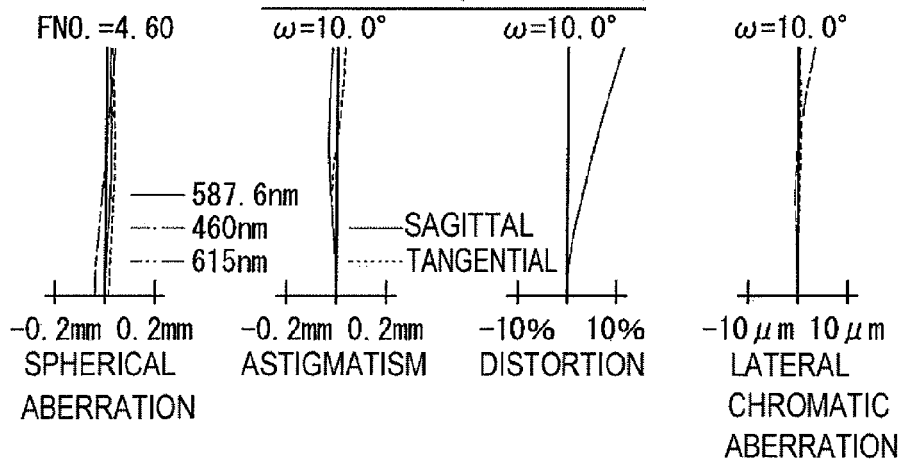
Figures 44A, 44B, 44C, 44D:
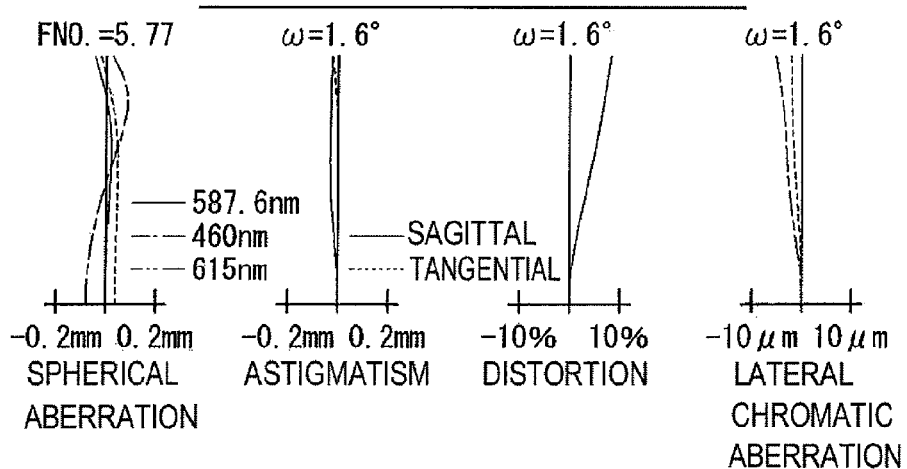
Figures 45A, 45B, 45C, 45D:
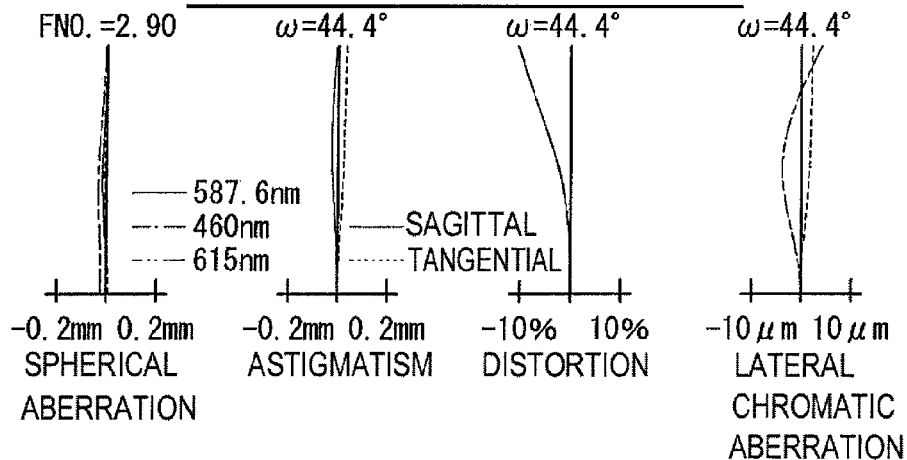
Figures 46A, 46B, 46C, 46D:
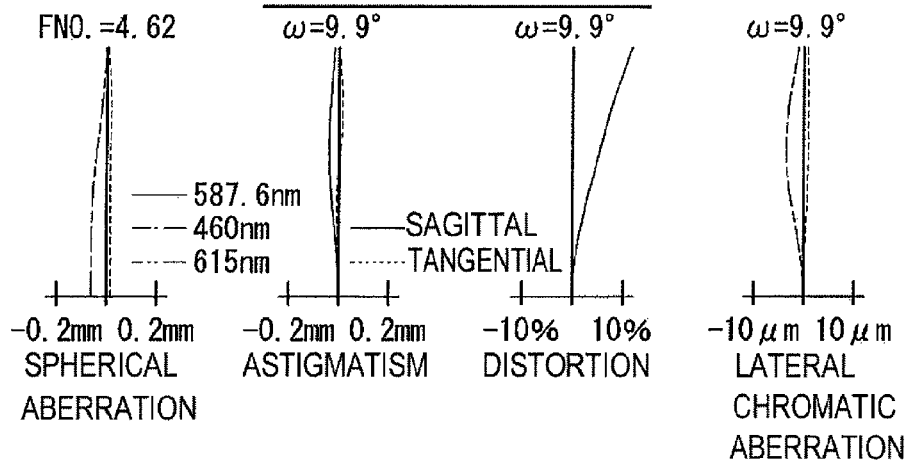
Figures 47A, 47B, 47C, 47D:
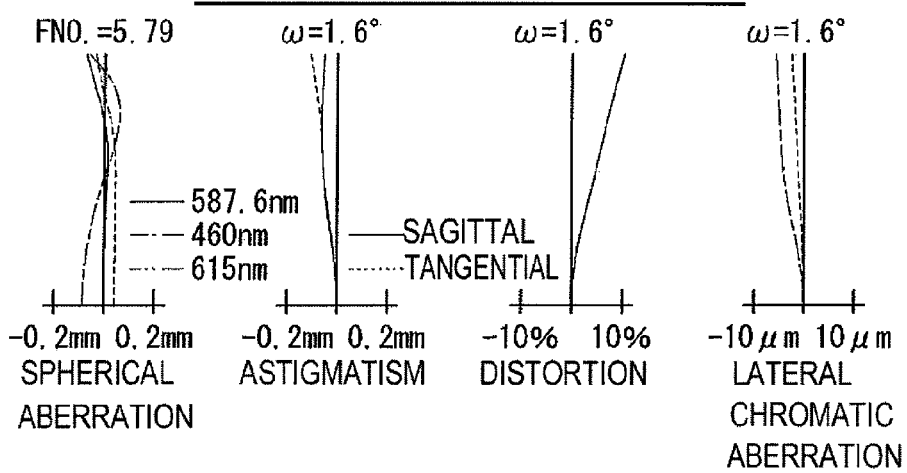
Figures 51A, 51B, 51C, 51D:
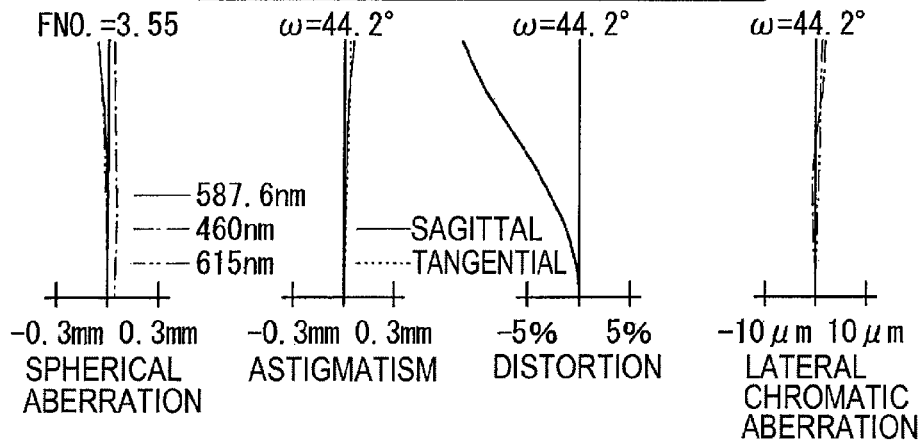
Figures 52A, 52B, 52C, 52D:
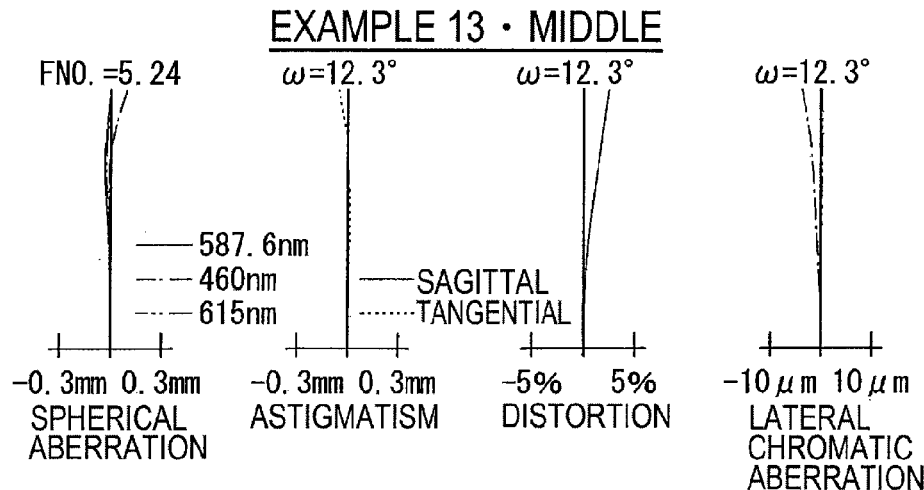
Figures 53A, 53B, 53C, 53D:
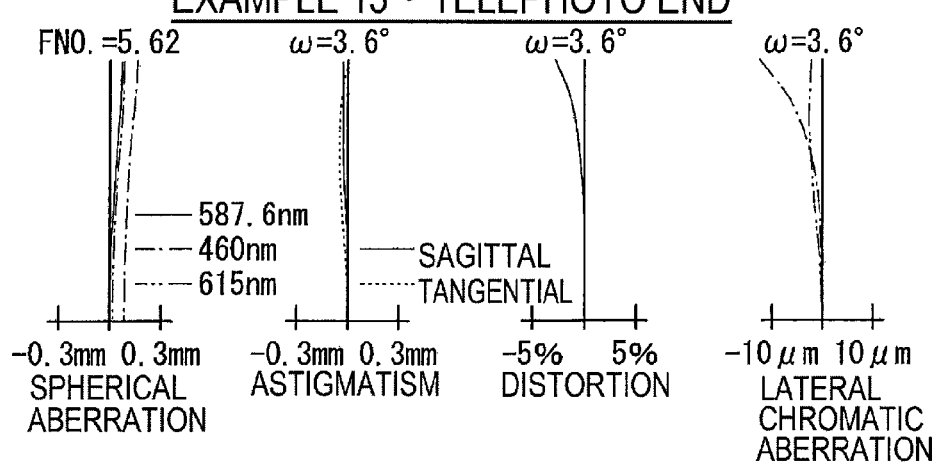
Figures 54A, 54B, 54C, 54D:
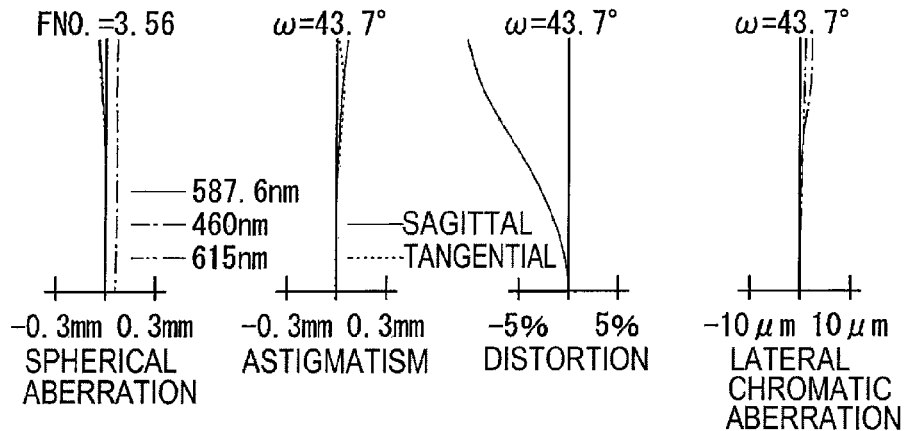
Figures 55A, 55B, 55C, 55D:
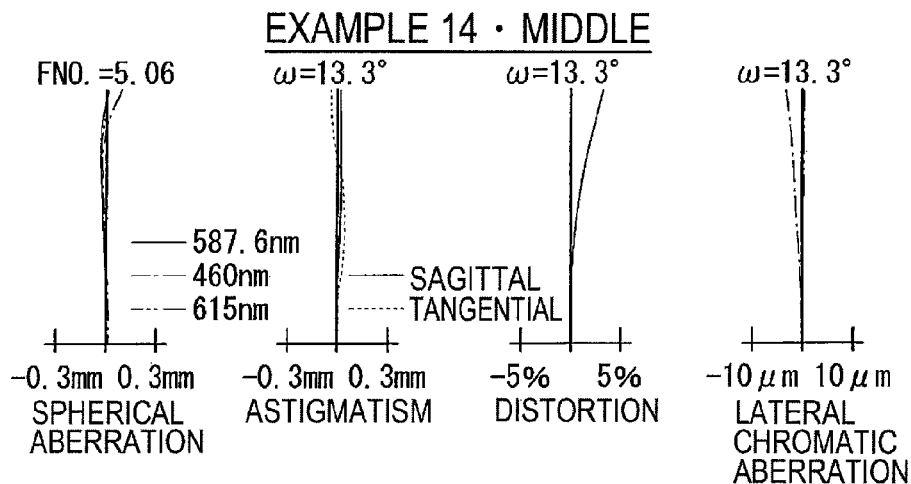
Figures 56A, 56B, 56C, 56D:
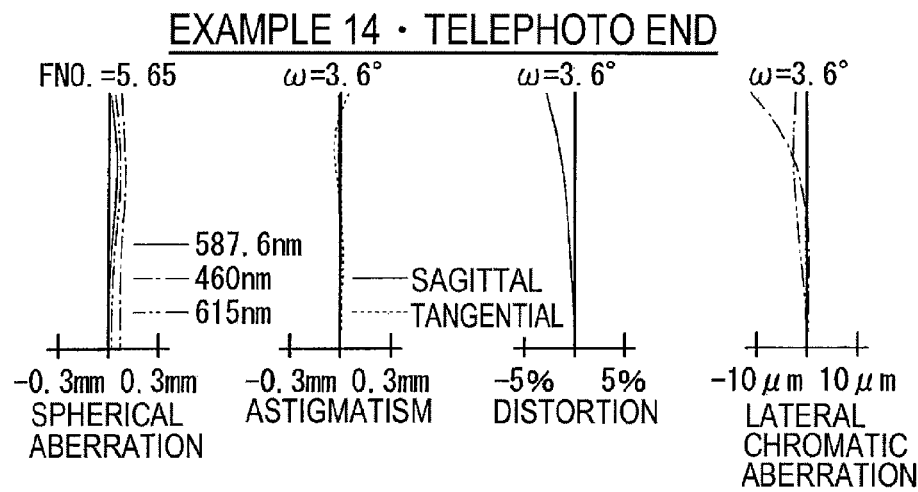

FIGS. 1A, 1B, and 1C show a first structural example of a zoom lens according to an embodiment of the invention. This structural example corresponds to the structure of a lens according to the following first numerical example. FIG. 1A corresponds to the arrangement of an optical system at a wide angle end (the shortest focal length), FIG. 1B corresponds to the arrangement of the optical system in a middle portion (a middle focal length), and FIG. 10 corresponds to the arrangement of the optical system at a telephoto end (the largest focal length). Similarly, FIGS. 2A, 2B, and 2C to FIGS. 14A, 14B, and 14C show the cross-sectional structures of second to fourteenth structural examples corresponding to lens structures according to second to fourteenth numerical examples, which will be described below. In FIGS. 1A, 1B, and 1C to FIGS. 14A, 14B, and 14C, Ri indicates the curvature radius of an i-th surface. In this case, the surface of a component closest to an object side is given number 1, and the surface number is sequentially increased toward an image side (image forming side). In addition, Di indicates the surface spacing between the i-th surface and an (i+1)-th surface on an optical axis Z1. For the symbol Di, a number is given only to the surface spacing (for example, D5 and D12) between the components that are moved when power varies.

The zoom lens includes a first lens group G1, a second lens group G2, a third lens group G3, a fourth lens group G4, and a fifth lens group G5 arranged in this order from the object side along the optical axis Z1. It is preferable that an optical aperture diaphragm St be arranged in the vicinity of the object side of the third lens group G3 between the second lens group G2 and the third lens group G3.

For example, the zoom lens may be provided in an information portable terminal, such as a PDA, in addition to an imaging apparatus, such as a video camera or a digital still camera. A member corresponding to the structure of an imaging unit of a camera provided with the zoom lens is arranged on the image side of the zoom lens. For example, an imaging device 100, such as a CCD (Charge Coupled Device) or a CMOS (Complementary Metal Oxide Semiconductor), is arranged on the image forming surface (imaging surface) of the zoom lens. The imaging device 100 outputs an image signal corresponding to an optical image formed by the zoom lens. At least the zoom lens and the imaging device 100 form an imaging apparatus according to this embodiment. Various optical members GC may be arranged between the last lens group (fifth lens group G5) and the imaging device 100 according to the structure of the camera provided with the lens. For example, a plate-shaped optical member, such as a cover glass for protecting the imaging surface or an infrared cut filter, may be provided.

The zoom lens is configured such that at least the first lens group G1, the third lens group G3, and the fourth lens group G4 are moved along the optical axis and the gaps between the lens groups are changed, thereby varying power. The fourth lens group G4 may be moved to bring the zoom lens into focus. It is preferable that the fifth lens group G5 be constantly fixed when power varies and during focusing. For example, the aperture diaphragm St is configured so as to be moved together with the third lens group G3.

Specifically, when power varies from the wide angle end to the middle portion and from the middle portion to the telephoto end, each lens group and the aperture diaphragm St are moved from the state shown in FIG. 1A to the state shown in FIG. 1B and from the state shown in FIG. 1B to the state shown in FIG. 10 while drawing the trajectories represented by solid lines in FIGS. 1A to 10.

In the structural examples shown in FIGS. 1A, 1B, and 10 to FIGS. 6A, 6B, and 6C, and FIGS. 8A, 8B, and 8C to FIGS. 14A, 14B, and 14C, when power varies, the first lens group G1, the second lens group G2, the third lens group G3, and the fourth lens group G4 are moved. In the structural example shown in FIGS. 7A, 7B, and 7C, when power varies, the second lens group G2 is fixed, and the first lens group G1, the third lens group G3, and the fourth lens group G4 are moved.

The first lens group G1 has a positive refractive power as a whole. The first lens group G1 may include, for example, three lenses. Specifically, it is preferable that the first lens group G1 include a cemented lens of a negative meniscus lens L11 having a convex surface facing an object side and a positive lens L12 having a convex surface facing the object side, and a positive meniscus lens L13 having a convex surface facing the object side, which are arranged in this order from the object side.

The second lens group G2 has a negative refractive power as a whole. The second lens group G2 may include, for example, four lenses L21 to L24. As in the structural example shown in FIG. 13A and 13B, the second lens group G2 may also include three lenses L21 to L23.

For example, as in the structural examples shown in FIGS. 8A, 8B, and 8C and FIGS. 10A, 10B, and 10C to FIGS. 12A, 12B, and 12C, the lenses L21 to L24 in the second lens group G2 may be, for example, a negative lens having a strong concave surface facing the image side, a cemented lens of a negative lens and a positive lens, and a negative lens having a strong concave surface facing the object side, which are arranged in this order from the object side. The term 'strong concave surface facing the image side' means that the negative refractive power of an image-side surface is higher than that of an object-side surface. For example, the image-side surface is a concave surface with a high negative refractive power and the object-side surface is a convex surface (a negative meniscus shape having a concave surface facing the image side). Alternatively, the term 'strong concave surface facing the image side' may include a plano-concave structure in which the image-side surface is a concave surface with a high negative refractive power and the object-side surface is flat or a biconcave structure in which the negative refractive power of a concave surface facing the image side is higher than that of a concave surface facing the object side.

The term 'strong concave surface facing the object side' means that the negative refractive power of an object-side surface is higher than that of an image-side surface. For example, the object-side surface is a concave surface with a high negative refractive power and the image-side surface is a convex surface (a negative meniscus shape having a concave surface facing the object side). The term 'strong concave surface facing the object side' may include a piano-concave structure in which the object-side surface is a concave surface with a high negative refractive power and the image-side surface is flat or a biconcave structure in which the negative refractive power of a concave surface facing the object side is higher than that of a concave surface facing the image side.

The third lens group G3 has a positive refractive power as a whole. As in the structural examples shown in FIGS. 1A, 1B, and 1C to FIGS. 7A, 7B, and 7C and FIGS. 12A, 12B, and 12C, for example, the third lens group G3 may include four lenses L31 to L34. Alternatively, as in the structural examples shown in FIGS. 8A, 8B, and 8C to FIGS. 11A, 11B, and 11C, the third lens group G3 may include five lenses L31 to L35. In addition, as in the structural examples shown in FIGS. 13A, 13B, and 13C and FIGS. 14A, 14B, and 14C, the third lens group G3 may include three lenses L31 to L33.

The fourth lens group G4 has a negative refractive power as a whole. The fourth lens group G4 may include two lenses, that is, a positive lens L41 and a negative lens L42. The zoom lens satisfies the following Condition expression 1 for the fourth lens group G4:

$0.05 < |f4|/ft < 0.25$     [Condition expression 1]

(where ft indicates the focal length of the entire system at the telephoto end and f4 indicates the focal length of the fourth lens group G4).

The fifth lens group G5 has a positive refractive power as a whole. It is preferable that the fifth lens group G5 include only one positive lens L51. In addition, it is preferable that the positive lens L51 have at least an aspheric surface on the object side.

It is preferable that the zoom lens be configured so as to selectively satisfy the following Condition expressions 2 to 4:

$0.4 < f1/ft < 1.3;$     [Condition expression 2]

$0.05 < f3/ft < 0.20;$ and     [Condition expression 3]

$0.05 < f5/ft < 0.4$     [Condition expression 4]

(where f1 indicates the focal length of the first lens group G1, f3 indicates the focal length of the third lens group G3, and f5 indicates the focal length of the fifth lens group G5).

It is preferable that the positive lens L12 of the cemented lens in the first lens group G1 satisfy the following Condition expressions 5 and 6:

$1.47 < N12 < 1.65;$ and     [Condition expression 5]

$62.0 < v12 < 75.0$     [Condition expression 6]

(where N12 indicates the refractive index of the positive lens L12 with respect to the d-line and v12 indicates the Abbe number of the positive lens L12 with respect to the d-line).

It is preferable that a lens (lens L21) closest to the object side in the second lens group G2 satisfy the following Condition expression 7:

$0.6(Ra-Rb)/(Ra+Rb) < 1.0$     [Condition expression 7]

(where Ra indicates the curvature radius of an object-side surface of the lens L21 and Rb indicates the curvature radius of an image-side surface of the lens L21).

It is preferable that the zoom lens satisfy the following Condition expression 8:

$0.05 < |f2/ft| < 0.10$     [Condition expression 8]

(where f2 indicates the focal length of the second lens group G2).

The first lens group G1 is disposed closer to the object side at the telephoto end than at the wide angle end, and preferably satisfies the following Condition expression 9:

$18 < ft/fw < 42$     [Condition expression 9]

(where fw indicates the focal length of the entire system at the wide angle end).

[Applications to Imaging Apparatus]

Figure 57A:
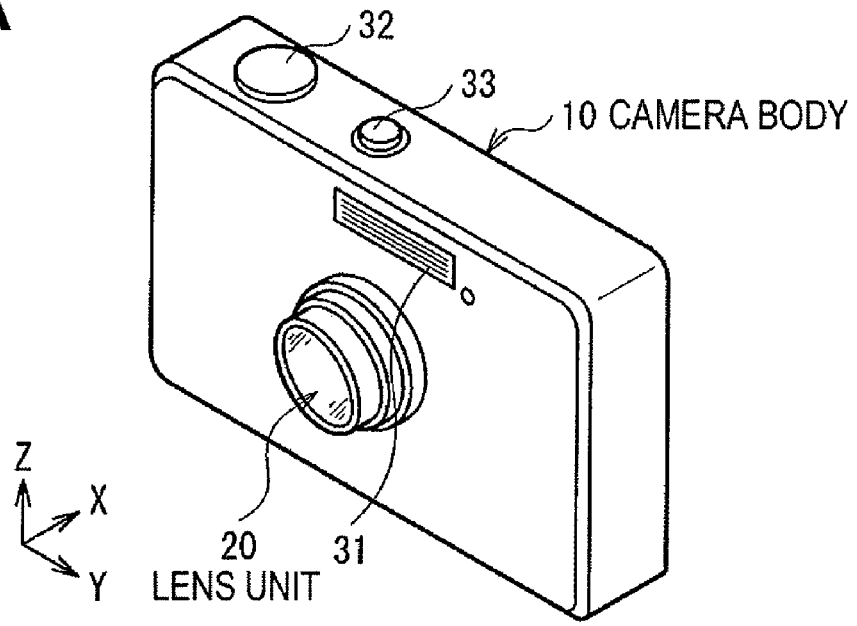
FIGS. 57A and 57B are outline views illustrating an example of the structure of a digital still camera as an imaging apparatus according to an embodiment of the invention.
Figure 57B:
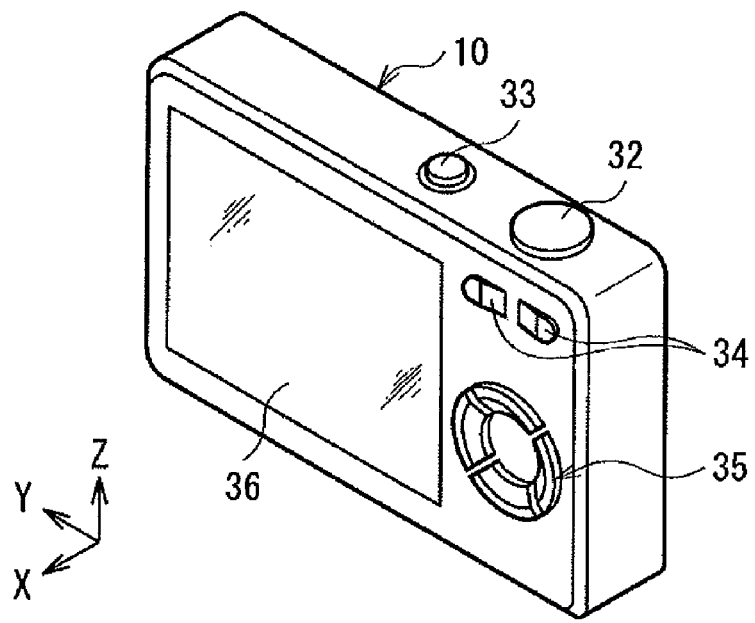

FIGS. 57A and 57B show a digital still camera as an example of the imaging apparatus according to this embodiment. In particular, FIG. 57A is a diagram illustrating the outward appearance of the digital still camera as viewed from the front side, and FIG. 57B is a diagram illustrating the digital still camera as viewed from the rear side. The digital still camera includes a camera body 10. A strobe light emitting unit 31 that emits strobe light is provided at an upper middle part of the front surface of the camera body 10. A release button 32 and a power button 33 are provided on the upper surface of the camera body 10. A display unit 36 and operating units 34 and 35 are provided on the rear surface of the camera body 10. The display unit 36 is for displaying a captured image. An imaging aperture through which light is incident from an imaging target is provided at the center of the front surface of the camera body 10, and a lens unit 20 is provided at a position corresponding to the imaging aperture. The lens unit 20 includes a lens member provided in a collapsible lens barrel. The camera body 10 includes, for example, an imaging device, such as a CCD that outputs an image signal corresponding to the object image formed by the lens unit 20, a signal processing circuit that processes the image signal output from the imaging device to generate an image, and a recording medium that stores the generated image. In the digital still camera, when the release button 32 is pressed, a still picture corresponding to one frame is captured and the captured image data is stored in the recording medium (not shown) in the camera body 10. The zoom lens according to this embodiment is used as the lens unit 20 of the camera. Therefore, it is possible to obtain a high-resolution image signal. The camera body 10 can generate a high-resolution image on the basis of the image signal.

The digital still camera may have a function of capturing a moving picture. For example, the operating units 34 and 35 may be used to select the moving picture imaging mode and the still picture imaging mode. When the moving picture imaging mode is selected, it is possible to continuously capture a plurality of still pictures per unit time, thereby obtaining moving picture data.

Figure 58:
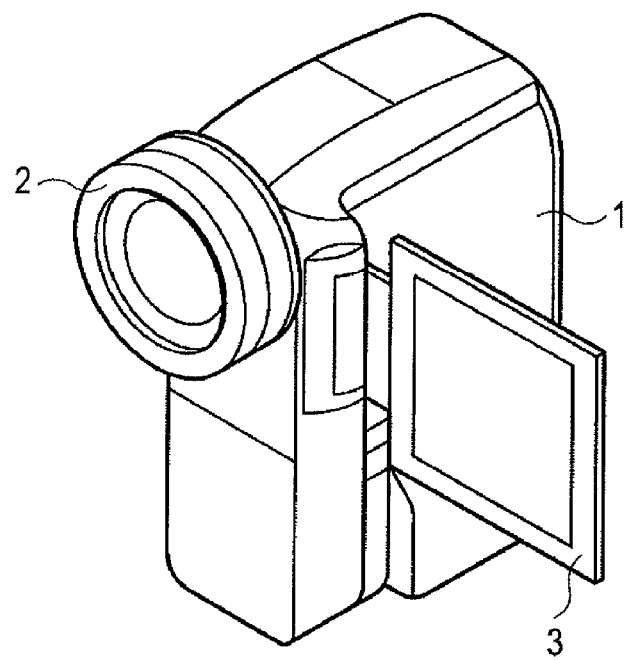
FIG. 58 is an outline view illustrating an example of the structure of a video camera as an imaging apparatus according to an embodiment of the invention.

FIG. 58 shows an example of the structure of a video camera, which is an example of an imaging apparatus provided with the zoom lens. The video camera includes a camera body 1 and an imaging lens 2 that is provided at an upper part of the camera body 1. The camera body 1 includes, for example, an imaging device, such as a CCD that outputs an image signal corresponding to the object image formed by the imaging lens 2, a signal processing circuit that processes the image signal output from the imaging device to generate an image, and a recording medium that stores the generated image. A display unit 3 for displaying the captured image is attached to the camera body 1. The zoom lens according to this embodiment may be applied to the imaging lens 2 of the video camera.

[Operation and Effects]

Next, the operation and effects of the zoom lens having the above-mentioned structure will be described.

The zoom lens is a five-group type including five lens groups with positive, negative, positive, negative, and positive refractive powers. According to this zoom lens, it is possible to obtain a high zoom ratio and optimize the structure of each lens group, as compared to a four-group type. Therefore, it is possible to obtain a zoom lens having the following operation and effects, a high zoom ratio, a small total length, and a small overall size. In addition, the imaging apparatus provided with the zoom lens uses a high-performance zoom lens with a high zoom ratio and a small size as the imaging lens. Therefore, it is possible to reduce the overall size of the apparatus while maintaining a high imaging performance, such as a high zoom ratio.

In the zoom lens, the fourth lens group G4 includes two lenses, that is, the positive lens L41 and the negative lens L42. Therefore, it is possible to prevent aberration generated from the fourth lens group G4 while using a small number of lenses, for example, two lenses. Therefore, it is possible to reduce the size of the zoom lens and effectively correct aberration in the entire power variation range. In addition, the fourth lens group G4 is moved in the optical axis direction for focusing. Therefore, it is possible to prevent a variation in aberration during focusing. In addition, since two groups of components are moved, it is possible to rapidly perform focusing.

The fifth lens group G5 includes only one positive lens L51, and at least an object-side surface of the positive lens L51 is an aspheric surface. Therefore, in particular, it is possible to effectively correct field curvature. The fifth lens group G5, which is the last lens group, is constantly fixed when power varies and during focusing. Therefore, when the zoom lens is provided in the camera, it is easy to obtain the imaging device 100 with a sealed structure and it is possible to prevent dust from adhering to the imaging device 100.

Condition expression 1 relates to the focal length of the fourth lens group G4. When Condition expression 1 is satisfied, it is possible to reduce the size of the optical system and effectively correct aberration in the entire power variation range. If the ratio is less than the lower limit of Condition expression 1, the refractive power of the fourth lens group G4 is strong, which is advantageous in reducing the size of the optical system. However, in this case, aberration generated from the fourth lens group G4 increases, and it is difficult to effectively correct aberration in the entire power variation range. If the ratio is more than the upper limit, the refractive power of the fourth lens group G4 is reduced, and it is difficult to reduce the size of the optical system.

In order to further improve the optical performance, it is preferable that the numerical range of Condition expression 1 satisfy the following Condition expression 1':

$$0.07 < |f4|/ft < 0.20 \qquad \text{[Condition expression 1']}$$

Condition expression 2 relates to the focal length of the first lens group G1. When Condition expression 2 is satisfied, it is possible to reduce the size of the optical system and effectively correct aberration in the entire power variation range. If the ratio is less than the lower limit of Condition expression 2, the refractive power of the first lens group G1 is strong, which is advantageous in reducing the size of the optical system. However, in this case, aberration generated from the first lens group G1 increases, and it is difficult to effectively correct aberration in the entire power variation range. If the ratio is more than the upper limit, the refractive power of the first lens group G1 is reduced, and the total length of the lens increases. In addition, the outside diameter of the first lens group G1 increases, and it is difficult to reduce the size of the optical system.

In order to further improve the optical performance, it is preferable that the numerical range of Condition expression 2 satisfy the following Condition expression 2':

$$0.5 < f1/ft < 0.6. \qquad \text{[Condition expression 2']}$$

Condition expression 3 relates to the focal length of the third lens group G3. When Condition expression 3 is satisfied, it is possible to reduce the size of the optical system and effectively correct the optical performance in the entire power variation range. If the ratio is less than the lower limit of Condition expression 3, the refractive power of the third lens group G3 increases, which is advantageous in reducing the size of the optical system. However, in this case, aberration generated from the third lens group G3 increases, and it is difficult to effectively correct aberration in the entire power variation range. If the ratio is more than the upper limit, the refractive power of the third lens group G3 is reduced. Therefore, the total length of the lens increases and it is difficult to reduce the size of the optical system.

In order to further improve the optical performance, it is preferable that the numerical range of Condition expression 3 satisfy the following Condition expression 3':

$0.08 < f3/ft < 0.15$         [Condition expression 3']

Condition expression 4 relates to the focal length of the fifth lens group G5. When Condition expression 4 is satisfied, influence on shading is reduced and it is possible to effectively correct the optical performance in the entire power variation range. If the ratio is less than the lower limit of Condition expression 4, the refractive power of the fifth lens group G5 increases, which is advantageous in reducing the size of the optical system. However, in this case, aberration generated from the fifth lens group G5 increases, and it is difficult to effectively correct aberration in the entire power variation range. If the ratio is more than the upper limit, the refractive power of the fifth lens group G5 is reduced. Therefore, the total length of the lens increases, which is disadvantageous in reducing the size of the optical system. In addition, an incident angle to the imaging device at a peripheral angle of view increases, which may have an influence on shading.

In order to further improve the optical performance, it is preferable that the numerical range of Condition expression 4 satisfy the following Condition expression 4':

$0.15 < f5/ft < 0.3$.         [Condition expression 4']

Condition expressions 5 and 6 relate to a material forming the positive lens L12 in the first lens group G1. When Condition expressions 5 and 6 are satisfied, it is possible to effectively correct the optical performance in the entire power variation range. If the refractive index is less than the lower limit of Condition expression 5, the Petzval sum increases, and field curvature at the telephoto end increases. If the refractive index is more than the upper limit of Condition expression 5, the critical angle of the total reflection conditions of an image-side surface of the positive lens L12 is reduced. Therefore, total reflection is likely to occur and stray light is likely to be generated. If the Abbe number is less than the lower limit of Condition expression 6, longitudinal chromatic aberration at the telephoto end increases. If the Abbe number is more than the upper limit, lateral chromatic aberration at the wide angle end increases.

Condition expression 7 relates to the optimal shape of the lens L21 closest to the object side in the second lens group G2. If the ratio is less than the lower limit of Condition expression 7, the diameter of the first lens group G1 increases, which is not suitable for widening the angle of view. If the ratio is more than the upper limit, interference between the first lens group G1 and the second lens group G2 is likely to occur. Therefore, it is difficult to maintain a high zoom ratio.

Condition expression 8 relates to the focal length of the second lens group G2. When Condition expression 8 is satisfied, it is possible to reduce the size of the optical system and effectively correct the optical performance in the entire power variation range. If the absolute value is less than the lower limit of Condition expression 8, the refractive power of the second lens group G2 is too strong, and it is difficult to sufficiently correct all aberrations. If the absolute value is more than the upper limit, the refractive power of the second lens group G2 is insufficient. Therefore, the zoom ratio is not obtained, or the total length increases.

Condition expression 9 relates to a zoom ratio suitable for the zoom lens according to this embodiment. If the ratio is less than the lower limit of Condition expression 9, it is difficult to obtain a desired zoom ratio. If the ratio is more than the upper limit, it is difficult to prevent all aberrations due to power variation.

In order to further improve the optical performance, it is preferable that the numerical range of Condition expression 9 satisfy the following Condition expression 9'.

$24 < ft/fw < 32$.         [Condition expression 9']

EXAMPLES

Next, detailed numerical examples of the zoom lens according to this embodiment will be described. A plurality of numerical examples will be partially described below.

Numerical Example 1

[Table 1] to [Table 3] show detailed lens data corresponding to the structure of the zoom lens shown in FIGS. 1A, 1B, and 1C. In particular, [Table 1] show basic lens data, and [Table 2] and [Table 3] show the other data. In the lens data shown in Table 1, an i-th (i=1 to 28) surface number is written in the field of a surface number Si. In this case, the surface of a component closest to the object side in the zoom lens shown in [Table 1] is given number 1, and the surface number is sequentially increased toward the image side. The curvature radius (mm) of the i-th surface from the object side is written in the field of a curvature radius Ri so as to correspond to Ri shown in FIG. 10. The spacing (mm) between the i-th surface Si and an (i+1)-th surface Si+1 on the optical axis is written in the field of a surface spacing Di. The refractive index between the i-th surface Si and the (i+1)-th surface Si+1 from the object side with respect to the d-line (wavelength: 587.6 nm) is written in the field of Ndi. The Abbe number of a j-th optical component from the object side with respect to the d-line is written in the field of vdj. In addition, [Table 1] also shows the paraxial focal length f (mm), the angle of view (2ω), and the F number (FNO.) of the entire system at the wide angle end and the telephoto end as the other data.

In the zoom lens according to Example 1, the spacing between the lens groups is changed when power varies. Therefore, the surface spacing D5 between the first lens group and the second lens group, the surface spacing D12 between the second lens group and the third lens group, the surface spacing D20 between the third lens group and the fourth lens group, and the surface spacing D24 between the fourth lens group and the fifth lens group vary. [Table 2] shows the values of the surface spacings D5, D12, D20, and D24 at the wide angle end, the middle portion, and the telephoto end as data when power varies.

In the lens data shown in [Table 1], the symbol '*' added to the left side of the surface number indicates an aspheric lens surface. In the zoom lens according to Example 1, both surfaces S19 and S20 of the lens (lens L34) closest to the image side in the third lens group G3 and both surfaces S25 and S26 of the positive lens L51 in the fifth lens group G5 are all aspheric surfaces. The basic lens data shown in [Table 1] includes the curvature radii of the aspheric surfaces near the optical axis.

[Table 3] shows aspheric data of the zoom lens according to Example 1. In the numerical values represented as the aspheric data in [Table 3], 'E' indicates the exponent of 10, and the number represented by an exponential function having 10 as a base is multiplied by a number before 'E'. For example, '1.0E-02' indicates '$1.0 \times 10^{-2}$'.

The aspheric data of the zoom lens according to Example 1 includes coefficients $A_n$ and K of Aspheric expression A given below:

$$Z = C \cdot h^2 / \{1 + (1 - K \cdot C^2 \cdot h^2)^{1/2}\} + \Sigma A_n \cdot h^n \quad \text{[Aspheric expression A]}$$

(where n is an integer equal to or greater than 3, Z indicates the depth (mm) of an aspheric surface, h indicates the distance (height) (mm) from the optical axis to a lens surface, K indicates eccentricity, C indicates a paraxial curvature=1/R (R is a paraxial curvature radius), and $A_n$ indicates an n-order aspheric coefficient).

Specifically, Z indicates the length (mm) of a perpendicular line that drops from a point on an aspheric surface at a height h from the optical axis to a tangent plane to the top of the aspheric surface (a plane vertical to the optical axis).

In the zoom lens according to Example 1, each of the aspheric surfaces is represented by effectively using coefficients $A_3$ to $A_{10}$ as the aspheric coefficient $A_n$ on the basis of Aspheric expression A.

TABLE 1

Example 1 - Basic lens data

| | Si Surface Number | Ri (Curvature Radius) | Di (Surface Spacing) | Ndi (Refractive Index) | vdj (Abbe Number) |
|---|---|---|---|---|---|
| G1 | 1 | 71.9913 | 1.10 | 1.80610 | 33.3 |
| | 2 | 26.0420 | 3.91 | 1.60300 | 65.4 |
| | 3 | 0.0000 | 0.10 | 1.00000 | |
| | 4 | 27.7214 | 2.90 | 1.58913 | 61.1 |
| | 5 | 153.7984 | D5 (Variable) | 1.00000 | |
| G2 | 6 | 206.6958 | 0.65 | 1.83481 | 42.7 |
| | 7 | 6.5770 | 3.02 | 1.00000 | |
| | 8 | −17.4715 | 0.65 | 1.83481 | 42.7 |
| | 9 | 54.8125 | 0.10 | 1.00000 | |
| | 10 | 15.5166 | 2.35 | 1.92286 | 20.9 |
| | 11 | −53.0000 | 0.65 | 1.83481 | 42.7 |
| | 12 | 69.6117 | D12 (Variable) | 1.00000 | |
| | 13 | — | 0.80 | 1.00000 | |

TABLE 1-continued

Example 1 - Basic lens data

| | Si Surface Number | Ri (Curvature Radius) | Di (Surface Spacing) | Ndi (Refractive Index) | vdj (Abbe Number) |
|---|---|---|---|---|---|
| | (Aperture Diaphragm) | | | | |
| | 14 | 7.7933 | 2.00 | 1.49700 | 81.5 |
| | 15 | 20.0141 | 0.10 | 1.00000 | |
| G3 | 16 | 9.1427 | 2.34 | 1.48749 | 70.2 |
| | 17 | −23.1000 | 0.55 | 1.68893 | 31.1 |
| | 18 | 19.2995 | 0.34 | 1.00000 | |
| | *19 | 62.5130 | 1.35 | 1.50957 | 56.5 |
| | *20 | −11.5299 | D20 (Variable) | 1.00000 | |
| G4 | 21 | 11.0846 | 1.90 | 1.54814 | 45.8 |
| | 22 | −101.9667 | 0.13 | 1.00000 | |
| | 23 | −28.0970 | 0.60 | 1.83400 | 37.2 |
| | 24 | 6.9999 | D24 (Variable) | 1.00000 | |
| G5 | *25 | 1000.2060 | 2.25 | 1.50957 | 56.5 |
| | *26 | −9.2077 | 5.76 | 1.00000 | |
| GC | 27 | ∞ | 0.80 | 1.51680 | 64.2 |
| | 28 | ∞ | | 1.00000 | |

(*Aspheric surface) (f = 5.16~87.35 mm, FNO. = 3.19~5.62, 2ω = 80.0°~5.0°)

TABLE 2

Example 1 • Variable surface spacing data

| Surface Spacing | Wide angle end (f = 5.16) | Middle (f = 19.70) | Telephoto end (f = 87.35) |
|---|---|---|---|
| D5 | 0.45 | 15.76 | 30.91 |
| D12 | 21.98 | 9.13 | 0.99 |
| D20 | 2.66 | 5.23 | 6.76 |
| D24 | 2.80 | 8.70 | 11.40 |

TABLE 3

Example1 • Aspheric data

| Surface Number | Coefficient | | | |
|---|---|---|---|---|
| | K | A3 | A4 | A5 |
| 19 | −9.648363E+00 | −2.134507E−04 | −9.452175E−04 | 1.595050E−05 |
| 20 | −2.533267E+00 | −1.763036E−04 | −3.289256E−04 | −3.739065E−05 |
| 25 | −9.854095E+00 | −4.784694E−04 | 3.810926E−04 | −8.541460E−05 |
| 26 | −3.887721E−01 | −3.570100E−04 | 3.389720E−04 | −1.427870E−04 |

| | A6 | A7 | A8 | A9 |
|---|---|---|---|---|
| 19 | 2.579918E−05 | −3.581682E−06 | −1.872912E−06 | 2.714998E−07 |
| 20 | 6.500520E−05 | −2.503331E−06 | −3.886440E−06 | −2.680967E−07 |
| 25 | 2.882354E−05 | 8.314988E−07 | −4.598345E−07 | −7.956938E−08 |
| 26 | 4.459697E−05 | −1.059193E−06 | −5.689852E−07 | −3.592591E−08 |

| | A10 |
|---|---|
| 19 | 1.969609E−07 |
| 20 | 3.906097E−07 |
| 25 | 1.991214E−08 |
| 26 | 1.840304E−08 |

Numerical Examples 2 to 14

Figure 2A:
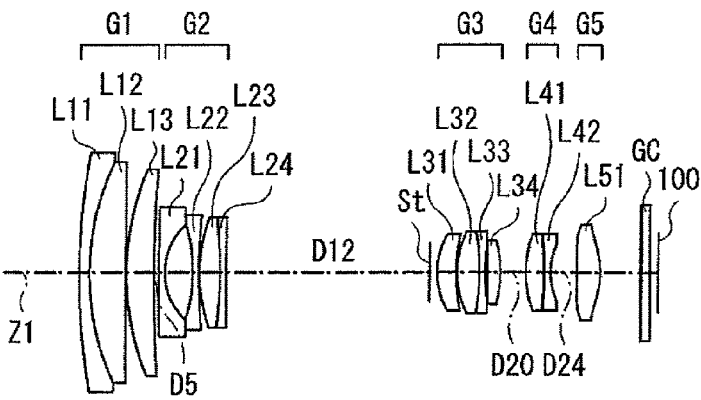
FIGS. 2A to 2C show a second structural example of the zoom lens and are cross-sectional views illustrating a lens corresponding to Numerical example 2.
Figure 2B:
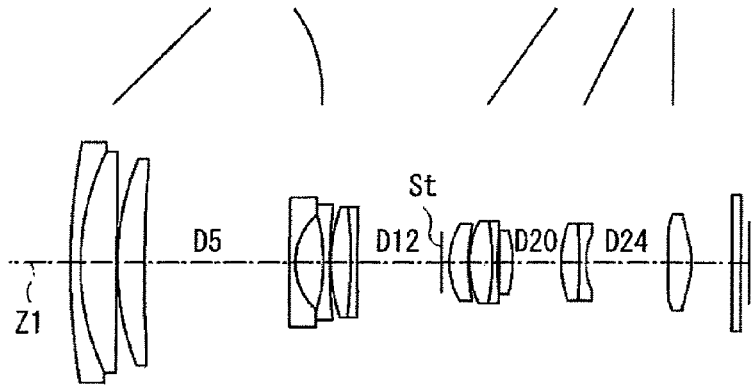
Figure 2C:
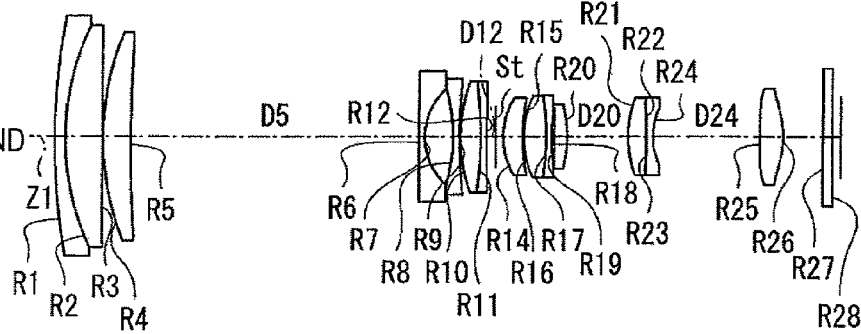
Figure 3A:
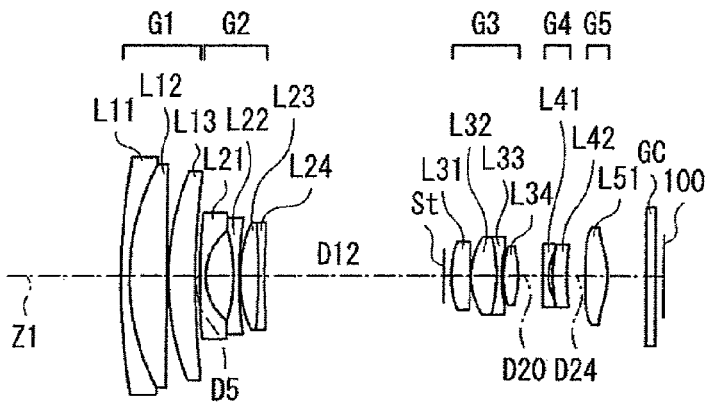
FIGS. 3A to 3C show a third structural example of the zoom lens and are cross-sectional views illustrating a lens corresponding to Numerical example 3.
Figure 3B:
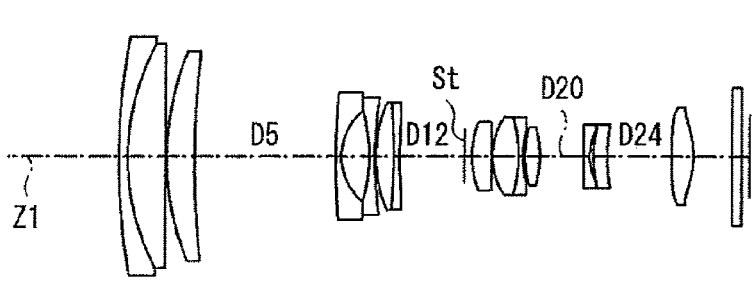
Figure 3C:
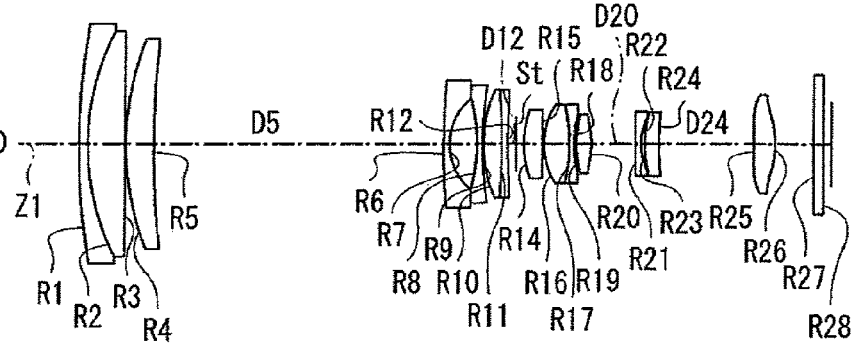
Figure 4A:
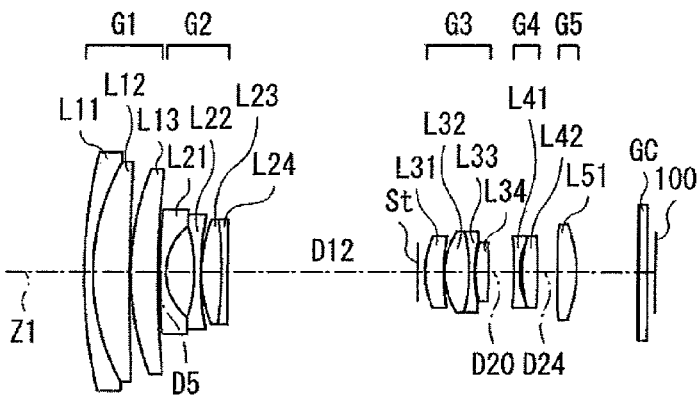
FIGS. 4A to 4C show a fourth structural example of the zoom lens and are cross-sectional views illustrating a lens corresponding to Numerical example 4.
Figure 4B:
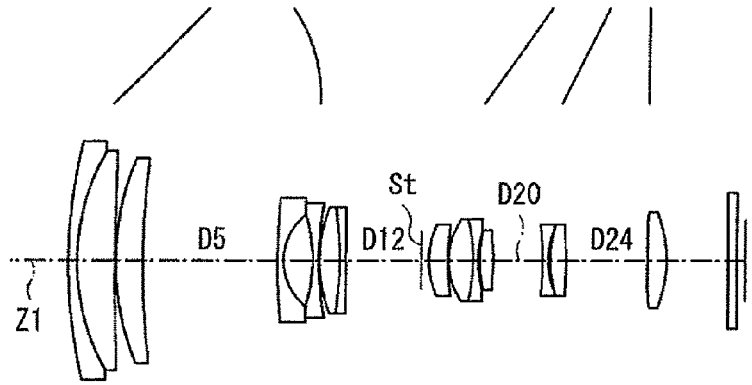
Figure 4C:
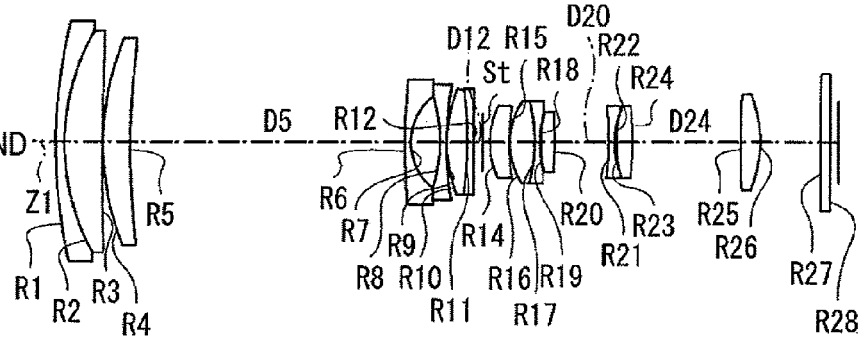
Figure 5A:
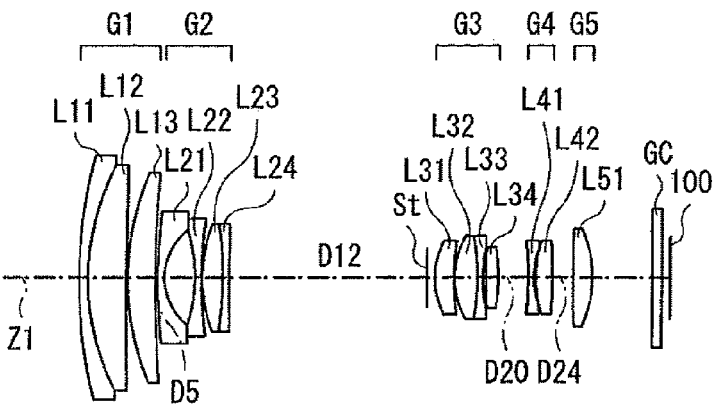
FIGS. 5A to 5C show a fifth structural example of the zoom lens and are cross-sectional views illustrating a lens corresponding to Numerical example 5.
Figure 5B:
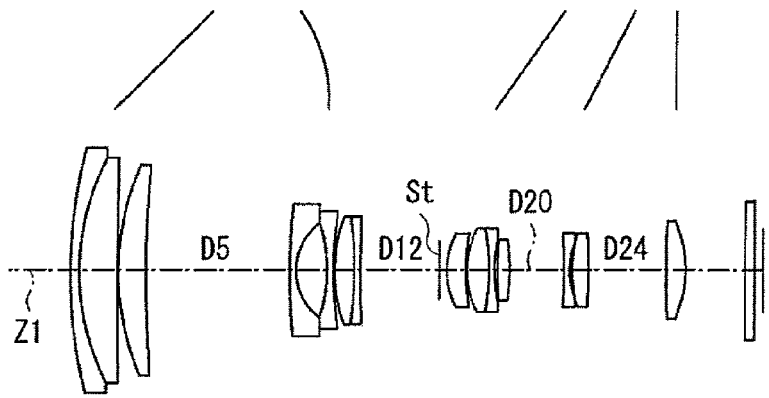
Figure 5C:
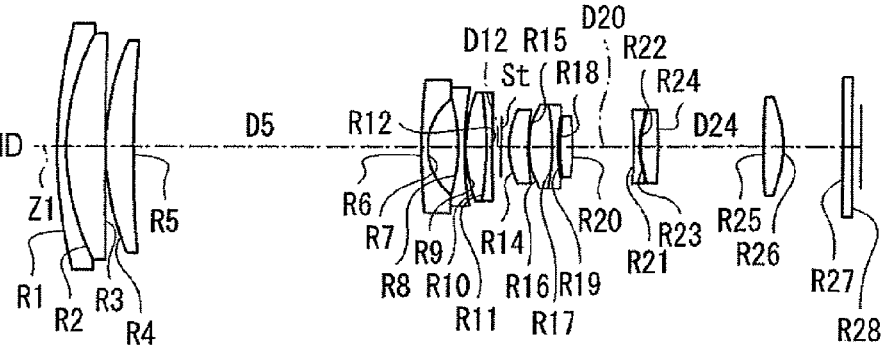
Figure 6A:
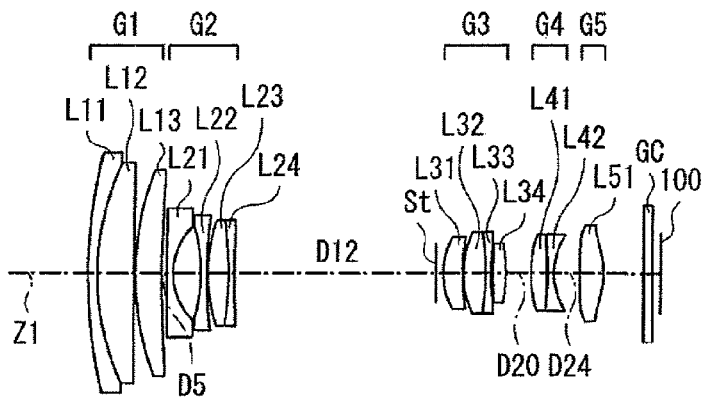
FIGS. 6A to 6C show a sixth structural example of the zoom lens and are cross-sectional views illustrating a lens corresponding to Numerical example 6.
Figure 6B:
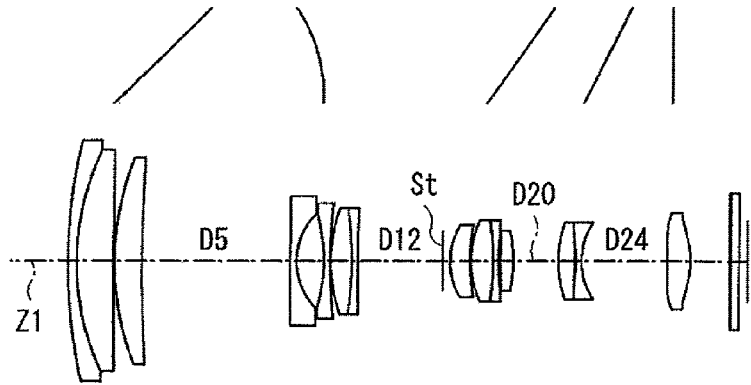
Figure 6C:
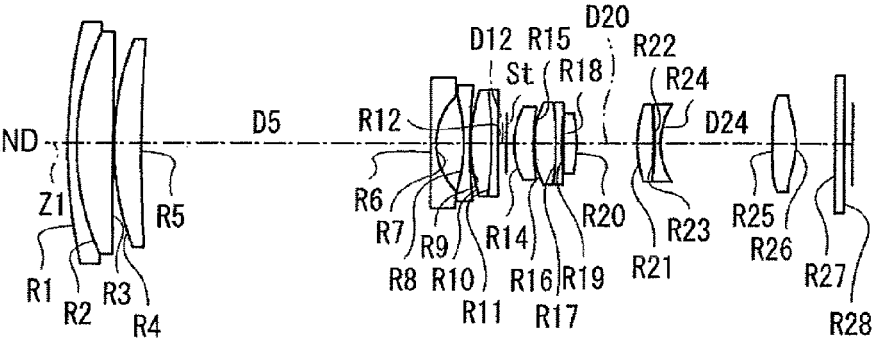
Figure 7A:
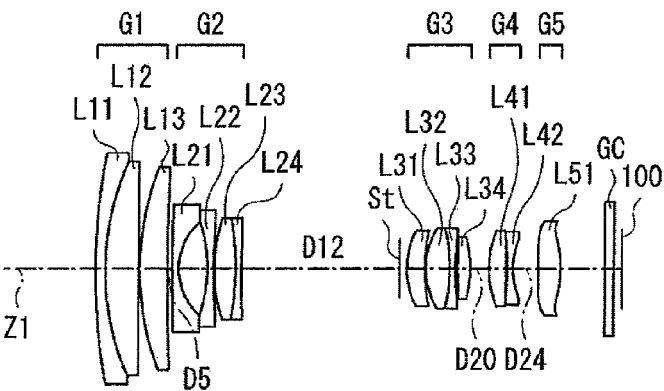
FIGS. 7A to 7C show a seventh structural example of the zoom lens and are cross-sectional views illustrating a lens corresponding to Numerical example 7.
Figure 7B:
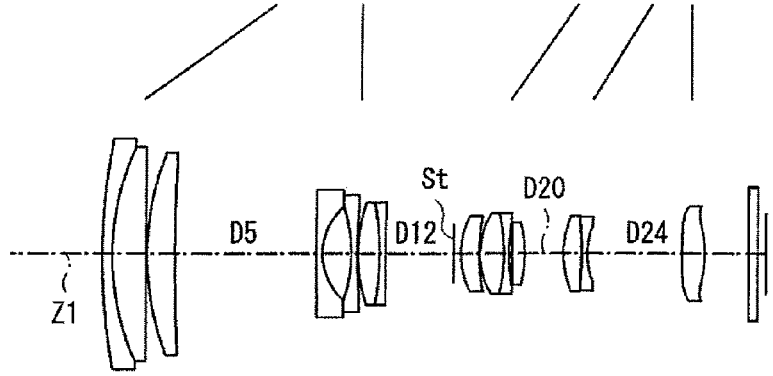
Figure 7C:
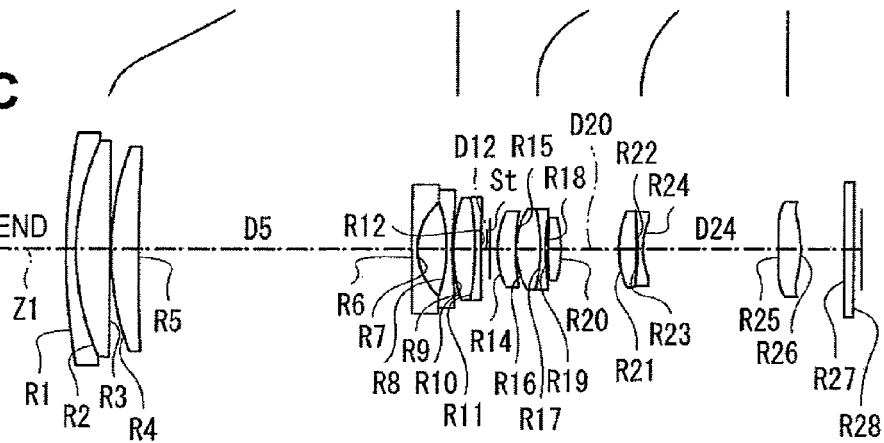
Figure 8A:
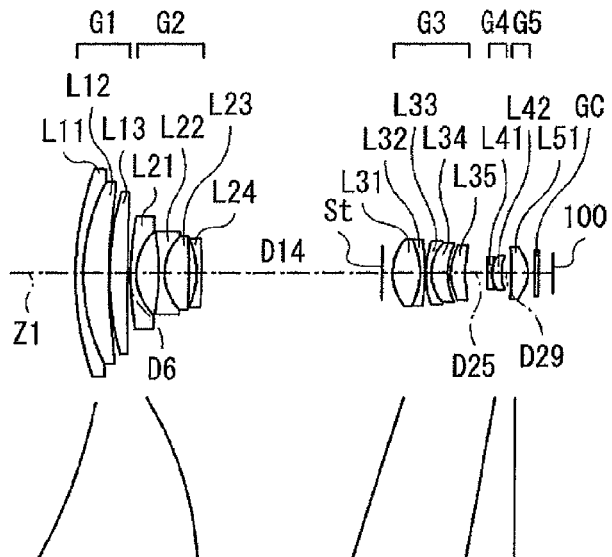
FIGS. 8A to 8C show an eighth structural example of the zoom lens and are cross-sectional views illustrating a lens corresponding to Numerical example 8.
Figure 8B:
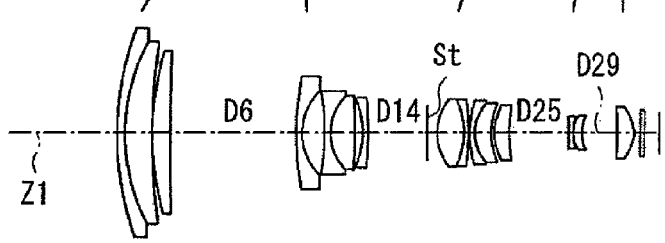
Figure 8C:
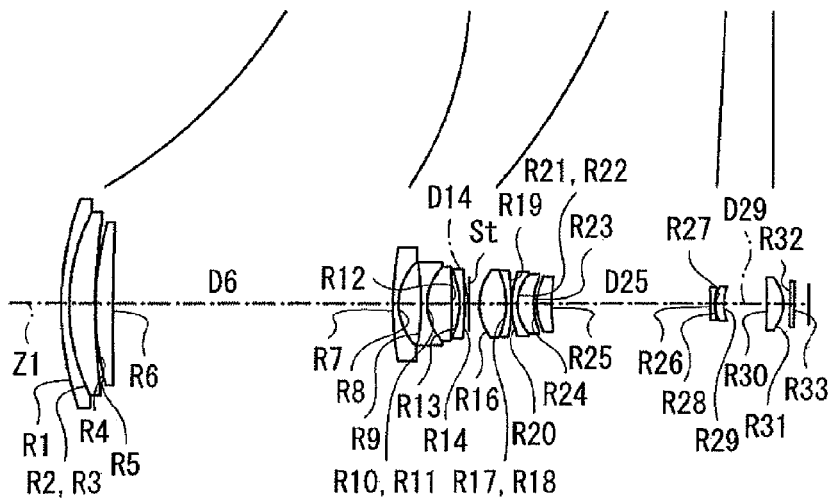
Figure 9A:
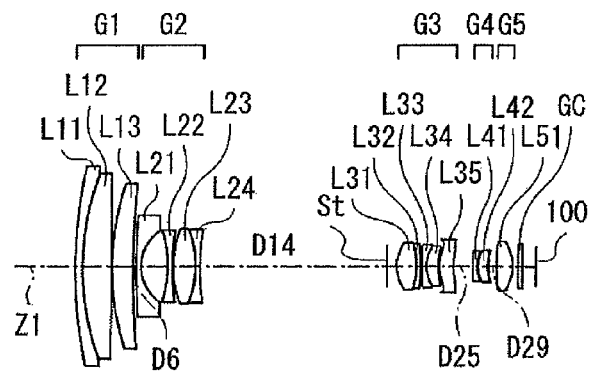
FIGS. 9A to 9C show a ninth structural example of the zoom lens and are cross-sectional views illustrating a lens corresponding to Numerical example 9.
Figure 9B:
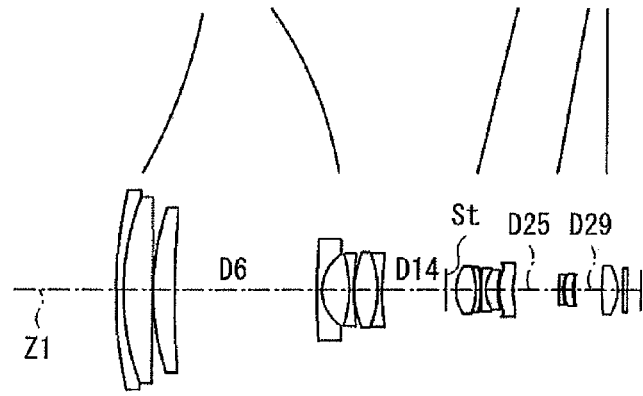
Figure 9C:
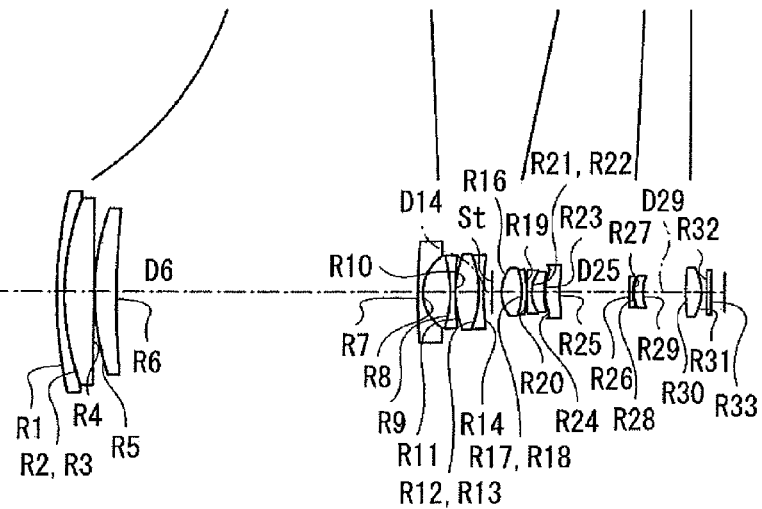

Similar to Numerical example 1, [Table 4] to [Table 6] show detailed lens data corresponding to the structure of the zoom lens shown in FIGS. 2A, 2B, and 2C as Numerical example 2. Similarly, [Table 7] to [Table 42] show detailed lens data corresponding to the structure of the zoom lenses shown in FIGS. 3A, 3B, and 3C to FIGS. 14A, 14B, and 14C as Numerical examples 3 to 14.

In the zoom lenses according to Numerical examples 2 to 7 and Numerical example 12, the same surfaces as those in the zoom lens according to Example 1 are aspheric surfaces.

In the zoom lenses according to Numerical examples 8 to 11, in addition to the lens (lens L35) closest to the image side in the third lens group G3 and the positive lens L51 in the fifth lens group G5, both surfaces of the lens (lens L42) closest to the image side in the fourth lens group G4 are aspheric surfaces.

In Numerical examples 8 to 11, a cemented surface of the cemented lens includes an adhesive layer. For example, in Numerical example 8, the second surface in the first lens group G1 is the adhesive layer.

In the zoom lenses according to Numerical examples 13 and 14, in addition to the lens (lens L35) closest to the image side in the third lens group G3 and the positive lens L51 in the fifth lens group G5, both surfaces of the lens (lens L41) closest to the object side in the fourth lens group G4 are aspheric surfaces.

TABLE 4

Example 2 - Basic lens data

| | Si Surface Number | Ri (Curvature Radius) | Di (Surface Spacing) | Ndi (Refractive Index) | vdj (Abbe Number) |
|---|---|---|---|---|---|
| G1 | 1 | 66.8681 | 1.10 | 1.80610 | 33.3 |
| | 2 | 26.0362 | 3.91 | 1.59240 | 68.3 |
| | 3 | 1116.5056 | 0.10 | 1.00000 | |
| | 4 | 27.9266 | 2.90 | 1.60311 | 60.6 |
| | 5 | 151.5617 | D5 (Variable) | 1.00000 | |
| | 6 | 343.5062 | 0.65 | 1.83481 | 42.7 |

TABLE 4-continued

Example 2 - Basic lens data

| | Si Surface Number | Ri (Curvature Radius) | Di (Surface Spacing) | Ndi (Refractive Index) | vdj (Abbe Number) |
|---|---|---|---|---|---|
| G2 | 7 | 6.6485 | 3.00 | 1.00000 | |
| | 8 | −16.5548 | 0.65 | 1.83481 | 42.7 |
| | 9 | 50.7853 | 0.10 | 1.00000 | |
| | 10 | 16.3428 | 2.15 | 1.92286 | 20.9 |
| | 11 | −44.6593 | 0.65 | 1.83481 | 42.7 |
| | 12 | 131.4918 | D12 (Variable) | 1.00000 | |
| | 13 (Aperture Diaphragm) | — | 0.80 | 1.00000 | |
| G3 | 14 | 7.6339 | 2.06 | 1.49700 | 81.5 |
| | 15 | 20.0000 | 0.10 | 1.00000 | |
| | 16 | 9.5020 | 2.41 | 1.48749 | 70.2 |
| | 17 | −25.4831 | 0.55 | 1.72151 | 29.2 |
| | 18 | 22.2110 | 0.29 | 1.00000 | |
| | *19 | 66.0979 | 1.40 | 1.50957 | 56.5 |
| | *20 | −11.7784 | D20 (Variable) | 1.00000 | |
| G4 | 21 | 11.3677 | 1.90 | 1.56732 | 42.8 |
| | 22 | −67.0191 | 0.13 | 1.00000 | |
| | 23 | −24.8752 | 0.60 | 1.83400 | 37.2 |
| | 24 | 7.0000 | D24 (Variable) | 1.00000 | |
| G5 | *25 | 800.0000 | 2.50 | 1.50957 | 56.5 |
| | *26 | −8.9906 | 5.38 | 1.00000 | |
| GC | 27 | ∞ | 0.80 | 1.51680 | 64.2 |
| | 28 | ∞ | | 1.00000 | |

(*Aspheric surface) (f = 5.16~87.38 mm, FNO. = 3.17~5.58, 2ω = 80.0°~5.0°)

TABLE 5

Example 2 • Variable surface spacing data

| Surface Spacing | Wide angle end (f = 5.16) | Middle (f = 19.71) | Telephoto end (f = 87.38) |
|---|---|---|---|
| D5 | 0.54 | 15.53 | 30.80 |
| D12 | 21.77 | 8.99 | 0.95 |
| D20 | 2.70 | 5.20 | 6.56 |
| D24 | 2.80 | 8.78 | 11.42 |

TABLE 6

Examplex2 • Aspheric data

| Surface Number | Coefficient | | | |
|---|---|---|---|---|
| | K | A3 | A4 | A5 |
| 19 | −9.965540E+00 | −1.447471E−04 | −8.964145E−04 | −2.934165E−05 |
| 20 | −1.126179E−01 | −1.116571E−04 | −8.135067E−05 | −5.019425E−05 |
| 25 | 5.771174E+00 | −1.021914E−03 | 6.425988E−04 | −1.159299E−04 |
| 26 | −5.060846E−01 | −1.021320E−03 | 5.703618E−04 | −1.142886E−04 |

| | A6 | A7 | A8 | A9 |
|---|---|---|---|---|
| 19 | 1.962454E−05 | 5.760658E−07 | −1.554265E−06 | 6.165674E−07 |
| 20 | 4.462308E−05 | 1.183224E−06 | −2.367717E−06 | −1.115702E−07 |
| 25 | 3.694817E−05 | 2.925596E−07 | −5.967485E−07 | 1.943024E−08 |
| 26 | 3.434187E−05 | −1.421865E−07 | −5.331912E−07 | 6.279815E−09 |

| | A10 |
|---|---|
| 19 | 4.383324E−08 |
| 20 | 2.449134E−07 |
| 25 | 1.219722E−08 |
| 26 | 1.984348E−08 |

TABLE 7

Example 3. Basic lens data

| | Si Surface Number | Ri (Curvature Radius) | Di (Surface Spacing) | Ndi (Refractive Index) | vdj (Abbe Number) |
|---|---|---|---|---|---|
| G1 | 1 | 67.6169 | 0.92 | 1.66680 | 33.1 |
| | 2 | 23.9792 | 4.01 | 1.59240 | 68.3 |
| | 3 | −3292.9011 | 0.10 | 1.00000 | |
| | 4 | 27.8001 | 2.90 | 1.58913 | 61.1 |
| | 5 | 85.8694 | D5 (Variable) | 1.00000 | |
| G2 | 6 | 79.2937 | 0.62 | 1.83481 | 42.7 |
| | 7 | 5.8951 | 2.97 | 1.00000 | |
| | 8 | −16.7627 | 0.60 | 1.83481 | 42.7 |
| | 9 | 38.4892 | 0.10 | 1.00000 | |
| | 10 | 13.1340 | 1.98 | 1.92286 | 20.9 |
| | 11 | −59.8242 | 0.61 | 1.83481 | 42.7 |
| | 12 | 47.2360 | D12 (Variable) | 1.00000 | |
| | 13 (Aperture Diaphragm) | — | 0.80 | 1.00000 | |
| G3 | 14 | 9.6470 | 2.07 | 1.49700 | 81.5 |
| | 15 | −293.5054 | 0.10 | 1.00000 | |
| | 16 | 7.1849 | 2.73 | 1.51742 | 52.4 |
| | 17 | −15.9799 | 0.50 | 1.90366 | 31.3 |
| | 18 | 11.1541 | 0.23 | 1.00000 | |
| | *19 | 9.8692 | 1.58 | 1.50957 | 56.5 |
| | *20 | −9.5574 | D20 (Variable) | 1.00000 | |
| G4 | 21 | −358.4537 | 0.60 | 1.74400 | 44.8 |
| | 22 | 5.5013 | 0.40 | 1.00000 | |

TABLE 7-continued

Example 3. Basic lens data

| | Si Surface Number | Ri (Curvature Radius) | Di (Surface Spacing) | Ndi (Refractive Index) | vdj (Abbe Number) |
|---|---|---|---|---|---|
| | 23 | 12.8229 | 1.50 | 1.60342 | 38.0 |
| | 24 | 23.8161 | D24 (Variable) | 1.00000 | |
| G5 | *25 | 7300329.2 | 2.29 | 1.50957 | 56.5 |
| | *26 | −8.8760 | 5.22 | 1.00000 | |
| GC | 27 | ∞ | 0.80 | 1.51680 | 64.2 |
| | 28 | ∞ | | 1.00000 | |

(*Aspheric surface)
(f = 5.16~87.35 mm, FNO. = 3.44~5.64, 2ω = 77.0°~5.0°)

TABLE 8

Example 3 • Variable surface spacing data

| Surface Spacing | Wide angle end (f = 5.16) | Middle (f = 19.71) | Telephoto end (f = 87.35) |
|---|---|---|---|
| D5 | 0.48 | 15.03 | 30.68 |
| D12 | 19.29 | 7.00 | 0.94 |
| D20 | 2.64 | 4.72 | 4.67 |
| D24 | 2.00 | 6.85 | 10.12 |

TABLE 9

Examplex3 • Aspheric data

| Surface Number | Coefficient | | | |
|---|---|---|---|---|
| | K | A3 | A4 | A5 |
| 19 | −8.780035E−01 | −1.873029E−04 | −1.692091E−04 | −4.587026E−05 |
| 20 | −1.970847E+00 | −9.255691E−05 | 9.809922E−05 | 2.230503E−04 |
| 25 | −6.880576E+00 | 1.343451E−04 | 3.025104E−04 | 5.890671E−05 |
| 26 | −9.565580E−02 | 1.568458E−04 | 3.276317E−04 | 6.742872E−07 |

| | A6 | A7 | A8 | A9 |
|---|---|---|---|---|
| 19 | −1.638556E−06 | 9.285803E−06 | −1.372724E−06 | 4.642541E−07 |
| 20 | −8.528989E−05 | 2.511457E−06 | 5.847589E−06 | −1.282919E−06 |
| 25 | 8.424108E−06 | 1.578394E−06 | 1.245058E−07 | 6.831967E−09 |
| 26 | 5.552843E−06 | 1.481199E−06 | 3.486331E−07 | 3.561377E−08 |

| | A10 | A11 | A12 | A13 |
|---|---|---|---|---|
| 19 | 2.763176E−07 | −1.072086E−07 | 2.804133E−08 | −7.362073E−09 |
| 20 | 1.461903E−06 | 3.935388E−08 | −2.368413E−07 | −4.529370E−08 |
| 25 | −1.740539E−09 | −1.112959E−09 | −2.127023E−10 | −5.176384E−14 |
| 26 | 2.168695E−10 | −1.868240E−10 | −7.053253E−11 | −1.568253E−11 |

| | A14 |
|---|---|
| 19 | 3.102828E−09 |
| 20 | 3.146051E−08 |
| 25 | 8.720428E−12 |
| 26 | −6.777681E−12 |

TABLE 10

Example 4 . Basic lens data

| | Si Surface Number | Ri (Curvature Radius) | Di (Surface Spacing) | Ndi (Refractive Index) | νdj (Abbe Number) |
|---|---|---|---|---|---|
| G1 | 1 | 51.6162 | 0.95 | 1.69895 | 30.1 |
| | 2 | 22.9999 | 4.01 | 1.61800 | 63.3 |
| | 3 | 239.4631 | 0.10 | 1.00000 | |
| | 4 | 27.7183 | 2.90 | 1.58913 | 61.1 |
| | 5 | 83.7434 | D5 (Variable) | 1.00000 | |
| G2 | 6 | 72.7337 | 0.65 | 1.83481 | 42.7 |
| | 7 | 5.9606 | 3.14 | 1.00000 | |
| | 8 | −15.3280 | 0.65 | 1.83481 | 42.7 |
| | 9 | 31.0484 | 0.10 | 1.00000 | |
| | 10 | 14.6352 | 2.17 | 1.92286 | 20.9 |
| | 11 | −38.5092 | 0.65 | 1.83400 | 37.2 |
| | 12 | 248.1158 | D12 (Variable) | 1.00000 | |
| | 13 (Aperture Diaphragm) | — | 0.80 | 1.00000 | |
| G3 | 14 | 8.6662 | 2.03 | 1.49700 | 81.5 |
| | 15 | 22.4121 | 0.10 | 1.00000 | |
| | 16 | 7.5924 | 2.64 | 1.51680 | 64.2 |
| | 17 | −16.7471 | 0.55 | 1.64769 | 33.8 |
| | 18 | 12.2101 | 0.15 | 1.00000 | |
| | *19 | 15.0000 | 1.43 | 1.50957 | 56.5 |
| | *20 | −18.7486 | D20 (Variable) | 1.00000 | |
| | 21 | −33.8182 | 0.60 | 1.80440 | 39.6 |
| | 22 | 7.9509 | 0.21 | 1.00000 | |
| G4 | 23 | 11.4517 | 1.75 | 1.51742 | 52.4 |
| | 24 | −39.5251 | D24 (Variable) | 1.00000 | |
| G5 | *25 | 0.0000 | 2.07 | 1.50957 | 56.5 |
| | *26 | −11.8511 | 7.61 | 1.00000 | |
| GC | 27 | ∞ | 0.80 | 1.51680 | 64.2 |
| | 28 | ∞ | | 1.00000 | |

(*Aspheric surface)
(f = 5.17~87.49 mm, FNO. = 3.27~5.41, 2ω = 80.2°~5.2°)

TABLE 11

Example 4 • Variable surface spacing data

| Surface Spacing | Wide angle end (f = 5.17) | Middle (f = 19.74) | Telephoto end (f = 87.49) |
|---|---|---|---|
| D5 | 0.31 | 14.66 | 29.54 |
| D12 | 20.42 | 8.09 | 0.94 |
| D20 | 2.72 | 5.29 | 5.77 |
| D24 | 2.10 | 8.77 | 11.71 |

TABLE 12

Examplex4 • Aspheric data

| Surface Number | Coefficient | | | |
|---|---|---|---|---|
| | K | A3 | A4 | A5 |
| 19 | 5.280304E−01 | −9.955849E−05 | 8.699638E−05 | −1.446832E−07 |
| 20 | 4.526606E+00 | −3.251713E−05 | 1.062300E−03 | −4.861474E−06 |
| 25 | −6.300450E−02 | −2.822183E−04 | 1.329657E−05 | 7.468943E−06 |
| 26 | 4.919017E−01 | −4.264268E−04 | 1.266833E−05 | 1.485232E−05 |

| | A6 | A7 | A8 | A9 |
|---|---|---|---|---|
| 19 | 4.834857E−05 | 1.325395E−06 | 1.650031E−06 | −1.978240E−07 |
| 20 | 8.014090E−05 | 3.319075E−06 | −1.860974E−06 | −1.122635E−07 |
| 25 | 1.041405E−05 | 2.031823E−07 | 4.145146E−07 | −2.197005E−08 |
| 26 | −3.471652E−06 | −5.706959E−07 | 1.128762E−06 | 1.310341E−08 |

| | A10 |
|---|---|
| 19 | 1.674941E−07 |
| 20 | 4.362996E−07 |
| 25 | −1.180965E−08 |
| 26 | −2.690938E−08 |

TABLE 13

Example 5 . Basic lens data

|  | Si Surface Number | Ri (Curvature Radius) | Di (Surface Spacing) | Ndi (Refractive Index) | νdj (Abbe Number) |
|---|---|---|---|---|---|
| G1 | 1 | 48.2238 | 0.95 | 1.72151 | 29.2 |
|  | 2 | 24.4521 | 4.01 | 1.48749 | 70.2 |
|  | 3 | 445.5736 | 0.10 | 1.00000 |  |
|  | 4 | 26.5707 | 2.90 | 1.58913 | 61.1 |
|  | 5 | 119.9854 | D5 (Variable) | 1.00000 |  |
| G2 | 6 | 69.3494 | 0.65 | 1.83481 | 42.7 |
|  | 7 | 6.0786 | 3.23 | 1.00000 |  |
|  | 8 | −15.2585 | 0.65 | 1.83481 | 42.7 |
|  | 9 | 38.7583 | 0.10 | 1.00000 |  |
|  | 10 | 15.3216 | 2.12 | 1.92286 | 20.9 |
|  | 11 | −35.7608 | 0.65 | 1.83400 | 37.2 |
|  | 12 | 137.1305 | D12 (Variable) | 1.00000 |  |
|  | 13 (Aperture Diaphragm) | — | 0.80 | 1.00000 |  |
| G3 | 14 | 7.9347 | 2.00 | 1.49700 | 81.5 |
|  | 15 | 20.0000 | 0.10 | 1.00000 |  |
|  | 16 | 8.3349 | 2.45 | 1.56883 | 56.4 |
|  | 17 | −20.8419 | 0.55 | 1.71736 | 29.5 |
|  | 18 | 14.8495 | 0.30 | 1.00000 |  |

TABLE 13-continued

Example 5 . Basic lens data

|  | Si Surface Number | Ri (Curvature Radius) | Di (Surface Spacing) | Ndi (Refractive Index) | νdj (Abbe Number) |
|---|---|---|---|---|---|
| G4 | *19 | 29.8000 | 1.34 | 1.50957 | 56.5 |
|  | *20 | −14.0988 | D20 (Variable) | 1.00000 |  |
|  | 21 | −41.3030 | 0.60 | 1.80610 | 40.9 |
|  | 22 | 7.6641 | 0.22 | 1.00000 |  |
|  | 23 | 12.3393 | 1.75 | 1.52249 | 59.8 |
|  | 24 | −50.7488 | D24 (Variable) | 1.00000 |  |

TABLE 13-continued

Example 5 . Basic lens data

|  | Si Surface Number | Ri (Curvature Radius) | Di (Surface Spacing) | Ndi (Refractive Index) | νdj (Abbe Number) |
|---|---|---|---|---|---|
| G5 | *25 | 6775423.4 | 2.00 | 1.50957 | 56.5 |
|  | *26 | −11.4351 | 7.33 | 1.00000 |  |
| GC | 27 | ∞ | 0.80 | 1.51680 | 64.2 |
|  | 28 | ∞ |  | 1.00000 |  |

(*Aspheric surface)
(f = 5.16~87.34 mm, FNO. = 3.33~5.54, 2ω = 79.8°~5.2°)

TABLE 14

Example 5 • Variable surface spacing data

| Surface Spacing | Wide angle end (f = 5.16) | Middle (f = 19.71) | Telephoto end (f = 87.34) |
|---|---|---|---|
| D5 | 0.31 | 15.03 | 30.03 |
| D12 | 20.97 | 8.23 | 0.94 |
| D20 | 3.04 | 5.73 | 6.46 |
| D24 | 2.10 | 8.06 | 11.04 |

TABLE 15

Examplex 5 • Aspheric data

| Surface Number | Coefficient | | | |
|---|---|---|---|---|
|  | K | A3 | A4 | A5 |
| 19 | 9.983565E+00 | −3.713400E−04 | −3.383228E−04 | −4.492311E−05 |
| 20 | −1.975272E−00 | −3.301664E−04 | 5.918666E−04 | −9.804764E−05 |
| 25 | 1.000000E+01 | −8.393865E−05 | −3.853863E−06 | −5.037903E−06 |
| 26 | −6.724496E+00 | −1.301040E−04 | −7.347265E−04 | 5.543615E−05 |

| | A6 | A7 | A8 | A9 |
|---|---|---|---|---|
| 19 | 2.590086E−05 | −2.531534E−06 | 3.579483E−06 | 2.848921E−07 |
| 20 | 5.999353E−05 | 1.190502E−05 | −3.826009E−06 | −3.098858E−07 |
| 25 | 1.435520E−05 | −6.379970E−08 | 4.800384E−07 | −2.280002E−08 |
| 26 | 2.455308E−06 | −5.845900E−07 | 1.165981E−06 | −9.852993E−09 |

| | A10 |
|---|---|
| 19 | −6.177436E−08 |
| 20 | 3.977727E−07 |
| 25 | −1.898221E−08 |
| 26 | −3.170767E−08 |

TABLE 16

Example 6 . Basic lens data

|  | Si Surface Number | Ri (Curvature Radius) | Di (Surface Spacing) | Ndi (Refractive Index) | νdj (Abbe Number) |
|---|---|---|---|---|---|
| G1 | 1 | 52.6366 | 0.95 | 1.74000 | 28.3 |
|  | 2 | 26.8311 | 3.91 | 1.48749 | 70.2 |
|  | 3 | 932.0648 | 0.10 | 1.00000 |  |
|  | 4 | 28.7601 | 2.90 | 1.58913 | 61.1 |
|  | 5 | 152.1421 | D5 (Variable) | 1.00000 |  |

TABLE 16-continued

Example 6 . Basic lens data

|  | Si Surface Number | Ri (Curvature Radius) | Di (Surface Spacing) | Ndi (Refractive Index) | vdj (Abbe Number) |
|---|---|---|---|---|---|
| G2 | 6 | 475.9322 | 0.65 | 1.83481 | 42.7 |
|  | 7 | 6.7084 | 3.00 | 1.00000 |  |
|  | 8 | −16.9399 | 0.65 | 1.83481 | 42.7 |
|  | 9 | 47.4099 | 0.10 | 1.00000 |  |
|  | 10 | 16.2502 | 2.28 | 1.92286 | 20.9 |
|  | 11 | −35.0584 | 0.65 | 1.83400 | 37.2 |
|  | 12 | 119.1952 | D12 (Variable) | 1.00000 |  |
|  | 13 (Aperture Diaphragm) | — | 0.80 | 1.00000 |  |
| G3 | 14 | 7.4014 | 2.09 | 1.49700 | 81.5 |
|  | 15 | 20.0000 | 0.10 | 1.00000 |  |
|  | 16 | 9.8691 | 2.36 | 1.51680 | 64.2 |
|  | 17 | −28.3054 | 0.55 | 1.75520 | 27.5 |
|  | 18 | 22.0553 | 0.25 | 1.00000 |  |
|  | *19 | 43.7657 | 1.37 | 1.50957 | 56.5 |
|  | *20 | −13.4587 | D20 (Variable) | 1.00000 |  |
| G4 | 21 | 12.1418 | 1.75 | 1.59551 | 39.2 |
|  | 22 | −55.0098 | 0.12 | 1.00000 |  |
|  | 23 | −23.4129 | 0.60 | 1.83400 | 37.2 |
|  | 24 | 7.1222 | D24 (Variable) | 1.00000 |  |
| G5 | *25 | −9584024.3 | 2.50 | 1.50957 | 56.5 |
|  | *26 | −9.0483 | 5.40 | 1.00000 |  |
| GC | 27 | ∞ | 0.80 | 1.51680 | 64.2 |
|  | 28 | ∞ |  | 1.00000 |  |

(*Aspheric surface)
(f = 5.16~87.37 mm, FNO. = 3.17~5.74, 2ω = 79.8°~5.0°)

TABLE 17

Example 6 • Variable surface spacing data

| Surface Spacing | Wide angle end (f = 5.16) | Middle (f = 19.71) | Telephoto end (f = 87.37) |
|---|---|---|---|
| D5 | 0.54 | 15.84 | 30.80 |
| D12 | 21.72 | 9.21 | 0.94 |
| D20 | 2.64 | 4.82 | 6.47 |
| D24 | 2.80 | 9.17 | 12.02 |

TABLE 18

Examplex 6 • Aspheric data

| Surface Number | Coefficient | | | |
|---|---|---|---|---|
|  | K | A3 | A4 | A5 |
| 19 | 6.109140E+00 | −2.933032E−04 | −6.844214E−04 | −1.190311E−05 |
| 20 | 8.872241E−01 | −2.195564E−04 | 2.210197E−04 | −6.107036E−05 |
| 25 | 2.225216E+00 | −5.243383E−04 | 4.478197E−04 | −4.576349E−05 |
| 26 | −1.973964E+00 | −3.958897E−04 | 7.223646E−05 | −2.261657E−07 |
|  | A6 | A7 | A8 | A9 |
| 19 | 1.128836E−05 | 2.005692E−08 | 1.081552E−06 | 1.302879E−07 |
| 20 | 5.912788E−05 | 4.678715E−07 | −1.846094E−06 | −4.595673E−07 |
| 25 | 2.704689E−05 | −3.216905E−07 | 2.260754E−08 | −1.744072E−08 |
| 26 | 1.479808E−05 | 4.541836E−07 | 1.624091E−07 | −1.231489E−08 |
|  | A10 | | | |
| 19 | 4.341397E−08 | | | |
| 20 | 3.233069E−07 | | | |
| 25 | 5.886628E−09 | | | |
| 26 | 8.182711E−09 | | | |

TABLE 19

Example 7. Basic lens data

| | Si Surface Number | Ri (Curvature Radius) | Di (Surface Spacing) | Ndi (Refractive Index) | νdj (Abbe Number) |
|---|---|---|---|---|---|
| G1 | 1 | 63.0014 | 1.10 | 1.85026 | 32.3 |
| | 2 | 26.8589 | 3.71 | 1.59282 | 68.7 |
| | 3 | 0.0000 | 0.10 | 1.00000 | |
| | 4 | 28.6007 | 3.02 | 1.58913 | 61.1 |
| | 5 | 190.6111 | D5 (Variable) | 1.00000 | |
| G2 | 6 | 362.4240 | 0.65 | 1.88300 | 40.8 |
| | 7 | 6.5238 | 3.16 | 1.00000 | |
| | 8 | −14.5479 | 0.65 | 1.83481 | 42.7 |
| | 9 | 46.1147 | 0.10 | 1.00000 | |
| | 10 | 17.0211 | 2.35 | 1.92286 | 20.9 |
| | 11 | −27.0289 | 0.65 | 1.83481 | 42.7 |
| | 12 | 199.4737 | D12 (Variable) | 1.00000 | |
| | 13 (Aperture Diaphragm) | — | 0.80 | 1.00000 | |
| G3 | 14 | 8.5689 | 2.00 | 1.49700 | 81.5 |
| | 15 | 20.0000 | 0.10 | 1.00000 | |
| | 16 | 8.1589 | 2.62 | 1.51742 | 52.4 |
| | 17 | −17.6776 | 0.55 | 1.74000 | 28.3 |
| | 18 | 18.6686 | 0.30 | 1.00000 | |
| | *19 | 38.1912 | 1.42 | 1.50957 | 56.5 |
| | *20 | −10.6590 | D20 (Variable) | 1.00000 | |

TABLE 19-continued

Example 7. Basic lens data

| | Si Surface Number | Ri (Curvature Radius) | Di (Surface Spacing) | Ndi (Refractive Index) | νdj (Abbe Number) |
|---|---|---|---|---|---|
| G4 | 21 | 9.9570 | 1.90 | 1.51742 | 52.4 |
| | 22 | −102.2724 | 0.13 | 1.00000 | |
| | 23 | −29.5643 | 0.60 | 1.83400 | 37.2 |
| | 24 | 7.4995 | D24 (Variable) | 1.00000 | |
| G5 | *25 | 1000.0023 | 2.50 | 1.50957 | 56.5 |
| | *26 | −9.6964 | 5.84 | 1.00000 | |
| GC | 27 | ∞ | 0.80 | 1.51680 | 64.2 |
| | 28 | ∞ | | 1.00000 | |

(*Aspheric surface)
(f = 4.97~84.14 mm, FNO. = 2.98~5.94, 2ω = 82.4°~5.0°)

TABLE 20

Example 7 • Variable surface spacing data

| Surface Spacing | Wide angle end (f = 4.97) | Middle (f = 18.98) | Telephoto end (f = 84.14) |
|---|---|---|---|
| D5 | 0.60 | 15.63 | 29.91 |
| D12 | 17.40 | 7.50 | 0.98 |
| D20 | 2.08 | 4.23 | 6.29 |
| D24 | 2.79 | 10.54 | 15.00 |

TABLE 21

Examplex 7 • Aspheric data

| Surface Number | K | A3 | A4 | A5 |
|---|---|---|---|---|
| 19 | 9.842975E+00 | −1.452102E−04 | −8.630103E−04 | −3.232429E−05 |
| 20 | −2.336657E+00 | −1.431105E−04 | −2.016558E−04 | −7.544187E−05 |
| 25 | −2.390740E−02 | −3.937987E−04 | 3.350872E−04 | −6.249915E−05 |
| 26 | 1.478910E+00 | −4.529156E−04 | 6.722260E−04 | −8.118363E−05 |

| Surface Number | A6 | A7 | A8 | A9 |
|---|---|---|---|---|
| 19 | 3.169580E−05 | −3.725430E−06 | −4.325526E−07 | 3.792460E−07 |
| 20 | 4.333603E−05 | 7.842233E−06 | −3.417451E−06 | −3.853737E−07 |
| 25 | 5.062276E−05 | 3.472943E−06 | −6.129307E−07 | −2.014639E−07 |
| 26 | 5.028039E−05 | 1.449131E−06 | −2.721450E−07 | 1.972076E−08 |

| Surface Number | A10 |
|---|---|
| 19 | 1.068111E−07 |
| 20 | 3.362436E−07 |
| 25 | 3.210753E−08 |
| 26 | 9.444811E−09 |

TABLE 22

Example 8 . Basic lens data

| | Si Surface Number | Ri (Curvature Radius) | Di (Surface Spacing) | Ndi (Refractive Index) | νdj (Abbe Number) |
|---|---|---|---|---|---|
| G1 | 1 | 59.5693375 | 1.5000000 | 1.805175 | 25.4 |
| | 2 | 38.3551913 | 0.0100000 | 1.560019 | 37.6 |
| | 3 | 38.3551913 | 4.9672730 | 1.516797 | 64.2 |
| | 4 | 113.6355372 | 0.1000000 | 1.000000 | |
| | 5 | 57.3721820 | 3.3929800 | 1.620409 | 60.3 |
| | 6 | 546.9540947 | D6 (Variable) | 1.000000 | |
| G2 | 7 | 59.4275934 | 1.1000000 | 1.799994 | 29.8 |
| | 8 | 11.1409639 | 4.3700680 | 1.000000 | |
| | 9 | −42.9522084 | 1.1012440 | 1.834803 | 42.7 |
| | 10 | 9.9987002 | 0.0100000 | 1.560019 | 37.6 |
| | 11 | 9.9987002 | 4.6905990 | 1.922851 | 20.9 |
| | 12 | −126.0062703 | 1.5025990 | 1.000000 | |
| | 13 | −15.3968737 | 1.0000000 | 1.834803 | 42.7 |
| | 14 | −76.8978189 | D14 (Variable) | 1.000000 | |
| | 15 (Aperture Diaphragm) | — | 1.9000000 | 1.000000 | |
| G3 | 16 | 10.1953428 | 5.1522700 | 1.496998 | 81.5 |
| | 17 | −14.8651117 | 0.0100000 | 1.560019 | 37.6 |
| | 18 | −14.8651117 | 0.9199997 | 1.772496 | 49.6 |
| | 19 | −44.1686163 | 0.1499988 | 1.000000 | |
| | 20 | 18.8258682 | 1.0262820 | 1.647685 | 33.8 |
| | 21 | 8.3333333 | 0.0100000 | 1.560019 | 37.6 |
| | 22 | 8.3333333 | 3.1561070 | 1.620409 | 60.3 |
| | 23 | 12.8808646 | 0.6043201 | 1.000000 | |
| | *24 | 9.2035353 | 2.8000000 | 1.588088 | 60.4 |
| | *25 | 26.6043203 | D25 | 1.000000 | |

TABLE 22-continued

Example 8 . Basic lens data

| | Si Surface Number | Ri (Curvature Radius) | Di (Surface Spacing) | Ndi (Refractive Index) | νdj (Abbe Number) |
|---|---|---|---|---|---|
| | | | (Variable) | | |
| G4 | 26 | −61.1868911 | 0.8000000 | 1.834803 | 42.7 |
| | 27 | 9.5054956 | 0.1473374 | 1.000000 | |
| | *28 | 7.8308965 | 1.7000000 | 1.509573 | 56.5 |
| | *29 | 15.6272049 | D29 | 1.000000 | |
| | | | (Variable) | | |
| G5 | *30 | −65.2797761 | 3.2000000 | 1.509573 | 56.5 |
| | *31 | −5.8876102 | 1.2000000 | 1.000000 | |
| GC | 32 | ∞ | 0.8000000 | 1.516797 | 64.2 |
| | 33 | ∞ | 2.7642578 | 1.000000 | |

(*Aspheric surface)
(f = 4.328~19.478~122.278 mm, FNO. = 2.88~4.61~5.77, 2ω = 89.1°~3.3°)

TABLE 23

Example 8 • Variable surface spacing data

| Surface Spacing | Wide angle end (f = 4.328) | Middle (f = 19.478) | Telephoto end (f = 122.278) |
|---|---|---|---|
| D6 | 0.6000000 | 24.1810794 | 53.3024111 |
| D14 | 34.8863900 | 11.4730480 | 0.8895207 |
| D25 | 4.4107790 | 11.2855090 | 30.3809350 |
| D29 | 1.8500000 | 6.8254789 | 8.4274451 |

TABLE 24

Examplex 8 • Aspheric data

| Surface Number | Coefficient | | | |
|---|---|---|---|---|
| | K | A3 | A4 | A5 |
| 24 | 0.0000000E+00 | −5.4890231E−05 | 4.2562120E−05 | −2.7612636E−05 |
| 25 | 0.0000000E+00 | −4.8826687E−05 | 2.5804048E−04 | −1.4893689E−05 |
| 28 | 0.0000000E+00 | 0.0000000E+00 | 1.4380639E−03 | 0.0000000E+00 |
| 29 | 0.0000000E+00 | −7.4751489E−04 | 2.4063889E−03 | −9.0681272E−05 |
| 30 | 0.0000000E+00 | 1.0038397E−03 | −9.9619307E−04 | 3.7601603E−05 |
| 31 | 0.0000000E+00 | 3.0393281E−03 | −1.9166058E−03 | 7.5781298E−04 |

| | A6 | A7 | A8 | A9 |
|---|---|---|---|---|
| 24 | −5.3723735E−07 | 4.5365081E−07 | −2.3359789E−07 | −3.7248933E−08 |
| 25 | −3.0094937E−06 | −1.3361836E−07 | −9.8022866E−08 | −3.3884044E−08 |
| 28 | 1.1389886E−04 | 0.0000000E+00 | −7.9783840E−06 | — |
| 29 | 1.0455580E−04 | 1.3907736E−05 | −1.6169862E−06 | −8.2505711E−07 |
| 30 | 1.2400354E−04 | −2.1558694E−05 | −1.7469953E−06 | 2.9517014E−07 |
| 31 | −9.8152443E−05 | −1.5978811E−06 | 7.5852016E−07 | 6.6677705E−08 |

| | A10 | A11 | A12 | A13 |
|---|---|---|---|---|
| 24 | −9.4321005E−10 | 4.3740708E−10 | 6.4715484E−11 | 4.1746667E−13 |
| 25 | −5.0792831E−09 | −7.5386072E−12 | 1.4322406E−10 | 2.9961143E−11 |
| 28 | 3.6533795E−07 | — | — | — |
| 29 | −1.0729532E−07 | 1.2814637E−08 | 1.0006876E−08 | 2.7068800E−09 |
| 30 | 6.8596689E−08 | 4.2850125E−09 | −1.5660416E−10 | −2.6134188E−10 |
| 31 | 9.5549683E−10 | −4.9033074E−13 | 3.8909483E−11 | 5.3424637E−13 |

| | A14 | A15 | A16 | A17 |
|---|---|---|---|---|
| 24 | −1.4235310E−12 | −4.1619796E−13 | −6.2348296E−14 | −5.0958059E−15 |
| 25 | 3.7255329E−14 | −6.4227084E−13 | −2.9283652E−13 | −1.2246410E−14 |

TABLE 24-continued

Examplex 8 • Aspheric data

| Surface Number | Coefficient | | | |
|---|---|---|---|---|
| 29 | 3.9384940E−10 | 9.6807531E−12 | −2.0706963E−11 | −6.8522595E−12 |
| 30 | −4.2428893E−11 | −3.4428418E−12 | 2.0676805E−13 | 1.6245738E−13 |
| 31 | −3.7182514E−12 | −1.4376902E−12 | −3.3161019E−13 | −5.0274858E−14 |

| | A18 | A19 | A20 |
|---|---|---|---|
| 24 | 2.0324857E−15 | −2.8770644E−16 | 9.5145499E−17 |
| 25 | 9.9771203E−15 | 2.6728731E−15 | −4.2840294E−16 |
| 29 | −7.8518188E−13 | 3.5431466E−13 | 3.0648671E−13 |
| 30 | 4.2026684E−14 | 3.3458361E−15 | −1.3934276E−15 |
| 31 | −3.8409659E−15 | 7.4546239E−16 | 4.6132670E−16 |

TABLE 25

Example 9 . Basic lens data

| | Si Surface Number | Ri (Curvature Radius) | Di (Surface Spacing) | Ndi (Refractive Index) | vdj (Abbe Number) |
|---|---|---|---|---|---|
| G1 | 1 | 89.2381472 | 1.5000000 | 1.8051750 | 25.4 |
|  | 2 | 52.1532785 | 0.0100000 | 1.5600190 | 37.6 |
|  | 3 | 52.1532785 | 5.8230550 | 1.4874890 | 70.2 |
|  | 4 | −1483.7611981 | 0.1000000 | 1.0000000 | |
|  | 5 | 50.9276990 | 4.2967450 | 1.5891280 | 61.1 |
|  | 6 | 183.8928273 | D6 (Variable) | 1.0000000 | |
| G2 | 7 | 139.3438465 | 1.0000000 | 1.8348030 | 42.7 |
|  | 8 | 8.5413143 | 5.3895560 | 1.0000000 | |
|  | 9 | −24.1658901 | 0.8981712 | 1.8348030 | 42.7 |
|  | 10 | 50.5727874 | 0.1457408 | 1.0000000 | |
|  | 11 | 20.0919084 | 4.5248120 | 1.9228510 | 20.9 |
|  | 12 | −20.3232907 | 0.0100000 | 1.5600190 | 37.6 |
|  | 13 | −20.3232907 | 0.9000000 | 1.8051750 | 25.4 |
|  | 14 | 51.1690333 | D14 (Variable) | 1.0000000 | |
|  | 15 (Aperture Diaphragm) | — | 1.9000000 | 1.0000000 | |
| G3 | 16 | 7.9659757 | 3.9370350 | 1.4969980 | 81.5 |
|  | 17 | −14.1615077 | 0.0100000 | 1.5600190 | 37.6 |
|  | 18 | −14.1615077 | 0.9188800 | 1.8348030 | 42.7 |
|  | 19 | −27.1028491 | 0.1496038 | 1.0000000 | |
|  | 20 | 83.3381947 | 0.8991761 | 1.5481390 | 45.8 |
|  | 21 | 6.9444107 | 0.0100000 | 1.5600190 | 37.6 |
|  | 22 | 6.9444107 | 2.3987270 | 1.5167970 | 64.2 |
|  | 23 | 15.3467750 | 0.2120751 | 1.0000000 | |
|  | *24 | 8.0644381 | 2.7975450 | 1.5880880 | 60.4 |
|  | *25 | 12.4594321 | D25 | 1.0000000 | |

TABLE 25-continued

Example 9 . Basic lens data

| | Si Surface Number | Ri (Curvature Radius) | Di (Surface Spacing) | Ndi (Refractive Index) | vdj (Abbe Number) |
|---|---|---|---|---|---|
| | | | (Variable) | | |
| G4 | 26 | 402.7687938 | 0.8000000 | 1.8339950 | 37.2 |
|  | 27 | 8.6857353 | 0.1827345 | 1.0000000 | |
|  | *28 | 6.9260231 | 1.8500000 | 1.5095730 | 56.5 |
|  | *29 | 9.5008807 | D29 (Variable) | 1.0000000 | |
| G5 | *30 | 62.4453603 | 3.2000000 | 1.5095730 | 56.5 |
|  | *31 | −7.3387386 | 1.1000000 | 1.0000000 | |
| GC | 32 | ∞ | 0.8000000 | 1.5167983 | 64.2 |
|  | 33 | ∞ | | 1.0000000 | |

(*Aspheric surface)
(f = 4.328~19.474~122.252 mm, FNO. = 2.88~4.61~5.77, 2ω = 89.5°~3.4°)

TABLE 26

Example 9 • Variable surface spacing data

| Surface Spacing | Wide angle end (f = 4.328) | Middle (f = 19.474) | Telephoto end (f = 122.252) |
|---|---|---|---|
| D6 | 0.6000000 | 28.5926824 | 59.8966822 |
| D14 | 36.9970100 | 12.5764960 | 1.6657519 |
| D25 | 3.9121430 | 9.2002450 | 13.8731570 |
| D29 | 1.8500000 | 5.7294699 | 8.5083671 |

TABLE 27

Examplex 9 • Aspheric data

| Surface Number | Coefficient | | | |
|---|---|---|---|---|
| | K | A3 | A4 | A5 |
| 24 | 0.0000000E+00 | 4.9816969E−05 | −2.4601068E−04 | −1.1944865E−05 |
| 25 | 0.0000000E+00 | 1.1114957E−04 | 1.2104635E−04 | 3.5361427E−05 |
| 28 | 0.0000000E+00 | −1.3596857E−04 | 6.5980491E−04 | 2.2330345E−05 |
| 29 | 0.0000000E+00 | −5.0958600E−04 | 8.9995746E−04 | 2.9571317E−04 |
| 30 | 0.0000000E+00 | 2.0952098E−03 | −2.6448968E−03 | 1.3069204E−03 |
| 31 | 0.0000000E+00 | 2.6163964E−03 | −2.1306092E−03 | 1.0301920E−03 |

TABLE 27-continued

Examplex 9 • Aspheric data

| Surface Number | Coefficient | | | |
|---|---|---|---|---|
| | A6 | A7 | A8 | A9 |
| 24 | −3.2462108E−06 | −3.3230997E−06 | −5.2340004E−07 | −2.3385131E−08 |
| 25 | −1.8157688E−05 | −2.7748089E−06 | −3.8215460E−07 | −6.2379683E−08 |
| 28 | 3.5011475E−05 | 4.5231920E−06 | −7.5855571E−07 | −4.2554069E−07 |
| 29 | −1.4167992E−05 | −3.9112952E−06 | 1.0416568E−06 | 4.9686740E−07 |
| 30 | −1.6660059E−04 | −2.2921876E−05 | 2.1675439E−06 | 8.6251802E−07 |
| 31 | −7.8015700E−05 | −2.8152237E−05 | 2.3753598E−08 | 7.1452778E−07 |
| | A10 | A11 | A12 | A13 |
| 24 | 4.5844320E−09 | 7.6727242E−10 | −8.3591133E−11 | −6.0023144E−11 |
| 25 | −5.9624945E−09 | 9.9665015E−10 | 6.2864829E−10 | 1.6728144E−10 |
| 28 | −7.0156911E−08 | 1.9895976E−09 | 4.9540354E−09 | 1.4507999E−09 |
| 29 | 6.4489473E−08 | −1.2795868E−08 | −7.7073627E−09 | −1.7388612E−09 |
| 30 | 9.4769640E−08 | −4.9381320E−09 | −3.9773370E−09 | −8.7639612E−10 |
| 31 | 1.1918030E−07 | 4.4772198E−09 | −2.4023277E−09 | −6.9834920E−10 |
| | A14 | A15 | A16 | A17 |
| 24 | −1.4233776E−11 | −1.8296154E−12 | −5.6042180E−15 | 5.1562428E−14 |
| 25 | 2.8341161E−11 | 2.0188256E−12 | −6.3166481E−13 | −2.9944618E−13 |
| 28 | 3.0624320E−10 | 3.1610707E−11 | −4.5673646E−12 | −2.8762567E−12 |
| 29 | −1.0290208E−10 | 1.0216354E−10 | 4.9639001E−11 | 1.1190382E−11 |
| 30 | −1.0676541E−10 | 2.5587635E−12 | 4.3273145E−12 | 1.3122029E−12 |
| 31 | −1.0465230E−10 | −5.5079967E−12 | 2.0692334E−12 | 7.7437807E−13 |
| | A18 | A19 | A20 | |
| 24 | 1.7021003E−14 | 1.9483318E−14 | −4.2792184E−15 | |
| 25 | −5.3446016E−14 | −8.4084521E−15 | 5.7464117E−16 | |
| 28 | −7.5205344E−13 | −2.0082671E−13 | −8.6300607E−14 | |
| 29 | 1.0937593E−12 | −5.8920856E−13 | −3.8628438E−13 | |
| 30 | 1.9843346E−13 | −3.4156455E−14 | −5.6989425E−15 | |
| 31 | 1.2501294E−13 | 1.7498379E−16 | −5.1057399E−15 | |

TABLE 28

Example 10 . Basic lens data

| | Si Surface Number | Ri (Curvature Radius) | Di (Surface Spacing) | Ndi (Refractive Index) | νdj (Abbe Number) |
|---|---|---|---|---|---|
| G1 | 1 | 82.9750195 | 1.5000000 | 1.8051750 | 25.4 |
| | 2 | 49.1400008 | 0.0100000 | 1.5600190 | 37.6 |
| | 3 | 49.1400008 | 4.4600000 | 1.5167970 | 64.2 |
| | 4 | 333.8500219 | 0.1000000 | 1.0000000 | |
| | 5 | 67.7149849 | 3.0900000 | 1.6204090 | 60.3 |
| | 6 | 508.5699116 | D6 (Variable) | 1.0000000 | |
| G2 | 7 | 102.3000007 | 1.0000000 | 1.7999940 | 29.8 |
| | 8 | 12.3779993 | 4.5000000 | 1.0000000 | |
| | 9 | −70.5599781 | 0.8900000 | 1.8348030 | 42.7 |
| | 10 | 10.8390004 | 0.0100000 | 1.5600190 | 37.6 |
| | 11 | 10.8390004 | 5.2200000 | 1.9228510 | 20.9 |
| | 12 | −142.7299908 | 1.4800000 | 1.0000000 | |
| | 13 | −18.5049996 | 0.8900000 | 1.8348030 | 42.7 |
| | 14 | −82.5489804 | D14 (Variable) | 1.0000000 | |
| | 15 (Aperture Diaphragm) | — | 1.9000000 | 1.0000000 | |
| G3 | 16 | 8.8679998 | 3.1400000 | 1.4969980 | 81.5 |
| | 17 | −149.2400102 | 0.0100000 | 1.5600190 | 37.6 |
| | 18 | −149.2400102 | 0.9200000 | 1.7291540 | 54.7 |
| | 19 | 25.8229983 | 1.3700000 | 1.0000000 | |
| | 20 | 14.4980002 | 0.8900000 | 1.8051750 | 25.4 |
| | 21 | 7.5759986 | 0.0100000 | 1.5600190 | 37.6 |
| | 22 | 7.5759986 | 3.0900000 | 1.8039960 | 46.6 |
| | 23 | 22.9120007 | 0.6700000 | 1.0000000 | |
| | *24 | 9.2590364 | 2.5000000 | 1.5686700 | 58.6 |
| | *25 | 14.9484518 | D25 (Variable) | 1.0000000 | |
| G4 | 26 | −35.2890028 | 0.8000000 | 1.8039960 | 46.6 |
| | 27 | 16.2670000 | 0.4700000 | 1.0000000 | |
| | *28 | 13.9101211 | 1.8000000 | 1.5095730 | 56.5 |
| | *29 | 19.7313147 | D29 (Variable) | 1.0000000 | |
| G5 | *30 | −55.7266674 | 3.2000000 | 1.5095730 | 56.5 |
| | *31 | −5.8141495 | 2.1000000 | 1.0000000 | |
| GC | 32 | ∞ | 0.8000000 | 1.5167970 | 64.2 |
| | 33 | ∞ | | 1.0000000 | |

(*Aspheric surface)
(f = 4.328~19.476~122.264 mm, FNO. = 2.88~4.61~5.77, 2ω = 89.5°~3.3°)

TABLE 29

Example 10 • Variable surface spacing data

| Surface Spacing | Wide angle end (f = 4.328) | Middle (f = 19.476) | Telephoto end (f = 122.264) |
|---|---|---|---|
| D6 | 0.6000000 | 32.7551868 | 63.2718042 |
| D14 | 37.7400000 | 13.2796380 | 0.8013049 |
| D25 | 3.5300000 | 7.2976230 | 15.0968370 |
| D29 | 1.7000000 | 7.5480608 | 14.5153300 |

TABLE 30

Examplex 10 • Aspheric data

| Surface Number | Coefficient | | |
|---|---|---|---|
| | K | A3 | A4 | A5 |
|---|---|---|---|---|
| 24 | 0.0000000 | 1.023193E−04 | −3.083043E−04 | 2.536763E−05 |
| 25 | 0.0000000 | 7.570433E−05 | 1.303422E−04 | −1.752561E−06 |
| 28 | 0.0000000 | −1.055139E−03 | 2.300635E−04 | 1.149931E−04 |
| 29 | 0.0000000 | −9.717995E−04 | 2.425000E−04 | 2.022151E−04 |
| 30 | 0.0000000 | 3.099457E−03 | −1.095619E−03 | 2.330274E−04 |
| 31 | 0.0000000 | 4.749456E−03 | −6.318068E−04 | 4.489958E−04 |

| | A6 | A7 | A8 | A9 |
|---|---|---|---|---|
| 24 | −7.583130E−06 | −2.523376E−06 | −2.906093E−07 | −1.447969E−08 |
| 25 | −1.159717E−06 | −2.704722E−06 | −7.179876E−07 | −7.768291E−08 |
| 28 | 3.188417E−05 | 5.535027E−06 | 2.110378E−07 | −2.402998E−07 |
| 29 | 3.687131E−05 | 3.785830E−06 | −2.292490E−08 | −1.257680E−07 |
| 30 | −1.228371E−05 | −4.133411E−06 | 7.081263E−07 | 2.813478E−07 |
| 31 | −8.336825E−05 | −5.060453E−06 | 1.741656E−06 | 3.490968E−07 |

| | A10 | A11 | A12 | A13 |
|---|---|---|---|---|
| 24 | 1.444718E−09 | 4.955979E−10 | 7.918302E−11 | 6.440966E−12 |
| 25 | 4.507377E−09 | 3.830514E−09 | 9.374309E−10 | 1.487636E−10 |
| 28 | −1.076757E−07 | −2.645851E−08 | −3.196734E−09 | 6.515336E−10 |
| 29 | −4.001110E−08 | −1.144064E−08 | −2.670597E−09 | −3.756962E−10 |
| 30 | 3.173474E−08 | −2.228002E−09 | −1.590119E−09 | −3.562325E−10 |
| 31 | 1.692203E−08 | −6.021139E−09 | −1.654769E−09 | −2.197889E−10 |

| | A14 | A15 | A16 | A17 |
|---|---|---|---|---|
| 24 | −8.888093E−13 | −6.282383E−13 | −2.213708E−13 | −7.228373E−14 |
| 25 | 1.346557E−11 | −1.149141E−12 | −2.812783E−12 | −5.518277E−13 |
| 28 | 2.172054E−10 | 1.356341E−10 | 4.824042E−11 | 1.244469E−11 |
| 29 | 1.473056E−10 | 4.211052E−11 | 3.254177E−11 | 8.083211E−12 |
| 30 | −4.206765E−11 | 7.989943E−13 | 1.864244E−12 | 5.429593E−13 |
| 31 | −1.629580E−12 | 6.862592E−12 | 1.925548E−12 | 3.117550E−13 |

| | A18 | A19 | A20 |
|---|---|---|---|
| 24 | −1.131583E−14 | 1.782241E−14 | −2.454446E−15 |
| 25 | −1.189325E−14 | 5.265380E−15 | 5.004652E−15 |
| 28 | −1.465250E−13 | −1.944386E−12 | −4.220606E−14 |
| 29 | 1.280971E−12 | 3.801102E−13 | −5.222909E−13 |
| 30 | 9.289533E−14 | 1.225082E−15 | −6.286230E−15 |
| 31 | 1.666947E−14 | −7.938292E−15 | −3.535996E−15 |

TABLE 31

Example 11 . Basic lens data

| | Si Surface Number | Ri (Curvature Radius) | Di (Surface Spacing) | Ndi (Refractive Index) | νdj (Abbe Number) |
|---|---|---|---|---|---|
| G1 | 1 | 61.1277582 | 1.5000000 | 1.8051750 | 25.4 |
| | 2 | 40.1196689 | 0.0100000 | 1.5600190 | 37.6 |
| | 3 | 40.1196689 | 5.1244790 | 1.5167970 | 64.2 |
| | 4 | 210.4983084 | 0.1000000 | 1.0000000 | |

TABLE 31-continued

Example 11 . Basic lens data

| | Si Surface Number | Ri (Curvature Radius) | Di (Surface Spacing) | Ndi (Refractive Index) | νdj (Abbe Number) |
|---|---|---|---|---|---|
| | 5 | 70.9488055 | 3.0365270 | 1.6204090 | 60.3 |
| | 6 | 381.0921873 | D6 (Variable) | 1.0000000 | |
| G2 | 7 | 100.7651196 | 1.0000000 | 1.7999940 | 29.8 |
| | 8 | 12.2636488 | 4.5823920 | 1.0000000 | |
| | 9 | −60.3973056 | 0.8879874 | 1.8348030 | 42.7 |
| | 10 | 10.1507817 | 0.0100000 | 1.5600190 | 37.6 |
| | 11 | 10.1507817 | 5.3917780 | 1.9228510 | 20.9 |
| | 12 | −491.8016662 | 1.7064220 | 1.0000000 | |
| | 13 | −17.3829182 | 0.8786147 | 1.8348030 | 42.7 |
| | 14 | −49.0473292 | D14 (Variable) | 1.0000000 | |
| | 15 (Aperture Diaphragm) | — | 1.9000000 | 1.0000000 | |
| G3 | 16 | 8.5277228 | 2.9873010 | 1.4969980 | 81.5 |
| | 17 | 107.1543762 | 0.0100000 | 1.5600190 | 37.6 |
| | 18 | 107.1543762 | 0.9152326 | 1.7291540 | 54.7 |
| | 19 | 19.0227771 | 0.9897438 | 1.0000000 | |
| | 20 | 14.2473563 | 0.8896982 | 1.8051750 | 25.4 |
| | 21 | 7.3851480 | 0.0100000 | 1.5600190 | 37.6 |
| | 22 | 7.3851480 | 3.2875960 | 1.8039960 | 46.6 |
| | 23 | 34.2396571 | 0.8811695 | 1.0000000 | |
| | *24 | 8.8066621 | 2.5000000 | 1.5686700 | 58.6 |
| | *25 | 10.7753767 | D25 (Variable) | 1.0000000 | |
| G4 | 26 | −35.1729118 | 0.8000000 | 1.8039960 | 46.6 |
| | 27 | 11.1180525 | 1.6343350 | 1.0000000 | |
| | *28 | 13.9705623 | 1.8000000 | 1.5095730 | 56.5 |
| | *29 | −62.0917853 | D29 (Variable) | 1.0000000 | |
| G5 | *30 | −58.6199114 | 3.2000000 | 1.5095730 | 56.5 |
| | *31 | −6.0149327 | 2.1000000 | 1.0000000 | |
| GC | 32 | ∞ | 0.8000000 | 1.5167970 | 64.2 |
| | 33 | ∞ | | 1.0000000 | |

(*Aspheric surface)
(f = 4.329~19.481~122.296 mm, FNO. = 2.88~4.61~5.77, 2ω = 88.9°~3.2°)

TABLE 32

Example 11 • Variable surface spacing data

| Surface Spacing | Wide angle end (f = 4.329) | Middle (f = 19.481) | Telephoto end (f = 122.296) |
|---|---|---|---|
| D6 | 0.6000000 | 31.3388230 | 59.7787660 |
| D14 | 36.0610900 | 12.1856620 | 0.6828136 |
| D25 | 3.0027243 | 6.9153107 | 13.7042570 |
| D29 | 1.6688586 | 7.8543109 | 18.4175290 |

TABLE 33

Examplex 11 • Aspheric data

| Surface Number | Coefficient | | | |
|---|---|---|---|---|
| | K | A3 | A4 | A5 |
| 24 | 0.0000000E+00 | −3.6768348E−05 | −3.1501254E−04 | −2.0700295E−05 |
| 25 | 0.0000000E+00 | −1.0717555E−04 | 1.8909360E−04 | −7.0632716E−05 |
| 28 | 0.0000000E+00 | −8.9783847E−05 | −1.1349931E−03 | 2.6919854E−04 |
| 29 | 0.0000000E+00 | 5.7724444E−05 | −1.2676806E−03 | 2.7867310E−04 |
| 30 | 0.0000000E+00 | 8.0578030E−03 | −4.3081242E−03 | 7.5928913E−04 |
| 31 | 0.0000000E+00 | 1.2384313E−02 | −5.3730988E−03 | 1.3677222E−03 |
| | A6 | A7 | A8 | A9 |
| 24 | −1.1962593E−05 | −2.3192731E−06 | −2.4775222E−07 | −2.5579132E−08 |
| 25 | −6.5407258E−06 | −2.6248789E−06 | −6.7395966E−07 | −8.1917243E−08 |
| 28 | 6.2398402E−05 | −6.1197218E−06 | −4.3064765E−06 | −7.1923165E−07 |
| 29 | 4.5393635E−05 | −2.0813547E−06 | −2.6544111E−06 | −6.0204576E−07 |
| 30 | 2.5858682E−05 | −1.5571651E−05 | −8.3122492E−07 | 2.5396162E−07 |
| 31 | −9.3157427E−05 | −1.3588840E−05 | 8.2729043E−07 | 3.6836049E−07 |
| | A10 | A11 | A12 | A13 |
| 24 | −2.7587189E−09 | −2.3704096E−10 | 7.5235959E−13 | 3.9181551E−12 |
| 25 | 1.8841571E−09 | 3.5279630E−09 | 9.9266740E−10 | 1.8322339E−10 |
| 28 | 3.9109648E−08 | 5.0632630E−08 | 1.8805094E−08 | 1.0253738E−08 |
| 29 | −1.0133541E−07 | 3.3659517E−08 | 1.9240371E−08 | 6.3324391E−09 |
| 30 | 8.4690234E−08 | 7.6512648E−09 | −7.5044923E−10 | −4.5951781E−10 |
| 31 | 3.4200154E−08 | −1.3380583E−09 | −6.7994064E−10 | −1.0105521E−10 |
| | A14 | A15 | A16 | A17 |
| 24 | 5.5565316E−13 | −9.7464132E−14 | −7.2572094E−14 | −3.0903799E−14 |
| 25 | 2.2001221E−11 | −3.8890300E−14 | −2.8413457E−12 | −5.8635951E−13 |
| 28 | −1.8558383E−10 | −2.1497473E−10 | −7.3493632E−11 | −6.5675496E−11 |
| 29 | 1.2559126E−10 | −4.9390210E−11 | −6.5316339E−11 | −5.9119260E−11 |

TABLE 33-continued

Examplex 11 • Aspheric data

| Surface Number | Coefficient | | | |
|---|---|---|---|---|
| 30 | −9.5035201E−11 | −8.5496136E−12 | 4.3307713E−13 | 5.6431503E−13 |
| 31 | −6.8819795E−12 | 9.1889044E−13 | −1.2653228E−13 | −1.6851046E−13 |

| | A18 | A19 | A20 |
|---|---|---|---|
| 24 | −2.9098880E−15 | 1.4974283E−14 | −2.4911676E−15 |
| 25 | −1.4606763E−14 | −2.3304538E−14 | 1.2144209E−14 |
| 28 | −7.5033128E−11 | 4.0048766E−11 | −4.5222663E−12 |
| 29 | −2.6953735E−11 | 1.7804341E−11 | −2.0227887E−12 |
| 30 | 1.4963083E−13 | 8.5621198E−15 | −5.5014663E−15 |
| 31 | −5.9279358E−14 | 2.1737464E−14 | −8.7631055E−16 |

TABLE 34

Example 12 . Basic lens data

| | Si Surface Number | Ri (Curvature Radius) | Di (Surface Spacing) | Ndi (Refractive Index) | νdj (Abbe Number) |
|---|---|---|---|---|---|
| G1 | 1 | 50.4733390 | 1.5000000 | 1.8051810 | 25.425 |
| | 2 | 35.5453438 | 5.0368710 | 1.4874900 | 70.235 |
| | 3 | 105.8461137 | 0.1000000 | 1.0000000 | |
| | 4 | 48.7558245 | 3.1602400 | 1.6026700 | 61.100 |
| | 5 | 144.0756939 | D5 (Variable) | 1.0000000 | |
| G2 | 6 | 69.1137066 | 1.1000000 | 1.8348070 | 42.723 |
| | 7 | 10.7403668 | 4.6202410 | 1.0000000 | |
| | 8 | −98.0606544 | 0.9199979 | 1.7827800 | 49.400 |
| | 9 | 11.9608769 | 3.7900820 | 1.9228600 | 20.880 |
| | 10 | 55.1665091 | 1.6719020 | 1.0000000 | |
| | 11 | −26.7172870 | 1.0000000 | 1.7630700 | 49.800 |
| | 12 | −87.2780846 | D12 (Variable) | 1.0000000 | |
| | 13 (Aperture Diaphragm) | — | 1.9000000 | 1.0000000 | |
| G3 | 14 | 11.5177186 | 2.4412660 | 1.6461100 | 59.200 |
| | 15 | 66.1443031 | 2.0945220 | 1.0000000 | |
| | 16 | 10.2089819 | 0.8000000 | 1.7999997 | 29.844 |
| | 17 | 6.2500000 | 4.2916140 | 1.4969990 | 81.540 |
| | 18 | −83.8976147 | 0.5858095 | 1.0000000 | |
| | *19 | −33.8240069 | 2.5000000 | 1.5095744 | 56.376 |
| | *20 | −34.7697650 | D20 (Variable) | 1.0000000 | |
| G4 | 21 | −71.8872118 | 0.8000000 | 1.7221200 | 54.800 |
| | 22 | 8.2906297 | 0.4440942 | 1.0000000 | |
| | 23 | 25.4505705 | 1.5019410 | 1.4874900 | 70.235 |
| | 24 | −29.5878209 | D24 | 1.0000000 | |
| G5 | *25 | −26.0121794 | 3.2000000 | 1.5095744 | 56.376 |
| | *26 | −6.8790031 | 1.5000000 | 1.0000000 | |
| GC | 27 | ∞ | 1.1000000 | 1.5167983 | 64.197 |
| | 28 | ∞ | | 1.0000000 | |

(*Aspheric surface)
(f = 4.590~20.633~106.885 mm, FNO. = 2.88~4.41~5.5, 2ω = 85.3°~5.3°)

TABLE 35

Example 12 • Variable surface spacing data

| Surface Spacing | Wide angle end (f = 4.590) | Middle (f = 20.633) | Telephoto end (f = 106.885) |
|---|---|---|---|
| D5 | 0.6000000 | 28.2291623 | 56.2667100 |
| D12 | 37.9243700 | 12.9439200 | 0.8988149 |
| D20 | 0.9999997 | 4.2524527 | 12.8991500 |
| D24 | 4.5671620 | 13.3679505 | 15.8755920 |

TABLE 36

Examplex12 • Aspheric data

| Surface Number | Coefficient | | | |
|---|---|---|---|---|
| | K | A3 | A4 | A5 |
| 19 | 0.0000000E+00 | −3.5576965E−04 | −3.8971783E−04 | −5.2950928E−05 |
| 20 | 0.0000000E+00 | −3.5527953E−04 | −1.6551696E−04 | −4.4120846E−05 |
| 25 | 0.0000000E+00 | 6.8207067E−05 | −2.9073918E−04 | −3.4500231E−05 |
| 26 | 0.0000000E+00 | −4.5618956E−05 | 5.4793048E−05 | −1.9180445E−05 |

| | A6 | A7 | A8 | A9 |
|---|---|---|---|---|
| 19 | −2.6661677E−06 | 5.5392455E−07 | 2.5490131E−07 | 5.4948562E−08 |
| 20 | −4.3440966E−06 | 1.0022793E−06 | 3.5038503E−07 | 4.8490044E−08 |

TABLE 36-continued

Examplex12 • Aspheric data

| Surface Number | Coefficient | | | |
|---|---|---|---|---|
| 25 | 4.1346042E−06 | 1.7758612E−06 | 3.1901041E−07 | 3.8312674E−08 |
| 26 | 8.2082869E−06 | −8.8691681E−07 | −4.2495339E−08 | 1.1728237E−08 |

| | A10 | A11 | A12 | A13 |
|---|---|---|---|---|
| 19 | 5.6025747E−09 | −6.0997292E−10 | −4.6539307E−10 | −1.2919825E−10 |
| 20 | 6.1671689E−10 | −1.4199060E−09 | −4.6594685E−10 | −9.3626581E−11 |
| 25 | 1.8728489E−09 | −3.5793871E−10 | −1.3147288E−10 | −3.3039939E−11 |
| 26 | −4.0725955E−10 | 1.8171830E−09 | 3.7750044E−10 | 5.4100376E−11 |

| | A14 | A15 | A16 | A17 |
|---|---|---|---|---|
| 19 | −2.1714849E−11 | −1.1569581E−12 | 7.1288401E−13 | 2.9665095E−13 |
| 20 | −1.2674308E−11 | −2.7747978E−13 | 4.0794493E−13 | 1.8440410E−13 |
| 25 | −9.6331442E−12 | −1.7235083E−12 | −3.2471581E−13 | −3.9743670E−14 |
| 26 | 2.8114419E−12 | −1.0178509E−12 | −6.2508103E−13 | −1.6555223E−13 |

| | A18 | A19 | A20 |
|---|---|---|---|
| 19 | 5.7105863E−14 | 1.2165186E−15 | −2.9137421E−15 |
| 20 | 5.4421537E−14 | 8.1004555E−15 | −3.4810830E−15 |
| 25 | 3.5685494E−15 | 5.3517131E−15 | 1.0152103E−16 |
| 26 | −2.6635721E−14 | 1.0416574E−15 | 1.5202279E−15 |

TABLE 37

Example 13 . Basic lens data

| | Si (Surface Number) | Ri (Curvature Radius) | Di (Surface Spacing) | Ndi (Refractive Index) | vdj (Abbe Number) |
|---|---|---|---|---|---|
| G1 | 1 | 42.1224 | 0.90 | 2.00069 | 25.5 |
| | 2 | 24.6320 | 3.63 | 1.59282 | 68.7 |
| | 3 | ∞ | 0.10 | 1.00000 | |
| | 4 | 22.4772 | 2.55 | 1.72916 | 54.7 |
| | 5 | 67.2095 | D5 (Variable) | 1.00000 | |
| G2 | 6 | 177.3207 | 0.58 | 1.88300 | 40.8 |
| | 7 | 5.0472 | 2.57 | 1.00000 | |
| | 8 | −17.6446 | 0.56 | 1.88300 | 40.8 |
| | 9 | 17.6446 | 0.10 | 1.00000 | |
| | 10 | 10.4794 | 2.15 | 1.94595 | 18.0 |
| | 11 | ∞ | D11 (Variable) | 1.00000 | |
| | 12 (Aperture Diaphragm) | — | 0.80 | 1.00000 | |
| G3 | 13 | 4.9162 | 2.52 | 1.49700 | 81.5 |
| | 14 | −8.9850 | 0.50 | 1.72151 | 29.2 |
| | 15 | ∞ | 0.17 | 1.00000 | |
| | *16 | −30.0625 | 1.36 | 1.56865 | 58.6 |
| | *17 | −6.8221 | D17 (Variable) | 1.00000 | |
| G4 | *18 | 14.0556 | 1.55 | 1.53389 | 56.0 |
| | *19 | −9.0529 | 0.23 | 1.00000 | |
| | 20 | −9.7801 | 0.50 | 1.78800 | 47.4 |
| | 21 | 6.0142 | D21 (Variable) | 1.00000 | |
| G5 | *22 | 381.9809 | 2.40 | 1.56865 | 58.6 |
| | *23 | −10.8217 | 4.34 | 1.00000 | |
| GC | 24 | ∞ | 0.77 | 1.51680 | 64.2 |
| | 25 | ∞ | 0.00 | 1.00000 | |

(*Aspheric surface)
(f = 4.47~17.29~63.61 mm, FNO. = 3.55~5.62, 2ω = 88.4°~7.2°)

TABLE 38

Example 13 • Variable surface spacing data

| Surface Spacing | Wide angle end (f = 4.47) | Middle (f = 17.29) | Telephoto end (f = 63.61) |
|---|---|---|---|
| D5 | 0.40 | 10.61 | 22.04 |
| D11 | 14.30 | 4.22 | 0.93 |
| D17 | 1.97 | 3.90 | 1.84 |
| D21 | 1.77 | 5.91 | 9.75 |

TABLE 39

Examplex 13 • Aspheric data

| Surface Number | Coefficient | | | |
|---|---|---|---|---|
| | K | A3 | A4 | A5 |
| 16 | −9.994411E+00 | 3.349333E−04 | −3.368884E−03 | 6.023171E−05 |
| 17 | −4.029059E−01 | 3.790524E−04 | −1.429314E−03 | −3.386442E−05 |

TABLE 39-continued

Examplex 13 • Aspheric data

| Surface Number | Coefficient | | | |
|---|---|---|---|---|
| 18 | −3.147136E+00 | −1.466895E−04 | 4.685492E−04 | 9.081079E−07 |
| 19 | −2.819957E+00 | −8.224016E−04 | 9.210873E−04 | −6.060986E−05 |
| 22 | 7.584375E+00 | −3.071908E−03 | 2.118546E−03 | −1.205570E−04 |
| 23 | −9.021329E+00 | −2.698023E−03 | 3.129511E−04 | 6.921996E−05 |

| | A6 | A7 | A8 | A9 |
|---|---|---|---|---|
| 16 | 1.176164E−04 | −5.295505E−06 | 3.080297E−06 | −2.345616E−07 |
| 17 | 1.966190E−04 | −7.816194E−06 | −2.413787E−07 | 5.672102E−09 |
| 18 | 1.097006E−04 | 2.205295E−06 | 3.131642E−06 | −1.983961E−06 |
| 19 | 9.145480E−05 | −1.880585E−05 | −1.671096E−06 | 3.439192E−06 |
| 22 | 3.253447E−06 | −5.568675E−08 | −3.863787E−08 | −9.715337E−09 |
| 23 | 3.091332E−05 | −7.274495E−06 | −5.835733E−07 | 1.961890E−08 |

| | A10 | A11 | A12 | A13 |
|---|---|---|---|---|
| 16 | −1.581559E−08 | 4.010884E−08 | 1.869948E−07 | 2.859012E−08 |
| 17 | 2.515905E−07 | 8.922111E−08 | 9.180808E−08 | −9.100635E−09 |
| 18 | −1.761322E−06 | 9.592160E−07 | 2.055650E−07 | −6.103460E−08 |
| 19 | 1.394910E−06 | 2.985578E−08 | −2.520218E−07 | 1.263664E−07 |
| 22 | 2.411962E−10 | 1.416901E−09 | 5.395558E−10 | 3.720894E−11 |
| 23 | 3.689177E−08 | 8.356349E−09 | 6.055871E−10 | −2.876680E−10 |

| | A14 | A15 | A16 | A17 |
|---|---|---|---|---|
| 16 | 1.040154E−08 | −6.193398E−09 | 7.149744E−10 | −5.389400E−10 |
| 17 | −1.103806E−09 | 2.266779E−09 | 7.522602E−10 | −6.912256E−10 |
| 18 | −1.622187E−08 | −1.537892E−08 | 2.746664E−09 | 8.704287E−13 |
| 19 | −5.553964E−08 | −8.637253E−09 | 8.696729E−09 | −2.885990E−09 |
| 22 | −7.698842E−11 | 5.437825E−12 | −2.422657E−12 | 1.552954E−13 |
| 23 | −1.716611E−10 | 3.141829E−12 | 2.282382E−12 | 7.407283E−13 |

| | A18 | A19 | A20 |
|---|---|---|---|
| 16 | −4.229092E−10 | 2.639495E−29 | 1.055798E−30 |
| 17 | −1.569863E−10 | 3.428741E−11 | 1.055798E−30 |
| 18 | 1.394490E−10 | 2.639495E−29 | 1.055798E−30 |
| 19 | 6.598736E−28 | 2.639495E−29 | 1.055798E−30 |
| 22 | 4.889436E−15 | 8.520319E−14 | −1.423978E−14 |
| 23 | 7.393580E−14 | −1.793285E−14 | −2.336279E−15 |

TABLE 40

Example 14 . Basic lens data

| | Si (Surface Number) | Ri (Curvature Radius) | Di (Surface Spacing) | Ndi (Refractive Index) | vdj (Abbe Number) |
|---|---|---|---|---|---|
| G1 | 1 | 40.7109 | 0.90 | 2.00069 | 25.5 |
| | 2 | 23.9992 | 3.61 | 1.59282 | 68.7 |
| | 3 | ∞ | 0.10 | 1.00000 | |
| | 4 | 22.1503 | 2.50 | 1.72916 | 54.7 |
| | 5 | 67.9904 | D5 (Variable) | 1.00000 | |
| G2 | 6 | 155.9843 | 0.58 | 1.88300 | 40.8 |
| | 7 | 5.1127 | 2.53 | 1.00000 | |
| | 8 | −26.6980 | 0.56 | 1.83400 | 37.2 |
| | 9 | 13.6859 | 0.32 | 1.00000 | |
| | 10 | 9.6074 | 2.10 | 2.00272 | 19.3 |
| | 11 | −505.4160 | 0.56 | 1.88300 | 40.8 |
| | 12 | 35.6968 | D12 (Variable) | 1.00000 | |
| | 13 (Aperture Diaphragm) | — | 0.80 | 1.00000 | |
| G3 | 14 | 4.6565 | 2.66 | 1.49700 | 81.5 |
| | 15 | −7.8023 | 0.52 | 1.71736 | 29.5 |
| | 16 | ∞ | 0.15 | 1.00000 | |
| | *17 | −84081.53 | 1.30 | 1.51760 | 63.5 |
| | *18 | −6.3901 | D18 (Variable) | 1.00000 | |
| G4 | *19 | 389.2314 | 1.55 | 1.53389 | 56.0 |
| | *20 | −5.6787 | 0.19 | 1.00000 | |
| | 21 | −6.1254 | 0.52 | 1.75500 | 52.3 |
| | 22 | 6.8141 | D22 (Variable) | 1.00000 | |
| G5 | *23 | 712.6807 | 2.50 | 1.58313 | 59.4 |
| | *24 | −10.3576 | 3.63 | 1.00000 | |
| GC | 25 | ∞ | 0.80 | 1.51680 | 64.2 |
| | 26 | ∞ | 0.00 | 1.00000 | |

(*Aspheric surface)

(f = 4.47~15.76~63.70 mm, FNO. = 3.56~5.65, 2ω = 87.4°~7.2°)

TABLE 41

Example 14 • Variable surface spacing data

| Surface Spacing | Wide angle end (f = 4.47) | Middle (f = 15.76) | Telephoto end (f = 63.70) |
|---|---|---|---|
| D5 | 0.40 | 9.02 | 21.15 |
| D12 | 14.14 | 3.86 | 0.91 |
| D18 | 1.85 | 3.47 | 1.63 |
| D22 | 1.80 | 5.06 | 9.37 |

TABLE 42

Examplex 14 • Aspheric data

| Surface Number | Coefficient | | | |
|---|---|---|---|---|
| | K | A3 | A4 | A5 |
| 17 | −9.984237E+00 | −1.301392E−04 | −4.041881E−03 | −3.400833E−04 |
| 18 | −2.418702E+00 | 3.596483E−04 | −3.112271E−03 | −1.372632E−04 |
| 19 | 4.708328E+00 | 2.838200E−04 | 1.262357E−03 | −3.957290E−04 |
| 20 | −2.470732E+00 | −8.544173E−04 | 1.667918E−03 | −4.770119E−04 |
| 23 | −1.199292E−01 | −3.460177E−03 | 1.996247E−03 | −9.698967E−05 |
| 24 | −6.362583E+00 | −3.722369E−03 | 3.937977E−04 | 9.265121E−05 |
| | A6 | A7 | A8 | A9 |
| 17 | 1.102009E−04 | 9.567699E−06 | −3.821923E−06 | −1.670888E−06 |
| 18 | 2.952508E−04 | −4.804685E−05 | 3.627902E−06 | 3.581883E−06 |
| 19 | 3.193340E−04 | 3.684251E−05 | 4.054308E−06 | 1.590656E−05 |
| 20 | 8.069001E−05 | 7.322331E−05 | −1.363277E−05 | 4.092351E−05 |
| 23 | 6.363675E−06 | 2.142908E−07 | 5.818419E−09 | 4.457684E−09 |
| 24 | 2.842898E−05 | −7.601590E−06 | −6.706870E−07 | 6.194447E−09 |
| | A10 | A11 | A12 | A13 |
| 17 | 2.837739E−06 | 1.712391E−07 | −1.149821E−07 | −1.864657E−08 |
| 18 | −1.583839E−06 | 4.271255E−07 | 2.542992E−07 | −4.137039E−09 |
| 19 | −2.193294E−06 | −7.641074E−06 | −7.057959E−09 | 3.074854E−07 |
| 20 | 8.618257E−07 | −6.369439E−06 | −2.290433E−06 | −1.302778E−06 |
| 23 | 4.255895E−09 | 2.627136E−09 | 8.489839E−10 | 1.188134E−10 |
| 24 | 3.988256E−08 | 9.891014E−09 | 1.429101E−09 | −5.816938E−11 |
| | A14 | A15 | A16 | A17 |
| 17 | 2.679404E−09 | −2.816892E−09 | 1.229386E−09 | −1.903926E−10 |
| 18 | −3.170298E−08 | −1.369068E−09 | −4.254759E−10 | 4.794945E−10 |
| 19 | 2.488627E−07 | −2.782171E−10 | −5.934952E−09 | −9.137529E−10 |
| 20 | 1.030559E−06 | −9.549841E−09 | 4.848961E−09 | −6.483533E−09 |
| 23 | −7.267677E−11 | 2.853356E−13 | −1.070857E−12 | 9.327234E−14 |
| 24 | −1.270058E−10 | 8.781060E−12 | 1.791007E−12 | 4.222097E−13 |
| | A18 | A19 | A20 | |
| 17 | 2.294012E−10 | 8.544557E−30 | 3.460421E−31 | |
| 18 | 2.064869E−10 | 8.536365E−30 | 3.460421E−31 | |
| 19 | 2.136139E−28 | 8.651053E−30 | 3.355564E−31 | |
| 20 | 2.162763E−28 | 8.388909E−30 | 3.355564E−31 | |
| 23 | −2.019136E−14 | 7.729219E−14 | −1.513155E−14 | |
| 24 | 1.745952E−15 | −1.998627E−14 | −5.485670E−15 | |

Other Numerical Data of Each Example

[Table 43] shows the values related to the condition expressions according to each example. As can be seen from [Table 43], the values of each example are within the numerical range of Condition expressions 1 to 8.

TABLE 43

Values related to conditional expression

| | | Example | | | | | | |
|---|---|---|---|---|---|---|---|---|
| | Expression | 1 | 2 | 3 | 4 | 5 | 6 | 7 |
| (1) | $0.05 < |f4/ft| < 0.25$ | 0.138 | 0.137 | 0.098 | 0.179 | 0.164 | 0.138 | 0.166 |
| (2) | $0.4 < f1/ft < 1.3$ | 0.55 | 0.55 | 0.54 | 0.53 | 0.53 | 0.55 | 0.56 |
| (3) | $0.05 < f3/ft < 0.20$ | 0.125 | 0.124 | 0.101 | 0.118 | 0.118 | 0.122 | 0.124 |
| (4) | $0.05 < f5/ft < 0.4$ | 0.205 | 0.200 | 0.199 | 0.266 | 0.257 | 0.203 | 0.224 |
| (5) | $1.47 < N12 < 1.65$ | 1.603 | 1.592 | 1.592 | 1.618 | 1.487 | 1.487 | 1.593 |
| (6) | $62.0 < v12 < 75.0$ | 65.4 | 68.3 | 68.3 | 63.3 | 70.2 | 70.2 | 68.7 |
| (7) | $0.6 < (Ra - Rb)/(Ra + Rb) < 1.0$ | 0.94 | 0.96 | 0.86 | 0.85 | 0.84 | 0.97 | 0.96 |
| (8) | $0.05 < |f2/ft| < 0.10$ | 0.081 | 0.081 | 0.074 | 0.076 | 0.077 | 0.082 | 0.074 |
| (9) | $18 < ft/fw < 42$ | 16.9 | 16.9 | 16.9 | 16.9 | 16.9 | 16.9 | 16.9 |
| | | Example | | | | | | |
| | Expression | 8 | 9 | 10 | 11 | 12 | 13 | 14 |
| (1) | $0.05 < |f4/ft| < 0.25$ | 0.117 | 0.109 | 0.131 | 0.189 | 0.159 | 0.152 | 0.116 |
| (2) | $0.4 < f1/ft < 1.3$ | 0.74 | 0.70 | 0.80 | 0.77 | 0.88 | 0.543 | 0.525 |
| (3) | $0.05 < f3/ft < 0.20$ | 0.115 | 0.114 | 0.113 | 0.111 | 0.124 | 0.124 | 0.112 |
| (4) | $0.05 < f5/ft < 0.4$ | 0.102 | 0.107 | 0.102 | 0.105 | 0.163 | 0.292 | 0.275 |
| (5) | $1.47 < N12 < 1.65$ | 1.517 | 1.487 | 1.517 | 1.517 | 1.487 | 1.593 | 1.593 |
| (6) | $62.0 < v12 < 75.0$ | 64.2 | 70.2 | 64.2 | 64.2 | 70.2 | 68.7 | 68.7 |
| (7) | $0.6 < (Ra - Rb)/(Ra + Rb) < 1.0$ | 0.68 | 0.88 | 0.78 | 0.78 | 0.73 | 0.95 | 0.94 |
| (8) | $0.05 < |f2/ft| < 0.10$ | 0.065 | 0.071 | 0.078 | 0.076 | 0.081 | 0.088 | 0.087 |
| (9) | $18 < ft/fw < 42$ | 28.3 | 28.3 | 28.3 | 28.3 | 23.3 | 14.2 | 14.3 |

[Aberration Performance]

FIGS. 15A to 15D show the spherical aberration, astigmatism, distortion, and lateral chromatic aberration of the zoom lens according to Numerical example 1 at the wide angle end, respectively. FIGS. 16A to 16D show the spherical aberration, astigmatism, distortion, and lateral chromatic aberration of the zoom lens according to Numerical example 1 in the middle portion, respectively. FIGS. 17A to 17D show the spherical aberration, astigmatism, distortion, and lateral chromatic aberration of the zoom lens according to Numerical example 1 at the telephoto end, respectively. Each of the aberration diagrams shows aberration when the d-line (wavelength: 587.6 nm) is used as a reference wavelength. The spherical aberration diagram and the lateral chromatic aberration diagram show aberration with respect to a wavelength of 460 nm and a wavelength of 615 nm. In the astigmatism diagrams, a solid line indicates aberration in a sagittal direction, and a dotted line indicates aberration in a tangential direction. In addition, FNO. indicates an F number, and ω indicates a half angle of view.

Similarly, the various aberrations of the zoom lens according to Numerical example 2 are shown in FIGS. 18A to 18D (wide angle end), FIGS. 19A to 19D (middle portion), and FIGS. 20A to 20D (telephoto end). Similarly, the various aberrations of the zoom lenses according to Numerical examples 3 to 14 are shown in FIGS. 21A to 21D to FIGS. 56A to 56D.

As can be seen from the numerical data and the aberration diagrams, in all of the examples, the various aberrations are effectively corrected with each power variation range, and it is possible to achieve a zoom lens with a high zoom ratio and a small overall size.

Although the embodiments and examples of the invention have been described above, the invention is not limited thereto. Various modifications and changes of the invention can be made without departing from the scope and spirit of the invention. For example, the curvature radius, the surface spacing, and the refractive index of each lens component are not limited to the values described in the above-mentioned numerical examples, but may have other values.

What is claimed is:

1. A zoom lens comprising:
a first lens group having a positive refractive power;
a second lens group having a negative refractive power;
a third lens group having a positive refractive power;
a fourth lens group having a negative refractive power; and
a fifth lens group having a positive refractive power,
wherein the first to fifth lens groups are arranged in this order from an object side and a gap between the lens groups is changed to change power, and
the zoom lens satisfies the following condition expression:

$$0.05<|f4|/ft<0.25$$

where ft indicates the focal length of the entire system at a telephoto end and f4 indicates the focal length of the fourth lens group.

2. The zoom lens according to claim 1,
wherein the second lens group includes a negative lens having a strong concave surface facing an image side, a cemented lens of a negative lens and a positive lens, and a negative lens having a strong concave surface facing the object side, which are arranged in this order from the object side.

3. The zoom lens according to claim 1,
wherein the fourth lens group includes two lenses, that is, a positive lens and a negative lens.

4. The zoom lens according to claim 1,
wherein the fourth lens group is moved in an optical axis direction for focusing.

5. The zoom lens according to claim 1,
wherein the zoom lens satisfies the following condition expression:

$$0.4<f1/ft<1.3$$

where f1 indicates the focal length of the first lens group.

6. The zoom lens according to claim 1,
wherein the zoom lens satisfies the following condition expression:

$$0.05<f3/ft<0.20$$

where f3 indicates the focal length of the third lens group.

7. The zoom lens according to claim 1,
wherein the zoom lens satisfies the following condition expression:

$$0.05 < f5/ft < 0.4$$

where f5 indicates the focal length of the fifth lens group.

8. The zoom lens according to claim 1,
wherein the fifth lens group includes only one positive lens, and
at least an object-side surface of the positive lens is an aspheric surface.

9. The zoom lens according to claim 1,
wherein the fifth lens group is fixed when power varies and during focusing.

10. The zoom lens according to claim 1,
wherein the first lens group includes a cemented lens of a negative meniscus lens having a convex surface facing the object side and a positive lens having a convex surface facing the object side, and a positive meniscus lens having a convex surface facing the object side, which are arranged in this order from the object side, and
the first lens group satisfies the following condition expressions:

$$1.47 < N12 < 1.65;\text{ and}$$

$$62.0 < v12 < 75.0$$

where N12 indicates the refractive index of the positive lens of the cemented lens in the first lens group with respect to the d-line and v12 indicates the Abbe number of the positive lens of the cemented lens in the first lens group with respect to the d-line.

11. The zoom lens according to claim 1,
wherein a lens closest to the object side in the second lens group satisfies the following condition expression:

$$0.6 < (Ra-Rb)/(Ra+Rb) < 1.0$$

where Ra indicates the curvature radius of an object-side surface of the lens closest to the object side in the second lens group and Rb indicates the curvature radius of an image-side surface of the lens closest to the object side in the second lens group.

12. The zoom lens according to claim 1,
wherein the zoom lens satisfies the following condition expression:

$$0.05 < |f2/ft| < 0.10$$

where f2 indicates the focal length of the second lens group.

13. An imaging apparatus comprising:
the zoom lens according to claim 1; and
an imaging device that outputs an image signal corresponding to an optical image formed by the zoom lens.

* * * * *